US007738560B2

(12) United States Patent
Gordon et al.

(10) Patent No.: US 7,738,560 B2
(45) Date of Patent: Jun. 15, 2010

(54) TEMPORAL SLICE PERSISTENCE METHOD AND APPARATUS FOR DELIVERY OF INTERACTIVE PROGRAM GUIDE

(75) Inventors: Donald F. Gordon, Los Altos, CA (US); Sadik Bayrakeri, Foster City, CA (US); Jeremy S Edmonds, Redwood City, CA (US); John P. Comito, Redwood City, CA (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1784 days.

(21) Appl. No.: 10/831,849

(22) Filed: Apr. 26, 2004

(65) Prior Publication Data

US 2004/0196906 A1 Oct. 7, 2004

Related U.S. Application Data

(63) Continuation of application No. 09/686,739, filed on Oct. 10, 2000, now Pat. No. 6,754,271, application No. 10/831,849, which is a continuation-in-part of application No. 09/466,990, filed on Dec. 10, 1999, now Pat. No. 6,614,843, and a continuation-in-part of application No. 09/428,066, filed on Nov. 27, 1999, now Pat. No. 6,651,252, and a continuation-in-part of application No. 09/384,394, filed on Aug. 27, 1999, now Pat. No. 6,621,870, which is a continuation-in-part of application No. 09/293,535, filed on Apr. 15, 1999, now Pat. No. 6,584,153, application No. 10/831,849, which is a continuation-in-part of application No. 09/539,228, filed on Mar. 30, 2000, now abandoned, which is a continuation-in-part of application No. 09/524,854, filed on Mar. 14, 2000, now Pat. No. 7,127,737.

(51) Int. Cl.
H04N 7/18 (2006.01)
(52) U.S. Cl. .............................. 375/240.26; 375/240.25
(58) Field of Classification Search ........................ 375/240.12–240.29; 725/39–52
See application file for complete search history.

(56) References Cited

U.S. PATENT DOCUMENTS

| 5,544,161 | A | 8/1996 | Bigham et al. | 370/397 |
|---|---|---|---|---|
| 5,768,539 | A | 6/1998 | Metz et al. | 709/249 |
| 5,917,830 | A | 6/1999 | Chen et al. | 370/487 |
| 5,978,855 | A | 11/1999 | Metz et al. | 709/249 |
| 6,005,562 | A | 12/1999 | Shiga et al. | 345/721 |
| 6,542,518 | B1 * | 4/2003 | Miyazawa | 370/468 |
| 7,174,084 | B2 * | 2/2007 | Edmonds et al. | 386/55 |

* cited by examiner

Primary Examiner—Andy S Rao
(74) Attorney, Agent, or Firm—Banner & Witcoff, Ltd

(57) ABSTRACT

Techniques to efficiently deliver interactive program guide (IPG) to a number of terminals. Each IPG page can be decomposed into a guide portion that is specific to each IPG page and a background portion that is common for all IPG pages. The background portion can be further decomposed into a time-varying video portion and other static portions. One method includes receiving a viewer selection for imagery, where the imagery includes at least one intracoded slice and at least one predictively coded slice, and each of the intracoded and predictively codes slices are associated with respective bitstreams. Packets from the at least one bitstream corresponding to the at least one intracoded slice of the selected imagery are extracted, and packets from the at least one bitstream corresponding to the at least one predictively coded slice of the selected imagery are also extracted. The payload portions of the extracted packets are then arranged to form the selected imagery.

22 Claims, 53 Drawing Sheets

Single Transport Stream, Multiple Programs, Program Assignment 2100

Single Transport Steam, Single Program, Program Assignment *2150*

Multiple Transport Streams Assignment Structure 2300

First Transport Stream 2702: PID1 | PID2 | PID3 | PID1 | PID2 | PID3 | ...

Second Transport Stream 2704: PID3 | PID4 | PID5 | PID3 | PID4 | PID5 | ...

3322 — Largest prime number ≤ total number of data PIDs available
→ Prime number = 127 ≤ 128

3324 — Data PID number = Video PID number (Mod prime number)
= Video PID number (Mod 127)

FIG.33B

TEMPORAL SLICE PERSISTENCE METHOD AND APPARATUS FOR DELIVERY OF INTERACTIVE PROGRAM GUIDE

CROSS-REFERENCES TO RELATED APPLICATIONS

This application is a continuation of U.S. patent application Ser. No. 09/686,739, entitled "TEMPORAL SLICE PERSISTENCE METHOD AND APPARATUS FOR DELIVERY OF INTERACTIVE PROGRAM GUIDE," filed on Oct. 10, 2000, now U.S. Pat. No. 6,754,271 which claims the benefit of U.S. provisional Application Ser. No. 60/237,411, entitled "TEMPORAL SLICE PERSISTENCE METHOD AND APPARATUS FOR DELIVERY OF INTERACTIVE PROGRAM GUIDE," filed Oct. 2, 2000, which applications are incorporated herein by reference in their entireties for all purposes.

U.S. patent application Ser. No. 09/686,739 is further a continuation-in-part of U.S. patent application Ser. No. 09/466,990, entitled "STREAM INDEXING FOR DELIVERY OF INTERACTIVE PROGRAM GUIDE," filed Dec. 10, 1999, now U.S. Pat. No. 6,614,843 which is a continuation-in-part of Ser. No. 09/293,535, entitled "IMPROVED DATA STRUCTURE AND METHODS FOR PROVIDING AN INTERACTIVE PROGRAM GUIDE", filed Apr. 15, 1999, now U.S. Pat. No. 6,584,153 Ser. No. 09/384,394, entitled "METHOD AND APPARATUS FOR COMPRESSING VIDEO SEQUENCES," filed Aug. 27, 1999, now U.S. Pat. No. 6,621,870 and Ser. No. 09/428,066, entitled "METHOD AND APPARATUS FOR TRANSMITTING VIDEO AND GRAPHICS IN A COMPRESSED FORM," filed Oct. 27, 1999 now U.S. Pat. No. 6,651,252.

U.S. patent application Ser. No. 09/686,739 is further a continuation-in-part of U.S. patent application Ser. No. 09/539,228, entitled "MESSAGING PROTOCOL FOR DEMAND-CAST SYSTEM AND BANDWIDTH MANAGEMENT," filed Mar. 30, 2000, now abandoned which is a continuation-in-part of U.S. patent application Ser. No. 09/524,854, entitled "BANDWIDTH MANAGEMENT TECHNIQUES FOR DELIVERY OF INTERACTIVE PROGRAM GUIDE," filed Mar. 14, 2000 now U.S. Pat. No. 7,127,737.

The above-identified related applications are all assigned to the assignee of the present invention and are incorporated herein by reference in their entireties for all purposes.

BACKGROUND OF THE INVENTION

The present invention relates to communications systems in general. More specifically, the invention relates to techniques to efficiently deliver interactive program guide (IPG) in a server-centric system.

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top terminals, or other methods of trying to offer service differentiated from standard cable and over the air broadcast systems.

With this increase in bandwidth, the number of programming choices has also increased. Leveraging off the availability of more intelligent set top terminals, several companies such as Starsight Telecast Inc. and TV Guide, Inc. have developed elaborate systems for providing an interactive listing of a vast array of channel offerings, expanded textual information about individual programs, and the ability to look forward to plan television viewing as much as several weeks in advance and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider. Furthermore, the user interface of existing program guides do not usually look like a typical television control interface; rather the user interface looks like a 1980's style computer display (i.e., blocky, ill-formed text and/or graphics).

Therefore, it is desirable to provide an interactive program guide in a manner tending to reduce the above-described problem. With the increase in the quantity of programming and rich multimedia content of a program guide, it is a challenge to deliver program guide audiovisual data to viewers in an efficient and effective manner. A large amount of resources (e.g., bandwidth) would normally be needed to continually transmit, for example, two weeks of programming for 200 channels. Therefore, efficient and effective techniques to provide interactive program guide to a large number of viewers are highly desirable.

SUMMARY OF THE INVENTION

In this invention, the drawbacks cited in the previous art are overcome by a server-centric encoding system that processes the guide data and associated audiovisual content at a central location (e.g., a head-end) and delivering the display ready guide pages to receiving terminals. The invention provides various techniques to encode, deliver, and decode interactive program guide (IPG). These techniques exploit known characteristics of IPG pages and further employ picture-based or slice-based recombination techniques to minimize the transmission and processing of redundant information. Each IPG page can be decomposed into a guide portion that is specific to each IPG page and a background portion that is common to all IPG pages. The background portion can be further decomposed into a video portion that is time-varying and other portions that may be static or slowly moving over time (i.e., slow motion). These various portions of the IPG pages can be efficiently processed and delivered in the manners described below.

In the picture-based recombinant methods described below and in the aforementioned U.S. patent application Ser. No. 09/466,990, the guide and video portions for each IPG page were processed (processing including picture-based splicing) as picture by picture, where the guide portion was composed with one frame of motion video, intra-coded, and sent to the decoder as I-picture. A number of I-pictures were sent for a number of IPG pages. At a terminal, one of the I-pictures (i.e., the selected guide page) was then re-combined with predicted pictures to form a complete GOP. The recombination was performed at the "picture" level, which is simple and easy for the decoder in comparison to the "slice" level recombination. In this picture-based recombination technique, each I-picture contains data for both the guide and video portions and occupies more bandwidth than necessary as the intra-coded motion video portion of each IPG page was repeatedly sent along with each I-picture that carries different guide page data.

In the slice-based recombination methods also described below and in the aforementioned U.S. patent application Ser. No. 09/466,990, the guide portion and each video portion were processed slice-by-slice (e.g., with each slice defined as one or more rows of macroblocks in a picture). With slice-based recombination, the redundancy of the picture-based recombination process was significantly reduced by sending the video portion slices in a separate PID once, and recombining the video portion slices with different guide page slices to regenerate different IPG pages. The guide page slices for each guide page were also sent as a separate PID. However, the slice-based recombination algorithm requires more encoder and decoder resources to handle slice-level processing, including slice-by-slice splicing of guide and video (and background) portions.

In the present invention, a unique approach is provided that reduces the processing overhead but still uses low bandwidth for delivery of guide content. The approach uses picture-based recombination, with the pictures including only selected slices. In MPEG, a picture does not need to include all the slices of a frame, and even if picture-based processing is applied only the portion(s) of the frame defined by the slices are processed and updated on the screen. Note that the invention is not tied to any particular standard, including MPEG, and the techniques described herein can be applied within proprietary solutions and other standards. The invention introduces a new paradigm of encoding algorithms that takes advantage of the fact that even though picture-by-picture encoding/decoding is performed, in the temporal domain, only the selected slices for certain regions (e.g., the guide region) are updated as required or requested. In other words, slices temporally persist on the screen until overwritten by new information.

BRIEF DESCRIPTION OF THE DRAWINGS

The teachings of the invention can be readily understood by considering the following detailed description in conjunction with the accompanying drawings.

FIG. 27A is a diagram illustrating a technique for reducing switching latencies by carrying redundant packets in accordance with an embodiment of the invention;

FIGS. 33A and 33B are diagrams illustrating a first look-ahead video PID layout and a method of forming a second look-ahead video PID layout, respectively, in accordance with an embodiment of the invention;

To facilitate understanding, identical reference numerals have been used, where possible, to designate identical elements that are common within a figure.

DESCRIPTION OF THE SPECIFIC EMBODIMENTS

Picture-Level Processing

A. System

Figure 1:
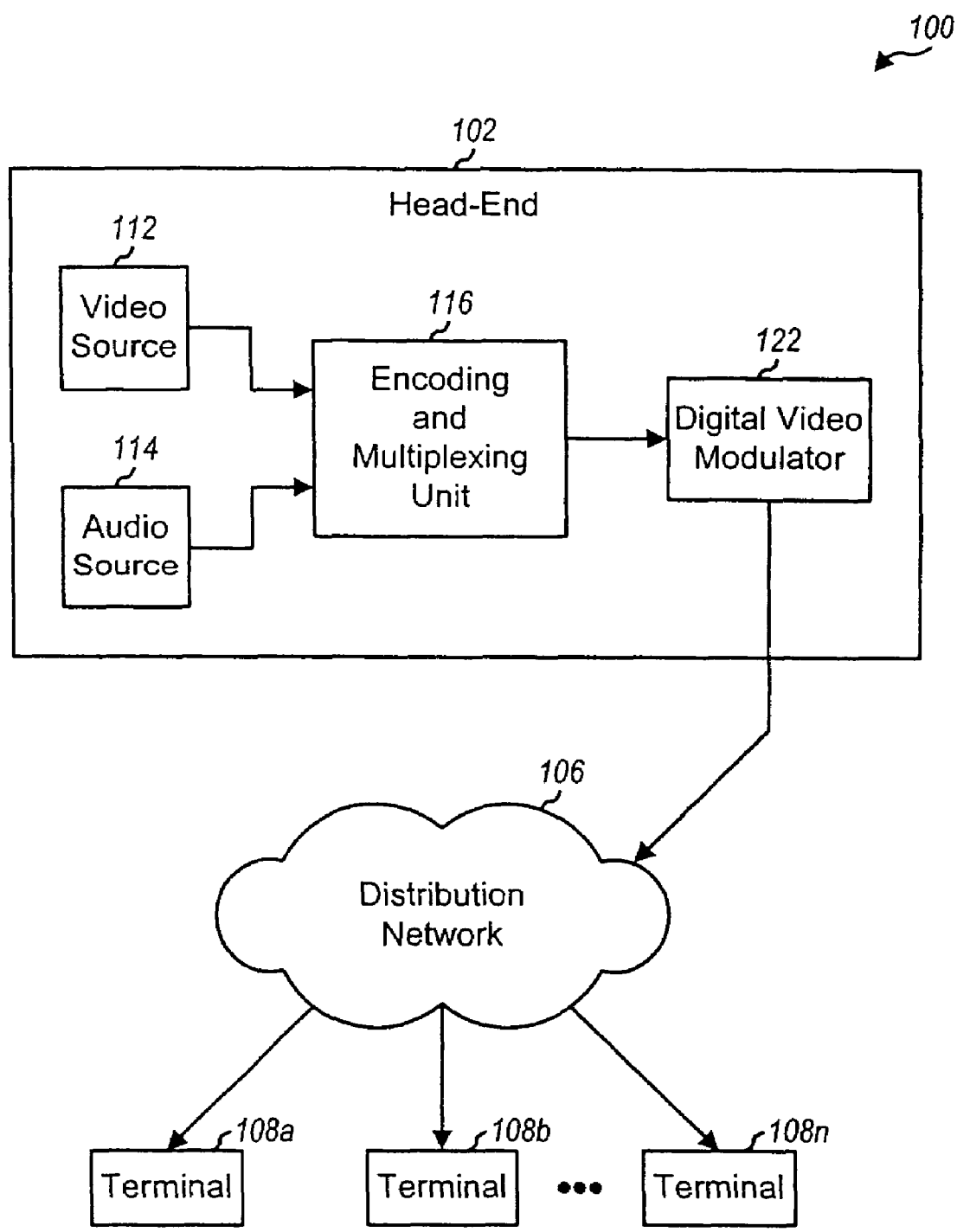
FIG. 1 is a block diagram of an embodiment of an interactive information distribution system that can implement various aspects of the present invention.

FIG. 1 is a high-level block diagram of an information distribution system 100 (e.g., a video-on-demand system or digital cable system) that can be used to implement various aspects of the invention. System 100 includes a head-end 102 (e.g., a service provider equipment), a distribution network 106 (e.g., hybrid fiber-coax network), and a number of terminals 108. This architecture of information distribution system is disclosed in commonly assigned U.S. patent application Ser. No. 08/984,710, filed Dec. 3, 1997. One implementation of system 100 is a DIVA™ system provided by DIVA Systems Corporation.

Head-end 102 produces a number of digital streams that contain encoded information in (e.g., MPEG) compressed format. These streams are modulated using a modulation format that is compatible with distribution network 106. Terminals 108a through 108n are located at various subscriber locations. Upon receiving a stream, terminal 108 extracts the information from the received signal and decodes the stream to produce a signal containing various contents (e.g., produce a television program, program guide page, or other multimedia program) suitable for a display unit.

In an interactive information distribution system such as the one described in the aforementioned U.S. patent application Ser. No. 08/984,710, the program streams are addressed to the particular terminals that requested the information through an interactive menu. Interactive menu structures for requesting video on demand are disclosed in commonly assigned U.S. patent application Ser. No. 08/984,427, filed Dec. 3, 1997 and Serial No. 60/093,891, filed in Jul. 23, 1998.

To assist a viewer in selecting programming, head-end 102 produces an interactive program guide (IPG) that is compressed for transmission in accordance with the invention. The IPG contains program information (e.g., title, time, channel, program duration and the like) as well at least one region displaying full motion video (e.g., a television advertisement or promotion). Such informational video is provided in various locations within the program guide screen.

The invention produces the IPG using a compositing technique that is described in commonly assigned U.S. patent applications Ser. No. 09/201,528, filed Nov. 30, 1998 and Ser. No. 09/359,561, filed Jul. 23, 1999, which are hereby incorporated by reference herein. The compositing technique, which is not described herein, enables full motion video to be positioned within an IPG and allows the video to seamlessly transition from one IPG page to another. The composited IPG pages (i.e., a number of video frame sequences) are coupled from a video source 112 to an encoding and multiplexing unit 116. One or more audio signals associated with the video sequences are also supplied by an audio source 114 to encoding and multiplexing unit 116.

Encoding and multiplexing unit 116 compresses the frame sequences into a number of elementary streams, which are further processed to remove redundant information. A multiplexer within unit 116 then assembles the elementary streams into one or more transport streams.

Each transport stream is then modulated by a digital video modulator 122 based on a modulation format that is compatible with distribution network 106. For example, in the DIVA™ system, the modulation is quadrature amplitude modulation (QAM). However, other modulation formats can also be used.

Each terminal 108 includes a receiver and a display (e.g., a television). The receiver demodulates the signals carried by distribution network 106 and decodes the demodulated signals to extract the IPG pages from the stream. A design of terminal 108 is described in further detail below.

1. Encoding and Multiplexing Unit

Figure 2:
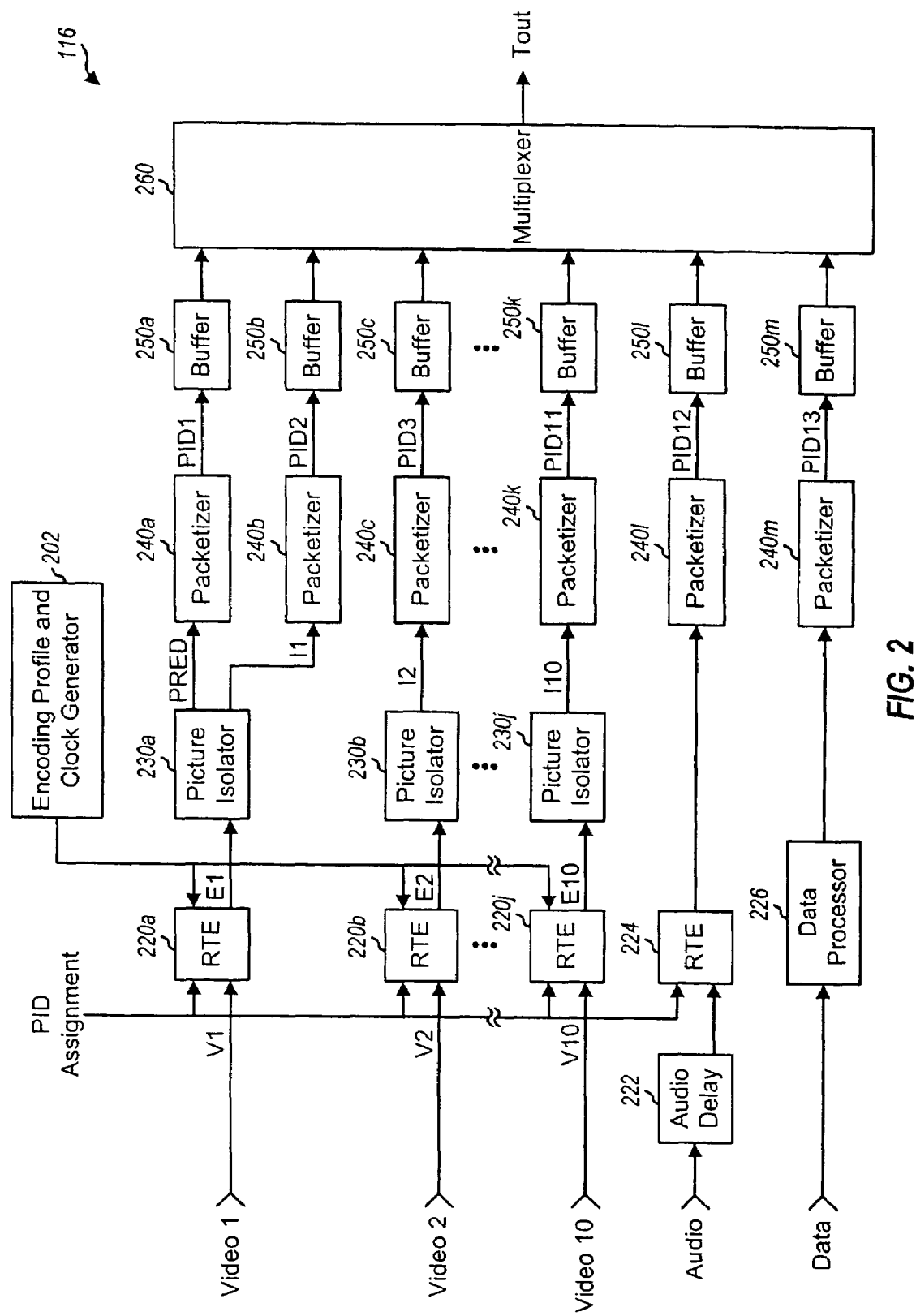
FIG. 2 is a block diagram of an encoding and multiplexing unit in accordance with an embodiment of the present invention.

FIG. 2 is a block diagram of an embodiment of encoding and multiplexing unit 116, which can be used to produce one or more transport streams comprising a number of encoded video, audio, and data elementary streams. Encoding and multiplexing unit 116 can be advantageously used in an ensemble encoding environment, whereby a number of video streams are generated to compress video information that carries common and non-common content. In an embodiment, the common content is encoded into a single elementary stream and the non-common content is encoded into separate elementary streams. In this way, the common content is not duplicated in every stream, which can yield significant bandwidth savings. In a practical MPEG encoding process, some common information will likely appear in the stream intended to carry non-common information and some non-common information will likely appear in the stream intended to carry common information.

Although the following description is presented within the context of IPG, the method and apparatus described herein can be applied to a broad range of applications, such as broadcast video on demand delivery, e-commerce, Internet, video education services, and others. The method and apparatus described can be advantageously used to deliver video sequences with command content.

In the embodiment shown in FIG. 2, encoding and multiplexing unit 116 receives a number of video sequences (e.g., V1 through V10) and, optionally, one or more audio signals and one or more data streams (only one audio signal and one data stream in shown in FIG. 2). The video sequences V1-V10 include imagery common to each other (e.g., common IPG background information and common video portion information). Each video sequence further includes imagery specific to the sequence (e.g., the programming information, program grid graphic) and different from those of other sequences.

The audio signal(s) comprises audio information that may be associated with a video portion in the video sequences (e.g., an audio track associated with still or moving images). For example, if video sequence V1 represents a movie trailer, the audio signal can be derived from an audio source (e.g., music and voice-over) associated with the music trailer.

The data stream can comprise overlay graphics information, textual information describing programming indicated by the guide region, and other system or user interface related data. The data stream can be separately encoded into its own elementary stream or included within the (e.g., MPEG-2) transport stream. The data stream can be suitable for use in the information distribution system as private data, auxiliary data, and the like.

In the embodiment shown in FIG. 2, encoding and multiplexing unit 116 includes an encoding profile and clock generator 202, a number of real-time video (e.g., MPEG-2) encoders (RTE) 220a through 220j, an audio delay element 222, a real-time audio (e.g., AC-3) encoder 224, an optional data processor 226, a number of picture isolators 230a through 230j, a number of packetizers 240a through 240m, a number of buffers 250a through 250m, and a transport multiplexer 260.

The video sequences V1-V10 are coupled to respective real-time encoders 220. Each encoder 220 encodes, illustratively, a composited IPG screen sequence to form a corresponding compressed video bit stream, e.g., an MPEG-2 compliant bit stream having associated with it a particular group of pictures (GOP) structure. The common clock and encoding profile generator 202 provides a clock and profile to each encoder 220 to ensure that the encoding timing and encoding process occur similarly for each video sequence V1-V10. This allows the video sequences to be encoded in a synchronous manner.

For the following description, it is assumed that the GOP structure consists of an I-picture followed by ten B-pictures, with a P-picture separating each group of two B-pictures (i.e., "I-B-B-P-B-B-P-B-B-P-B-B-P-B-B"). However, any GOP structure and size may be used in different configurations and applications. It is preferable that the same encoding profile, including the GOP structure, is used by each of real time encoders 220 to have uniform encoding across multiple streams and to produce approximately the same size encoded I and predicted pictures. Moreover, by utilizing the same profile and predefined GOP structure, multiple instances of the same encoder can be used to implement encoding and multiplexing unit 116, which can reduce implementation costs. It can be noted also that the encoding process can be performed by one or a number of encoders depending on the particular implementation.

Each real time encoder 220 produces an encoded (e.g., MPEG-2 compliant) bit stream that is coupled to a respective picture isolator 230. Each picture isolator 230 examines the encoded video stream (E) to isolate the I pictures within the bit streams by analyzing the stream access units associated with the I, P, and B pictures.

Picture isolators 230 process the received streams E1-E10 according to the type of picture (I, P or B picture) associated with a particular access unit (described below) and also the relative position of the pictures within the sequence and group of pictures. The first picture isolator 230a receives the bit stream E1 from the first real time encoder 220a and, in response, produces two output bit streams PRED and I1. The remaining picture isolators 230b to 230j produce only I-picture streams. It can be noted that the PRED stream can be generated by any one of the picture isolators.

As noted in the MPEG-1 and MPEG-2 specifications, an access unit comprises a coded representation of a presentation unit. In the case of audio, an access unit is the coded representation of an audio frame. In the case of video, an access unit includes all the coded data for a picture and any stuffing bits that follows it, up to but not including the start of the next access unit. If a picture is not preceded by a group start code or a sequence header code, then the corresponding access unit begins with the picture start code. If the picture is preceded by a group start code and/or a sequence header code (e.g., for an I-picture), then the corresponding access unit begins with the first byte of the first start code in the sequence or a GOP. If the picture is the last picture preceding a sequence end code in the stream, then all bytes between the last byte of the coded picture and the sequence end code (including the sequence end code) belong to the access unit. Each B and P-picture access unit in a GOP includes a picture start code. The last access unit of the GOP (e.g., a terminating B-picture) includes, in addition, a sequence end code indicating the termination of the GOP.

The I1 stream, as the first picture of the sequence, comprises a sequence header, a sequence extension, a GOP header, a picture header, a picture extension, and the I-picture data until the next picture start code. The PRED stream comprises only P and B picture access units, starting from the second picture start code (illustratively a B-picture) and all data until the next group start code. Thus, the PRED stream includes all access units of the GOP except those representing the I-picture.

The remaining picture isolators 230b through 230j respectively receive the (e.g., MPEG-2 compliant) streams E2 through E10 from the corresponding real-time encoders 220b through 220j and respectively produced the output stream I2 through I10. Each output stream comprises only the sequence header and all data until the second picture start codes (i.e., the access unit data associated with an I-picture at the beginning of the respective GOP).

Figure 3:
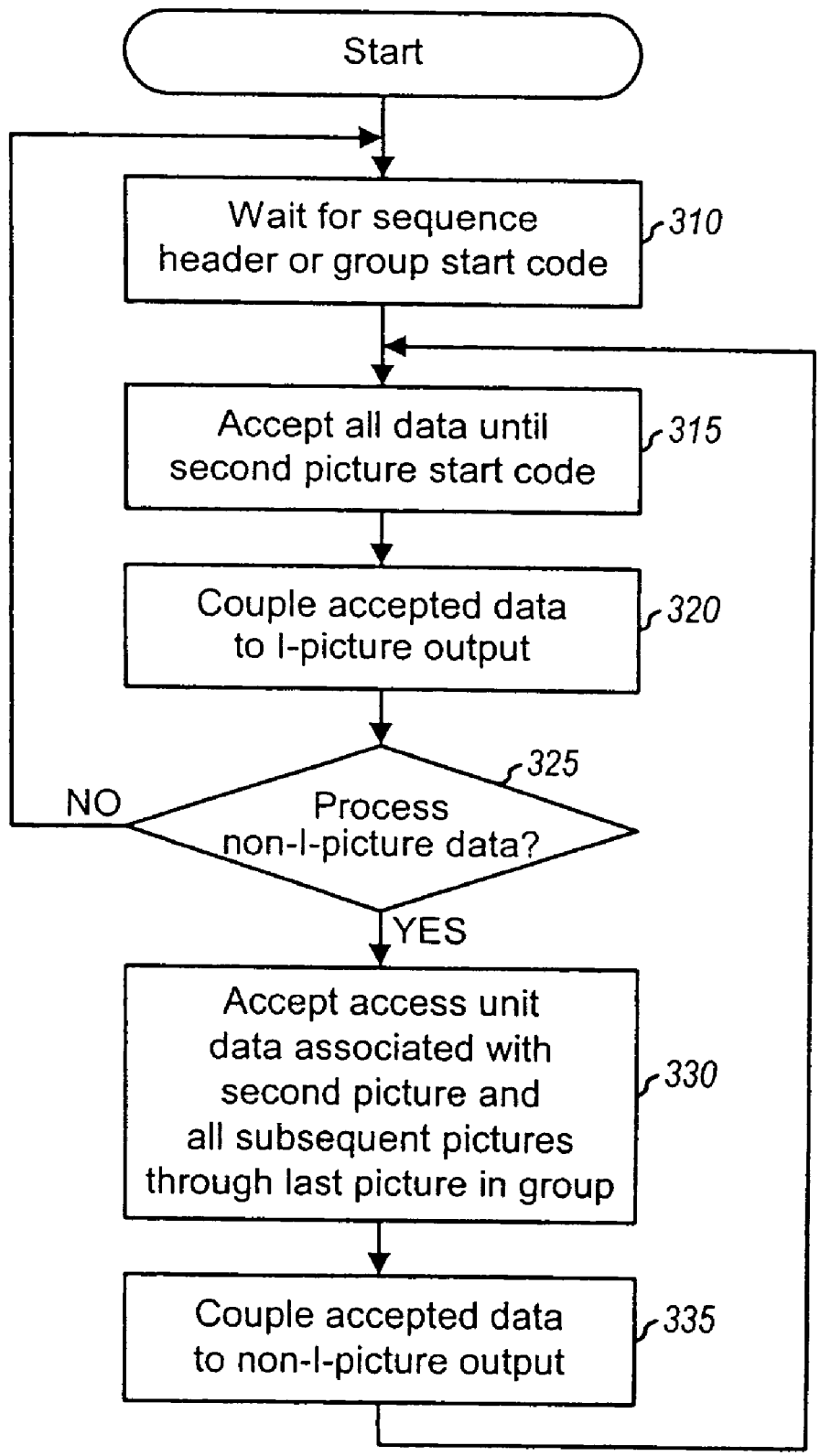
FIG. 3 is a flow diagram of a process used by a picture isolator within the encoding and multiplexing unit.

FIG. 3 is a flow diagram of an embodiment of a process 300 for isolating pictures, which is suitable for use with picture isolators 230 in FIG. 2. At step 310, the picture isolator waits for a sequence header or a group start code. Upon detecting this, the sequence header and all data until the second picture start code is accepted, at step 315. The accepted data is then coupled to the I-picture output of the picture isolator, at step 320. For picture isolators 230b through 230j, since there are no predicted pictures output, the accepted data (i.e., the sequence header, I-picture start code and I-picture) is coupled to a single output.

At step 325, a query is made whether non-I-picture data is to be processed (i.e., discarded or coupled to a packetizer). If the non-I-picture data is to be discarded, then the process returns to step 310 to wait for the next sequence header. Otherwise, if the non-I-picture data is to be coupled to a packetizer, the second picture start code and all data in a GOP until the next group start code is accepted, at step 330. The accepted data is then coupled to the non-I-picture output of frame isolator 230 to form the PRED stream, at step 335.

Thus, picture isolator examines the compressed video stream produced by real time encoder 220 to identify the start of a GOP, the start of an I-picture (i.e., the first picture start code after the group start code), and the start of the predicted pictures (i.e., the second picture start code after the group start code) forming the remainder of a GOP. The picture isolator couples the I-pictures and predicted pictures to the packetizers for further processing.

The first packetizer 240a packetizes the PRED stream into a number of fixed length transport packets according to, for example, the MPEG-2 standard. Additionally, the first packetizer 240a assigns a packet identifier (PID) (e.g., PID1) to each of the packets including information from the PRED stream, thereby producing a packetized stream PID1. The second packetizer 240b packetizes the I stream to produce a corresponding packetized stream PID2. The I2 through I10 output streams of the second through tenth picture isolators 230b through 230j are respectively coupled to the third through eleventh transport packetizers 240c through 240k, which respective produce the packetized streams PID3 through PID11.

In addition to the video information forming the ten IPG pages, audio information associated with IPG pages is encoded and supplied to transport multiplexer 260. Specifically, the audio signal is provided to audio delay 222 and then encoded by a real-time audio encoder 224 (e.g., a Dolby AC-3 real-time encoder) to produce an encoded audio stream. The encoded stream is then packetized by the 12th transport packetizer 240l to produce a transport stream assigned with a particular PID (e.g., PID12). The packetized audio stream with PID12 is coupled to the 12th buffer 250l.

In an embodiment, the IPG grid foreground and overlay graphics data is coupled to transport multiplexer 260 as a coded data stream assigned with a particular PID (e.g., PID13). The coded data stream is produced by processing the input data stream as related for the application using data processor 226 and packetizing the processed data stream using the thirteenth packetizer 240m to produce the packetized data stream with PID13, which is coupled to the thirteenth buffer 250m.

The packetized streams from packetizers 240a through 240k are respectively coupled to buffer 250a through 250k, which are in turn coupled to respective inputs of multiplexer 260. In an embodiment, multiplexer 260 is an MPEG-2 transport multiplexer. While any type of multiplexer can be used to practice the invention, various aspects of the invention are described within the context of an MPEG-2 transport multiplexing system.

As defined in the MPEG-2 specification (formally referred to as the ISO standard 13818-1), a transport stream is a sequence of equal sized packets, with each packet being 188 bytes in length. Each packet includes a 4-byte header and 184 bytes of data. The header contains a number of fields, including a 13-bit PID field that uniquely identifies each packet that contains a portion of a "stream" of video information as well as audio information and data. As such, to decode a particular video stream (or audio or data stream) for viewing or presentation, the decoder in the terminal extracts packets containing a particular PID and decodes those packets to create the video (or audio or data) for viewing or presenting.

In an embodiment, each of the thirteen streams representing a portion of the IPG is uniquely identified by a PID. In an embodiment, the thirteen streams are multiplexed into a single transport stream. Fewer or more IPG streams may be included in the transport stream as bandwidth permits. Additionally, more than one transport stream can be used to transmit the IPG streams.

Multiplexer 260 processes the packetized data stored in each of the 13 buffers 250a through 250m in a particular order (e.g., in a round robin basis, beginning with the 13th buffer 250m and concluding with the first buffer 250a). For the round robin order, transport multiplexer 260 retrieves or "drains" the packetized data stored within the 13th buffer 250m and couples that data to the output stream Tout. Next, the 12th buffer 250l is emptied and the packetized data stored therein is coupled to the output stream Tout. Next, the 11th buffer 250k is emptied and the packetized data stored therein which is coupled to the output stream Tout. The process continues until the 1st buffer 250a is emptied and the packetized data stored therein is coupled to the output stream Tout. The processing flow can be synchronized such that each output buffer includes all the access units associated with an I-picture (250b through 250k) suitable for referencing a GOP, a particular group of P and B pictures (250a) suitable for filling out the rest of the GOP, a particular one or more audio access units (250l), and a related amount of data (250m). The round robin draining process is repeated for each buffer, which has been filled in the interim by new transport packetized streams.

Figure 4:
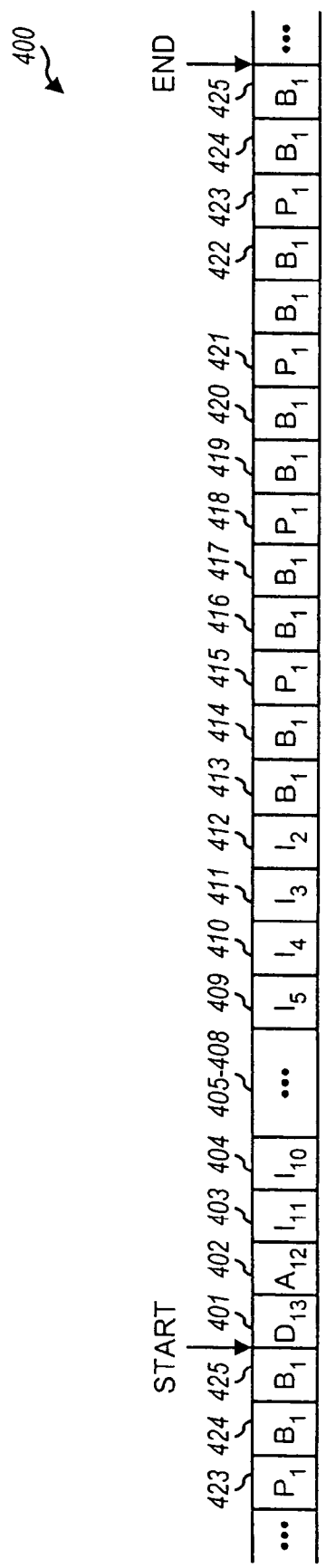
FIG. 4 is a data structure of a transport stream is generated by a head-end.

FIG. 4 depicts a transport stream 400 produced by encoding and multiplexing unit 116 as a result of processing the input streams in a round robin basis. FIG. 4 shows one GOP portion of the transport stream, which is indicated by the "START" and "END" phrases. The GOP starts with data packet 401 assigned with PID13, then an audio packet 402 assigned with PID12, which are followed by I-picture packets 403 through 412 assigned as PID11 through PID-2. The remaining packets 413 through 425 carry the PRED stream with PID1. Packets 423 to 425 in FIG. 4 show the terminating access units of the previous GOP.

Note that the exemplary transport stream and the round robin process are not required for the operation of the invention. The data and audio packets can be placed into different parts of the transport stream, or the sequence of I-picture packets can be provided in a different order. To allow the terminal to decode the transport stream in one pass without storing any packets, the packets for the I-pictures should precede the packets for the PRED pictures in the transport stream. This output order is needed since the reference I-pictures need to be decoded before the predicted pictures. However, a different order can be used if the terminals have the necessary storage capabilities.

In an embodiment, the IPG streams are encapsulated in one multi-program transport stream. Each program in the program map table (PMT) of an MPEG-2 transport stream includes an I-PID (one of the illustrative ten I-PIDs 403 to 412), the PRED stream PID1, data PID13 401, and audio PID12 402. Although multiplexer 260 of FIG. 2 couples a PRED stream access units 413 to 425 to the multiplexer output Tout only once per GOP, the PMT for each program references the same PRED stream PID1. For the illustrative organization of video inputs in FIG. 2, ten programs can be formed with each program consisting of one of the ten I-PIDs 403 to 413, the PRED PID1, the audio PID12, and the data PID13.

In another embodiment, the information packets are formed into a single program and carried with a single-program transport stream. In this embodiment, the complete set of PIDs 401 to 425 is coupled into a single program. In yet another embodiment, multiple transport streams are employed to send the IPG. In this embodiment, each transport stream can be formed as a single program or as multiple programs, with each program comprising an I-PID, the PRED-PID, the data PID, and the audio PID. The information packets in each transport stream are retrieved in a similar manner as for the single transport stream. In yet another embodiment, the information packets are carried in single program multiple transport streams. Thus, a variety of transport stream formats can be employed to carry the generated streams.

B. Receiver

Figure 5:
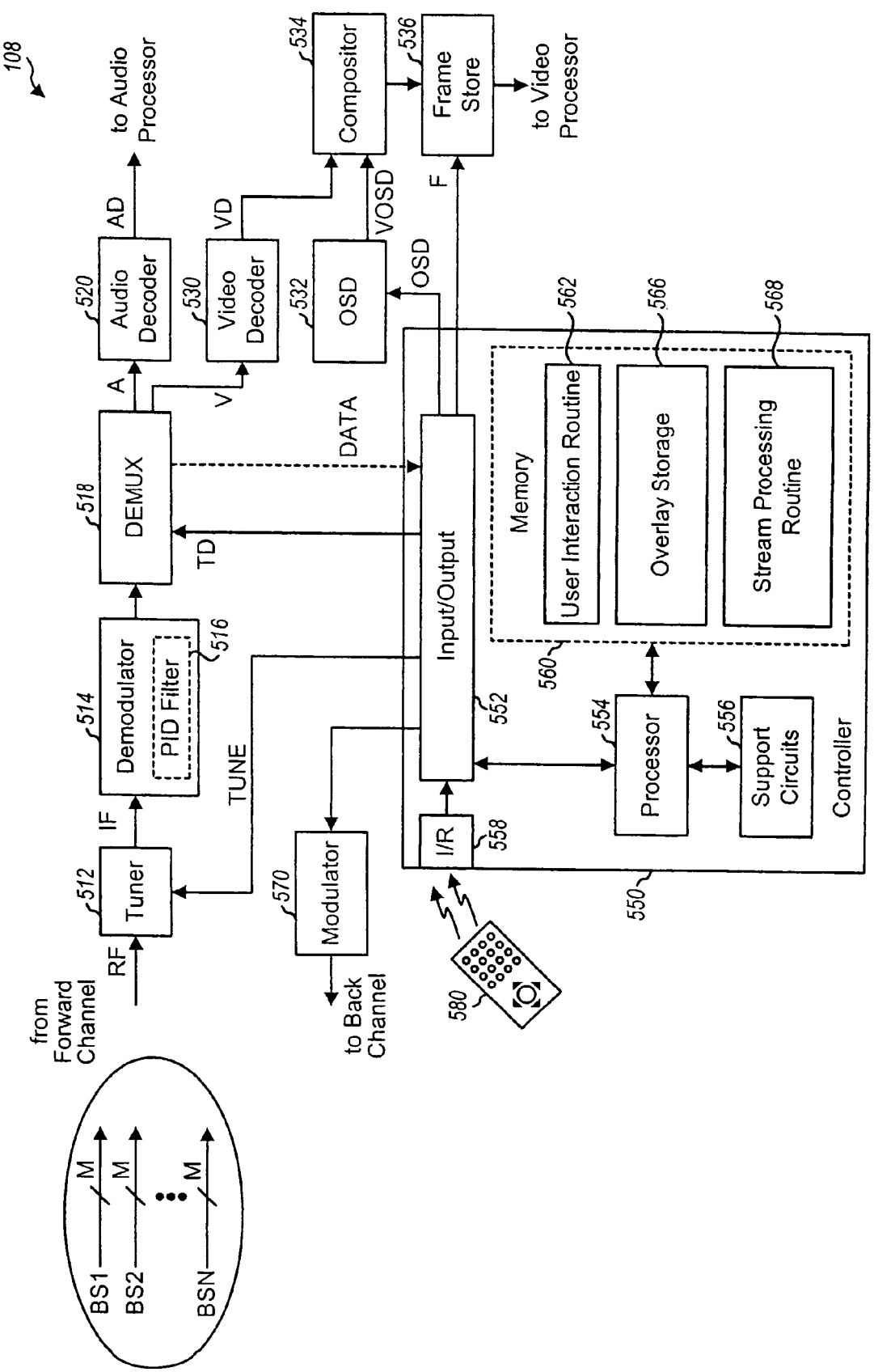
FIG. 5 is a block diagram of a receiver within a subscriber equipment suitable for use in the interactive information distribution system.

FIG. 5 depicts a block diagram of an embodiment of terminal 108 (also referred to as a set top terminal (STT) or user terminal) suitable for producing a display of a user interface in accordance with the invention. Terminal 108 includes a tuner 512, a demodulator 514, a transport demultiplexer 518, an audio decoder 520, a video decoder 530, an on-screen display (OSD) processor 532, a video compositor 534, a frame store memory 536, a controller 550, and a modulator 570. User interaction is provided via a remote control unit 580. Tuner 512 receives, e.g., a radio frequency (RF) signal comprising, for example, a number of quadrature amplitude modulated (QAM) information signals from a downstream (forward) channel. Tuner 512, in response to a control signal TUNE, tunes to and processes a particular QAM information signal to produce an intermediate frequency (IF) information signal. Demodulator 514 receives and demodulates the IF information signal to produce an information stream, illustratively an MPEG transport stream. The MPEG transport stream is provided to a transport stream demultiplexer 518.

Transport stream demultiplexer 518, in response to a control signal TD produced by controller 550, demultiplexes (i.e., extracts) an audio information stream A and a video information stream V. The audio information stream A is provided to audio decoder 520, which decodes the audio information stream and provides a decoded audio information stream to an audio processor (not shown) for subsequent presentation. The video stream V is provided to video decoder 530, which decodes the compressed video stream V to produce an uncompressed video stream VD that is provided to video compositor 534. OSD processor 532, in response to a control signal OSD produced by controller 550, produces a graphical overlay signal VOSD that is provided to video compositor 534. During transitions between streams representing the user interfaces, the buffers in the decoder are not reset. As such, the user interfaces seamlessly transition from one screen to another.

Video compositor 534 merges the graphical overlay signal VOSD and the uncompressed video stream VD to produce a modified video stream (i.e., the underlying video images with the graphical overlay) that is provided to frame store unit 536. Frame store unit 536 stores the modified video stream on a frame-by-frame basis according to the frame rate of the video stream. Frame store unit 536 provides the stored video frames to a video processor (not shown) for subsequent processing and presentation on a display device.

Controller 550 includes an input/output module 552, a microprocessor 554, support circuitry 556, an infrared (IR) receiver 558, and a memory 560. Input/output module 552 forms an interface between controller 550 and tuner 512, transport demultiplexer 518, OSD processor 532, back-channel modulator 570, and remote control unit 580. Microprocessor 554 cooperates with support circuitry 556 such as power supplies, clock circuits, cache memory, and the like as well as circuits that assist in executing the software routines that are stored in memory 560.

Although controller 550 is depicted as a general-purpose processor that is programmed to perform specific interactive program guide control function in accordance with the invention, the controller can be implemented in hardware as an application specific integrated circuit (ASIC). As such, the process steps described herein are intended to be broadly interpreted as being equivalently performed by software, hardware, or a combination thereof.

In the embodiment shown in FIG. 5, remote control unit 580 includes an 8-position joystick, a numeric pad, a "Select" key, a "Freeze" key and a "Return" key. User manipulations of the joystick or keys of the remote control device are transmitted to controller 550 via an infrared (IR) link or an RF link. Controller 550 is responsive to such user manipulations, executes related user interaction routines 562, and uses particular overlays that are available in an overlay storage 566.

Once received, the video streams are recombined via stream processing routine 568 to form the video sequences that were originally compressed. The following describes three illustrative methods for recombining the streams.

1. Recombination Method 1

In the first recombination method, the I-picture stream and the predicted picture streams to be recombined keep their separate PIDs until the point where they are depacketized. The recombination process is conducted within the transport demultiplexer of the terminal. For illustrative purposes, in a multi-program transport stream, each program consists of an I-PID for the I-picture, the PRED-PID for the predicted pictures, an audio PID, and a data PID. Any packet with a PID that matches any of the PIDs within the desired program (as identified in a program mapping table) are depacketized and the payload is sent to the video decoder. Payloads are sent to the decoder in the order in which the packets arrive at the demultiplexer.

Figure 6:
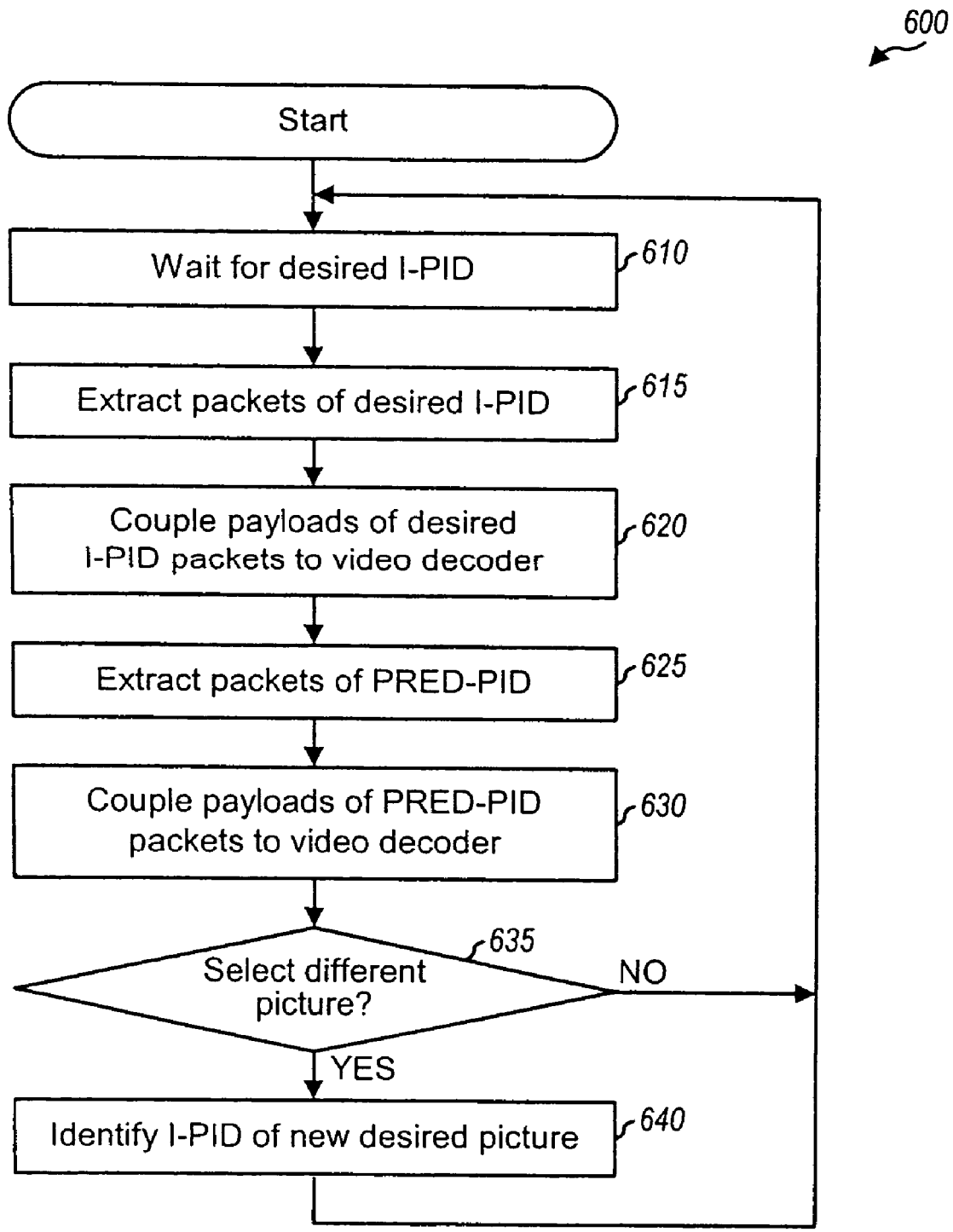
FIGS. 6-8 are flow diagrams of the first, second, and third methods, respectively, for recombining and decoding streams.

FIG. 6 is a flow diagram of an embodiment of a first recombination process 600. At step 610, the process waits for a (viewer) selection for a picture (e.g., a particular IPG page) to be received. The I-PID for the selected picture, as the first picture of a video stream's GOP, identifies the stream to be received. A packet having the identified I-PID is then detected.

At step 615, the I-PID packets are extracted from the transport stream, including the header information and data, until the next picture start code. The header information within the first received I-PID access unit includes a sequence header, a sequence extension, a group start code, a GOP header, a picture header, and a picture extension, which are known to a reader that is skilled in MPEG-1 and MPEG-2 compression standards. The header information in the next I-PID access unit that belongs to the second and later GOPs includes the group start code, the picture start code, the picture header, and an extension. At step 620, the payloads of the packets that include header information related to the video stream and the intra-coded picture are coupled to the video decoder as video information stream V.

At step 625, the predicted picture packets PRED-PID (e.g., PID1 in FIG. 2) for fourteen predictive-coded pictures in a GOP of size fifteen are extracted from the transport stream. At step 630, the payloads of the packets that include the header information related to the video stream and the predicted picture data are coupled to the video decoder as video information stream V. At the end of step 630, a complete GOP, including the I-picture and predicted pictures, are available to the video decoder. As the payloads are sent to the decoder in the order in which the packets arrive at the demultiplexer, the video decoder decodes the recombined stream with no additional recombination processing.

At step 635, a query is then made whether a different picture is requested, (e.g., a new IPG is selected). If a different picture is not requested, then the process returns to step 610 and the demultiplexer waits for the next packets having the PID of the desired I-PID. Otherwise, if a different picture is requested, then the I-PID of the new desired picture is identified at step 640, and the process returns to step 610.

The process shown in FIG. 6 can be used to produce an MPEG-compliant video stream V by recombining the desired I-picture and the predicted pictures from the GOP structure.

2. Recombination Method 2

In the second method for recombining the video stream, the transport stream is modified using a PID filter. The PID filter can be implemented as part of the demodulator, as shown in FIG. 5, or as part of the demultiplexer.

For illustrative purposes, in a multi-program transport stream, each program can include an I-PID for the I-picture, the PRED-PID for the predicted pictures, an audio PID, and a data PID. Any packet with a PID that matches any of the PIDs in the desired program, as identified by the program mapping table (PMT) has its PID modified to the lowest PID in the program (the PID that is referenced first in the program's PMT). As a specific example, a program can include an I-PID of 50 and a PRED-PID of 51. For this program, the PID-filter modifies the PRED-PID to 50 and thereby, the I and predicted access units attain the same PID number and become a portion of a common stream. As a result, the transport stream from the PID filter contains a program with a single video stream having packets that appear in the proper order to be decoded as valid MPEG bitstream.

Note that the incoming bit stream does not necessarily contain any packets with a PID equal to the lowest PID referenced in the program's PMT. Also note that it is possible to modify the PIDs to other PID numbers than lowest PID without changing the operation of the process.

When the PIDs of incoming packets are modified to match the PIDs of other packets in the transport stream, the continuity counters of the merged PIDs may become invalid at the merge points, since each PID has its own continuity counter. For this reason, the discontinuity indicator in the adaptation field is set for any packets that may immediately follow a merge point. Any decoder components that check the continuity counter for continuity properly processes the discontinuity indicator bit.

Figure 7:
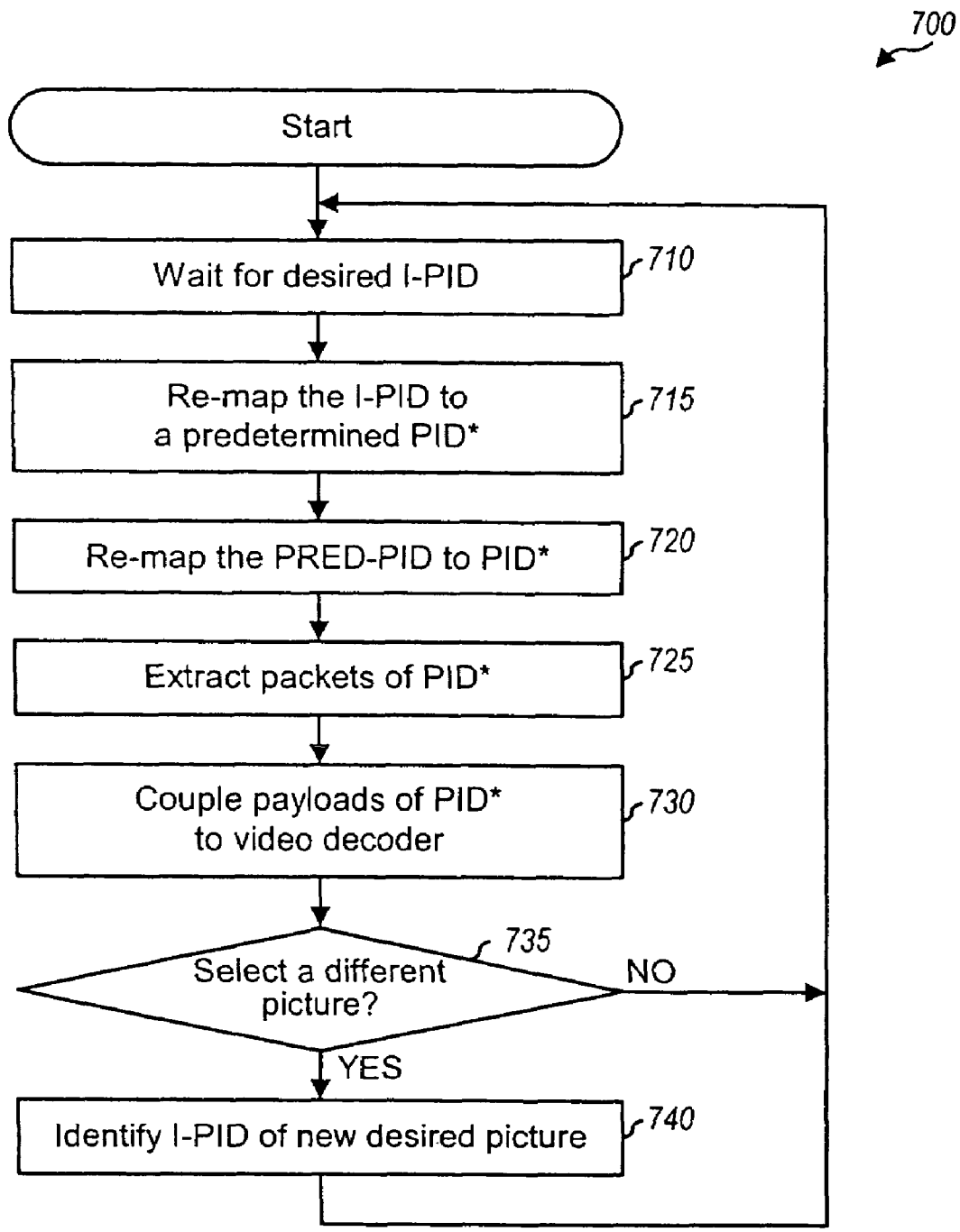

FIG. 7 is a flow diagram of an embodiment of a second recombination process 700. At step 710, the process waits for a (viewer) selection an I-PID to be received. The I-PID, comprising the first picture of a video stream's GOP, identifies the stream to be received. A packet having the selected I-PID is then detected.

At step 715, the PID of the I stream is re-mapped to a particular number (e.g., PID*). At this step, the PID filter modifies all PIDs of the desired I-stream packets to PID*. At step 720, the PID number of the predicted pictures (PRED-PID) is also re-mapped to PID* by the PID filter, which modifies all PIDs of the PRED-PID packets to PID*.

At step 725, the packets of the PID* stream are extracted from the transport stream by the demultiplexer. At step 730, the payloads of the packets that include the video stream header information and the I and predicted picture data are coupled to the video decoder as video information stream V. It should be noted that the packets are ordered in the transport stream in the same order as they are to be decoded.

At step 735, a query is made whether a different picture (e.g., another IPG page) is requested. If a different picture is not requested, then the process returns to step 710 where the demultiplexer waits for the next packets having the identified I-PID. Otherwise, if a different picture is requested, then the I-PID of the new desired picture is identified at step 740 and the process returns to step 710.

The process shown in FIG. 7 is used to produce an MPEG-compliant video stream by merging the I stream and predicted stream before the demultiplexing process.

3. Recombination Method 3

The third recombination method accomplishes MPEG bitstream recombination by using splicing information in the adaptation field of the transport packet headers and by switching between video PIDs based on splice countdown concept.

In the third recombination method, the MPEG streams signal the PID-to-PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive another video PID. It should be noted that special attention to splicing syntax is required for systems that use splicing for other purposes.

Figure 8:
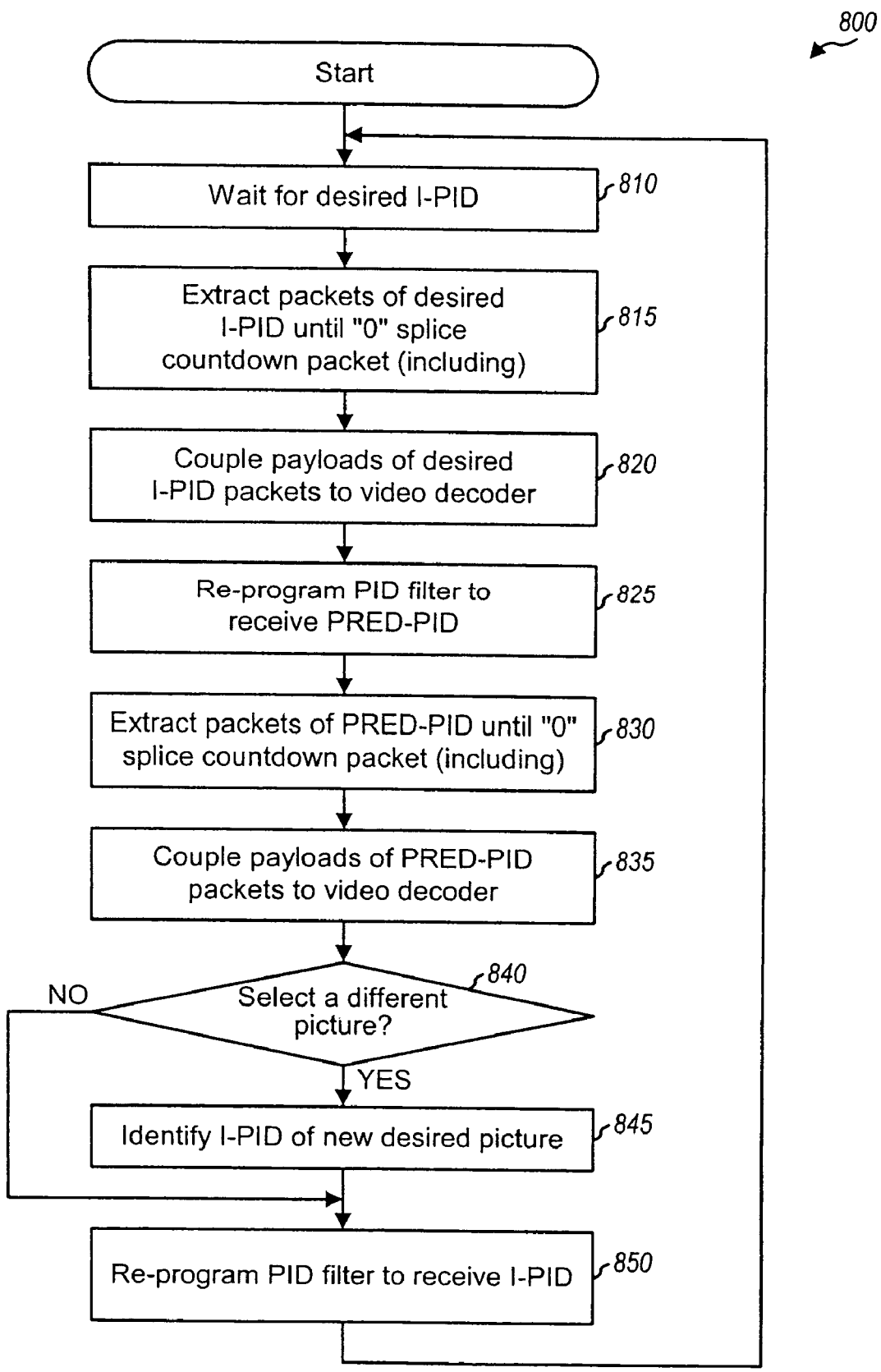

FIG. 8 is a flow diagram of an embodiment of a third recombination process 800. At step 810, the process waits for a (viewer) selection of the I-PID to be received for the desired IPG page. The I-PID, comprising the first picture of a stream's GOP, identifies the stream to be received. A packet having the selected I-PID is then detected.

At step 815, the I-PID packets are extracted from the transport stream until, and including, the I-PID packet with a slice countdown value of zero. At step 820, the payloads of the packets that include the header information related to the video stream and the intra-coded slices are coupled to the video decoder as video information stream V.

At step 825, the PID filter is re-programmed to receive the predicted picture (PRED-PID) packets. At step 830, the predicted picture packets (e.g., PID1 in FIG. 2) are extracted from the transport stream. At step 835, the payloads of the packets that include the header information related to the video stream and the predictive-coded pictures are coupled to the video decoder. At the end of step 835, a complete GOP, including the I-picture and the predicted picture data are coupled to the video decoder as video stream V. As the payloads are sent to the video decoder in the order in which the packets arrive at the demultiplexer, the video decoder decodes the recombined stream with no additional recombination processing.

At step 840, a query is made whether a different picture (e.g., another IPG page) is requested. If a different picture is not requested, the process proceeds to step 850 where the PID filter is re-programmed to receive the previous desired I-PID. Otherwise, if a different picture is requested, then the I-PID of the new desired picture is identified at step 845 and the process proceeds to step 850 where the PID filter is re-programmed to receive the new I-PID. The process then returns to step 810, where the demultiplexer waits for the next packets having the PID of the desired picture.

The process shown in FIG. 8 can be used to produce an MPEG-compliant video stream, where the PID-to-PID switch is performed based on a splice countdown concept.

C. Interactive Program Guide

Figure 9:
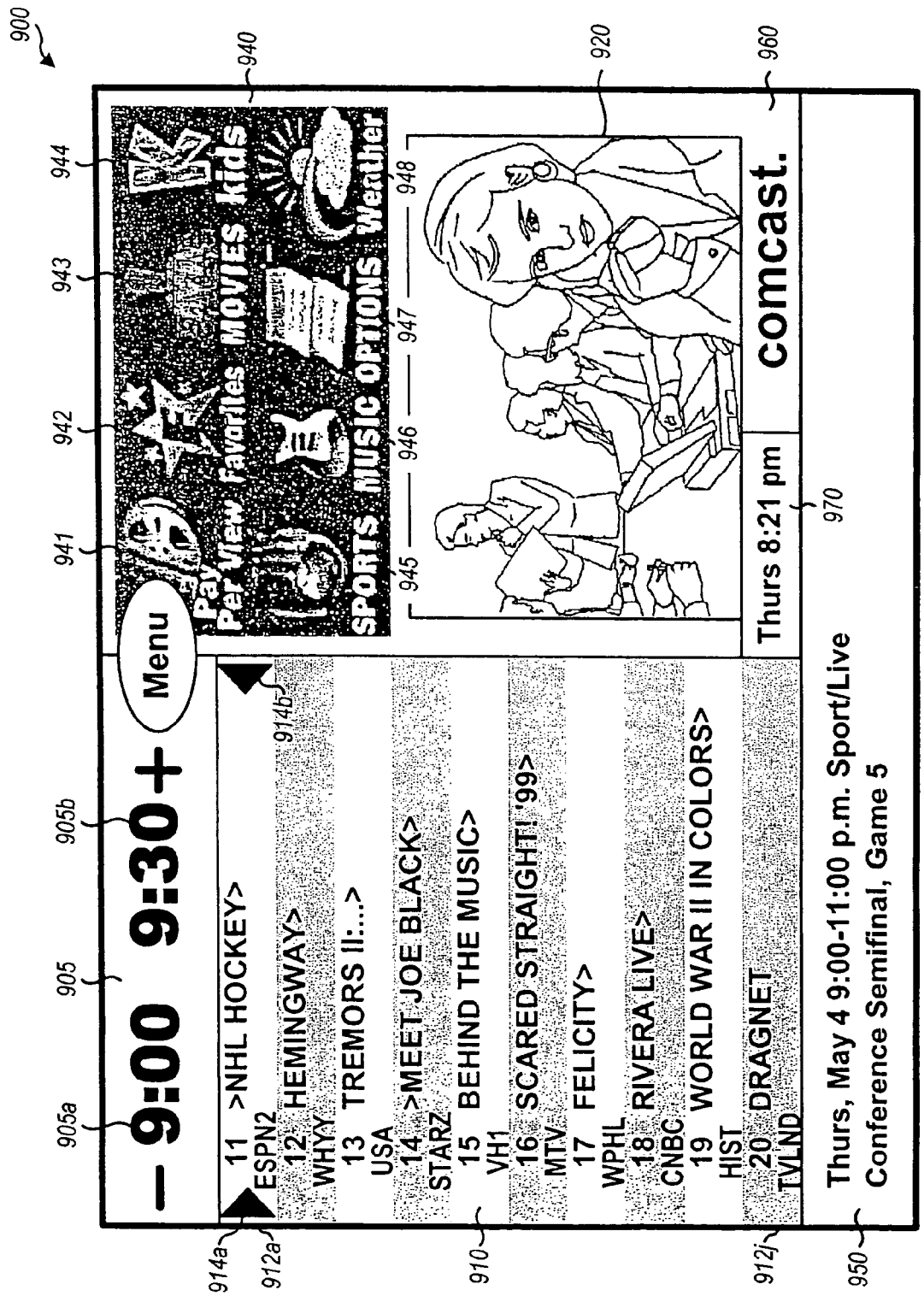
FIG. 9 is an example of one picture taken from a video sequence that can be encoded using the invention.

FIG. 9 depicts an example of an IPG page 900 in accordance with an embodiment of the invention. In the specific embodiment shown in FIG. 9, IPG page 900 includes a time slot region 905, a guide region 910, a video region 920, an icon region 940, a program description region 950, a logo region 960, and a date/time region 970. Other designs for the IPG page with different layouts, configurations, and combinations of regions and objects can be contemplated and are within the scope of the invention.

Time slot region 905 includes a first time slot object 905a and a second time slot object 905b that indicate the time slots for which program guide is being provided on the IPG page. Guide region 910 is used to display program listing for a group of channels. In the embodiment shown in FIG. 9, the program listing shows the available programming in two half-hour time slots. Guide region 910 thus includes a number of channel objects 912a through 912j used to display channel information for the listing of channels. Guide region 910 further includes a pair of channel indicators 914a and 914b that identifies the current cursor location.

Program description region 950 is used to present descriptive information relating to a particular program selected from the program listing, or may be used to show other information. Video region 920 may be used to display images, videos, text, or a combination thereof, which may be used for advertisements, previews, or other purposes. Video region 920 may be implemented as described above in a server-centric manner. Logo region 960 may include a logo of a service operator or other entity and may be optionally displayed. Date/time region 970 may be configurable by the user and may also be optionally displayed.

Icon region 940 is used to display various icons, which may be created and/or enabled by the user. Each icon in icon region 940 can represent a filter or a link to another IPG page or a particular interface. Each filter selects a particular type of programming to be included in the program listing shown in guide region 902. For example, a Pay Per View (PPV) icon 941 may be a filter that selects only PPV programming to be included in the program listing. A Favorites icon 942 may be a filter that selects only channels designated by the user to be among his or her favorites. A Movies icon 943 may be a filter that selects only movies or movie channels. A Kids icon 944 may be a filter that selects only channels for children or programming appropriate or produced for viewing by children. A Sports icon 945 may be a filter that selects only sports channels or sports-related programming. A Music icon 946 is a link to a music interface. An Options icon 947 may also be a link to a menu of IPG options that the user may select amongst. Such options may include (1) configuration and selection/deselection information of IPG related services, (2) custom information such as deactivating some of the filters or accessing the custom condensed listing menus, and other features and functionality. A Weather icon 948 may be a link to an interface to weather information.

In a system, illustratively, comprising 100 channels of information, the channels can be displayed in 10-channel groups having associated with them two half-hour time slots. In this organization, ten or more video PIDs can be provided to send the present-time channel/time/title information, one or more audio PIDs can be provided to send the audio barker, and/or one or more data PIDs (or other data transport method) can be provided to send the program description data, overlay data, and the like. To fully broadcast interactive program information for up to 24 hours in advance, 240 (e.g., 10•24) or more video PIDs can be provided, along with one or more audio PIDs and, optionally, one or more data PIDs.

The time depth of a program guide is defined by the amount of time programming is provided for in the broadcast video PIDs for a particular channel group. The channel depth of the program guide is defined by the number of channels available through the guide (as compared to the total number of channels in the system). In a system providing only half of the available channels via the broadcast video PIDs, the channel depth 50%. In a system providing 12 hours of "look-ahead" time slots, the time depth is 12 hours. In a system providing 16 hours of "look-ahead" time slots and 4 hours of "look-back" time slots, the time depth is +16/−4 hours.

The video streams representing the IPG are sent in one or more transport streams, within the form of a single or multi-program as described below. A user desiring to view the next 1-hour time interval (e.g., 10:00-11:00) may activate a "scroll right" object (or move the joystick to the right when a program within guide region 910 occupies the final displayed time interval). Such activation results in a controller within the terminal noting that a new time interval is desired. The video stream for the new time interval is then decoded and displayed. If the desired video stream is within the same transport stream (i.e., another PID), then the video stream is simply decoded and presented. If the desired video stream is within a different transport stream, then that transport stream is extracted from the broadcast stream and the desired video stream is decoded and presented. And if the desired transport stream is within a different broadcast stream, then that broadcast stream is tuned, the desired transport stream is extracted, and the desired video stream is decoded and presented.

A viewer interaction requesting a prior time interval or a different set of channels results in the retrieval and presentation of the desired video stream. If the desired video stream is not part of the broadcast video streams, then a pointcast or demand-cast session, for example, may be initiated as described in U.S. patent application Ser. No. 09/539,228, entitled "MESSAGING PROTOCOL FOR DEMAND-CAST SYSTEM AND BANDWIDTH MANAGEMENT," filed Mar. 30, 2000, assigned to the assignee of the invention and incorporated herein by reference. For this pointcast session, the terminal sends a message to the head-end via a back channel requesting a particular stream. The head-end processes the request, retrieves the desired stream from an information server, and incorporates the stream within a transport stream as another video PID. Preferably, the desired stream is inserted into the transport stream currently being tuned/selected by the terminal. The head-end further informs the terminal which PID should be received and from which transport stream it should be demultiplexed. The terminal then retrieves the desired video PID. If the video PID is within a different transport stream, the terminal first demultiplexes that transport stream (possibly by tuning a different broadcast stream within the forward channel).

Upon completion of the viewing of the desired stream, the terminal can indicate to the head-end that it no longer needs the stream. In response, the head-end can tear down the pointcast or demand-cast session. The terminal can then return to the broadcast stream from which the pointcast session was launched.

Slice-Level Processing

D. Encoding

Various data structures can be used to represent data for the IPG and various encoding schemes can be used to encode the IPG pages such as the one shown in FIG. 9. For an interactive information distribution system, program guide data may be processed and sent over a number of elementary streams. Each elementary stream carries a video sequence comprised of a sequence of pictures. Each picture can include a combination of textual and video information (e.g., text on the left side of the picture and video on the right side). Depending on the particular implementation and operation of the interactive information distribution system, some of the pictures may include common (i.e., redundant) information. The invention provides a number of efficient data structures for use in a number of IPG applications to reduce the amount of data needed to represent a group of video sequences having some common textual and/or video information.

1. Data Structures

Figure 10A:
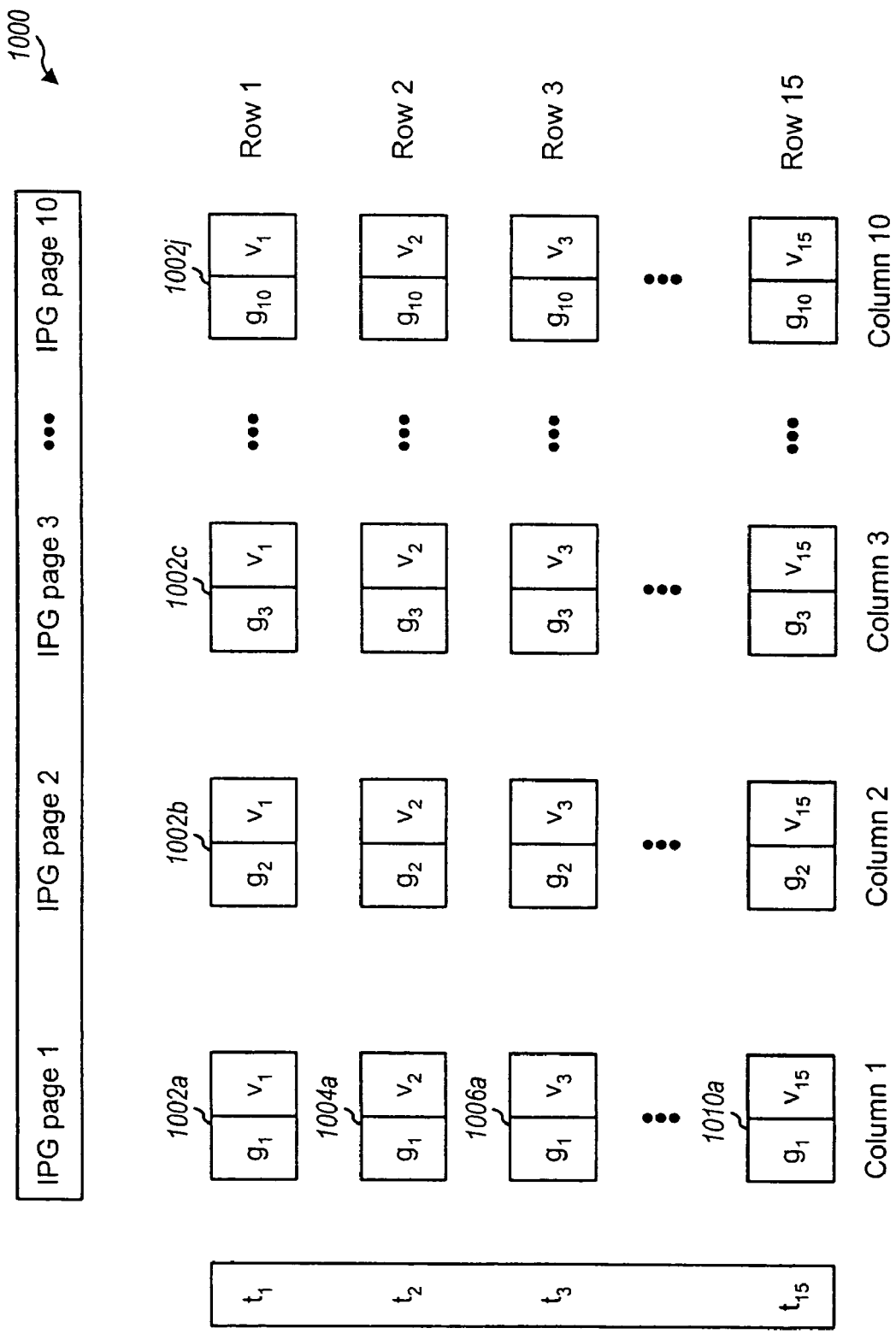
FIGS. 10A-10C are matrix representations of program guide data with various data groupings for efficient encoding in accordance with the invention.

FIG. 10A depicts a matrix representation 1000 of program guide data for a group of IPG pages. In this representation, the horizontal axis represents the video sequences to be transmitted, and the vertical axis represents time indices for the video sequences. In this specific example, ten video sequences are generated and labeled as IPG pages 1 through 10. Each video sequence is composed of a time sequence of pictures. In this specific example, 15 time indices are shown on the vertical axis and labeled as $t_1$ through $t_{15}$. Each group of 15 pictures for each video sequence forms a group of pictures (GOP) for that video sequence.

As shown in FIG. 10A, the program guide data is represented using a matrix 1000 that is a two-dimensional array of elements. In the embodiment shown in FIG. 10A, each element of matrix 1000 includes two regions (or portions)—a guide portion and a video portion. For example, the element in the first column of the first row represents the guide portion ($g_1$) and video portion ($v_1$) of IPG page 1 at time index $t_1$, the element in the second column of the first row represents the guide portion ($g_2$) and video portion ($v_1$) of IPG page 2 at time index $t_1$, and so on.

Matrix 1000 in FIG. 10A is illustratively shown to include ten GOPs for ten IPG pages. However, matrix 1000 can be designed to have any defined dimension (i.e., an M×N dimension, where M is the number of IPG pages or video sequences and N is the number of pictures in the GOP, and M and N can each be any integer one or greater).

In the specific example shown FIG. 10A, the guide portion for each IPG page is different but the video portion is common for all ten IPG pages. Thus, the guide portion index ($g_1$, $g_2$, ..., $g_{10}$) increases in number, corresponding to the IPG pages, as the matrix is traversed across the horizontal axis. Because the video portion is common for all IPG pages, the video portion index (e.g., $v_1$) remains constant as the matrix is traversed in the horizontal axis. In this example, the guide portion is static over the GOP but the video portion changes over time (e.g., for a moving video). Thus, the guide portion index remains constant as the matrix is traversed in the vertical time axis, but the video portion index changes with the time index.

As noted above, each of the ten video sequences in FIG. 10A includes 15 pictures that can be coded as a group of pictures. For example, the video sequence for IPG page 1 can be encoded as a GOP comprised of the 15 coded pictures: I1, B1, B1, P1, B1, B1, P1, B1, B1, P1, B1, B1, P1, B1, and B1, where I represents an intra-coded picture, P represents a un-directionally predictive-coded picture, and B represents a bi-directionally predictive coded picture.

Figure 10B:
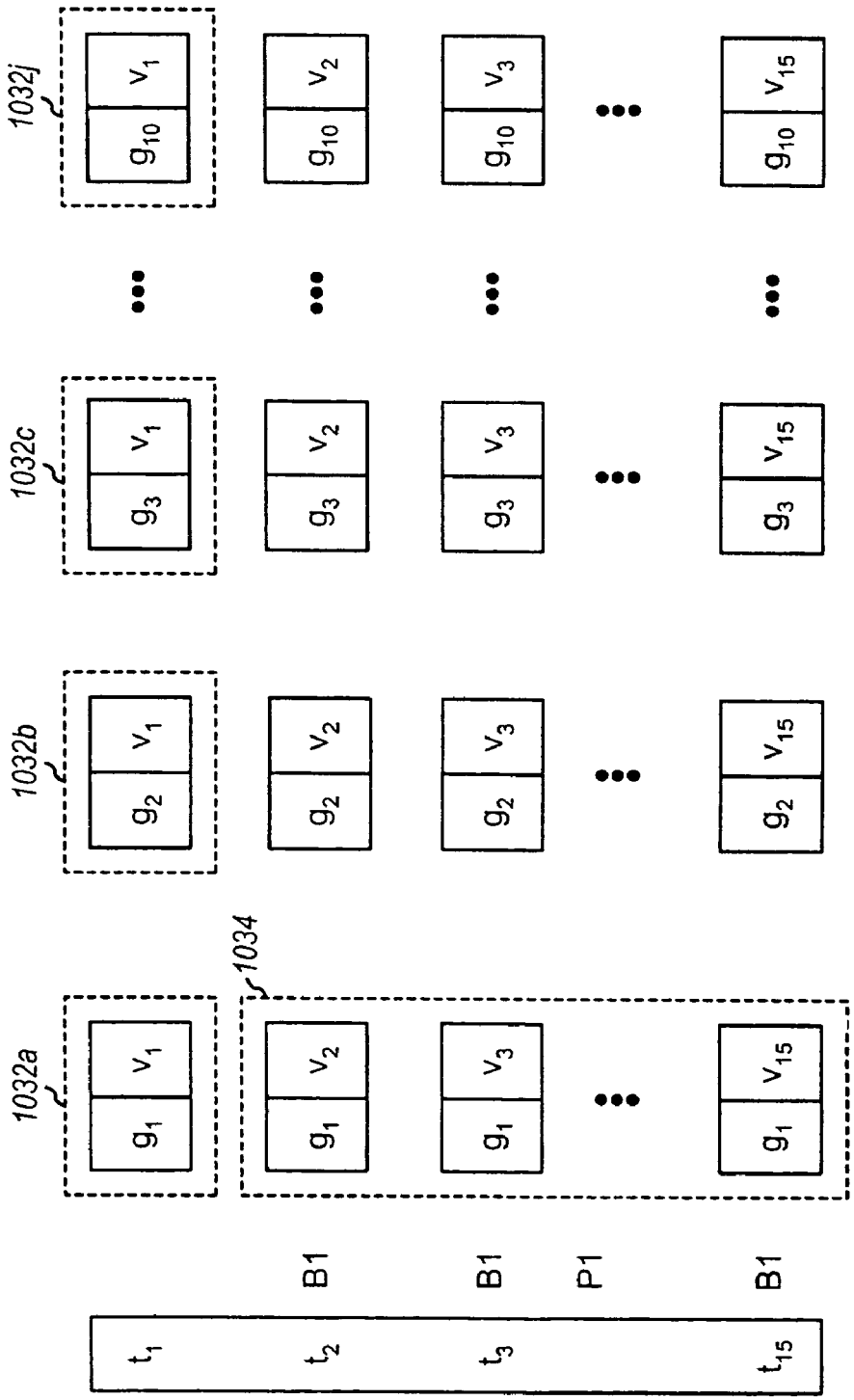

FIG. 10B depicts an embodiment of a data structure 1030 that can be used to reduce the amount of data to be coded and delivered to the terminals. Data structure 1030 includes a group of intra-coded pictures 1032 and a group of predictive-coded pictures 1034 that can be used to fully represent the data in data structure 1030. In an embodiment, intra-coded picture group 1032 includes ten intra-coded pictures at time index $t_1$, for the ten IPG pages. These intra-coded pictures can be assigned to I-PIDs 1 through 10. The I-PID for IPG page 1 includes the guide portion ($g_1$) and the video portion ($v_1$), the I-PID for IPG page 2 includes the guide portion ($g_2$) and the video portion ($v_1$), and so on. In an embodiment, predictive-coded picture group 1034 includes 14 predictive-coded pictures of one of the IPG pages for time indices $t_2$ through $t_{15}$. The predictive-coded picture group 1034 is also assigned a PID (e.g., base-PID or PRED-PID). For example, if IPG page 1 is the selected picture as shown in FIG. 10B, the base-PID may comprise the following picture sequence: B1, B1, P1, B1, B1, P1, B1, B1, P1, B1, B1, P1, B1, and B1.

Using data structure 1030 shown in FIG. 10B, instead of processing all 150 pictures for matrix 1000, the number of pictures to be coded and delivered reduces to 24. This reduction in transmitted data is achieved without loss of information. The reduction in the required bit rate can be computed for a specific example in which 40 percent of a GOP's bits is assigned to an I-picture (e.g., the I-PID) and the remaining 60 percent is assigned to the 14 remaining P and B-pictures (e.g., the base-PID). Data structure 1030 can then reduce the relative bit rate from 1500 (i.e., 10 I-pictures×40+10 base-PID× 60=1000) down to 460 (i.e., 10 I-pictures×40+1 base-PID× 60=460). The reduction in bit rate can then be used to transmit more video sequences (e.g., more IPG pages) with the same common video portion.

If a viewer wants to view the guide data for a particular group of channels, a demultiplexer at the terminal selects the related I-PID and recombines the selected I-PID with the base-PID to produce a recombined stream, which is then decoded by the video decoder.

Figure 10C:
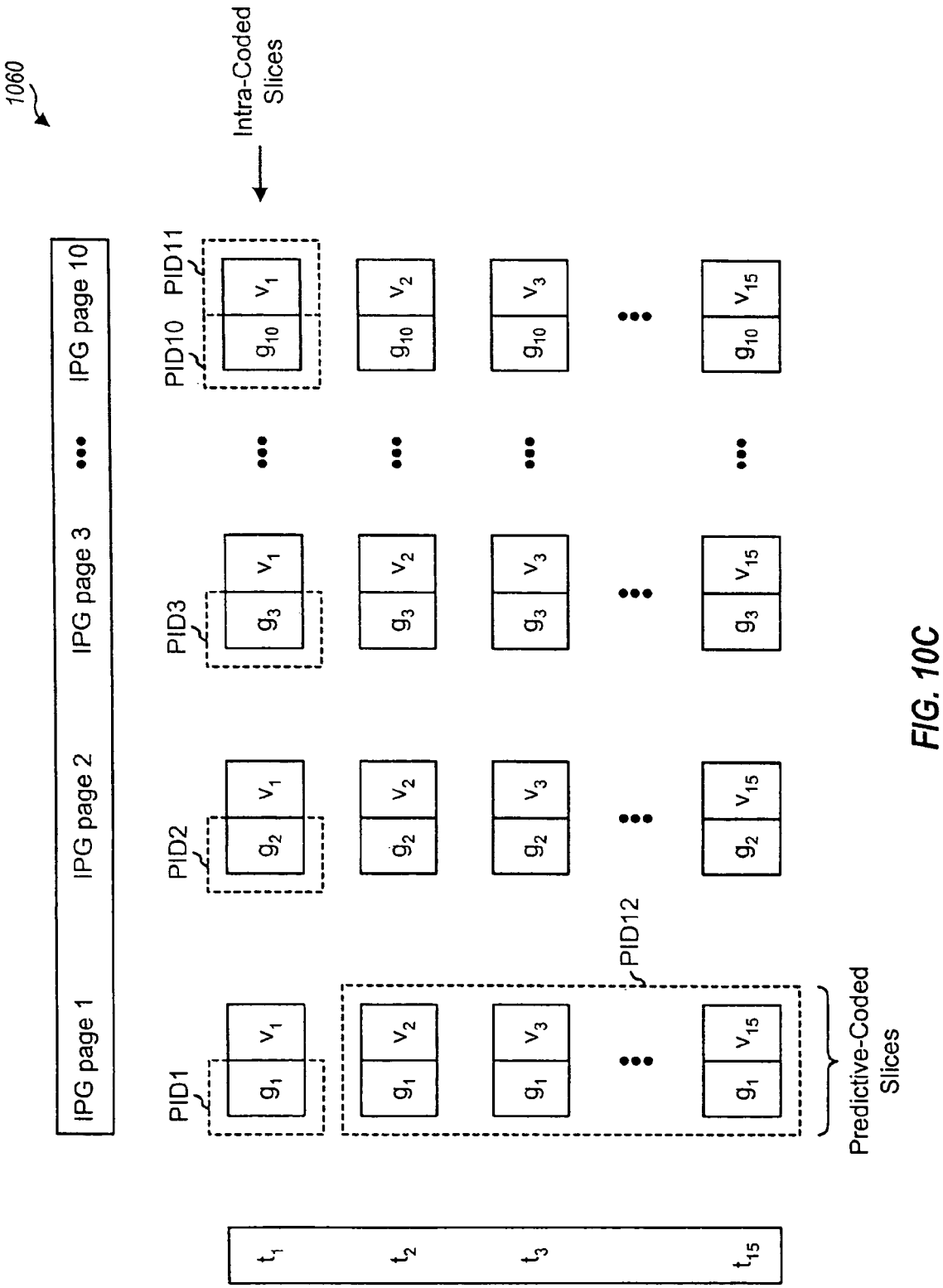

FIG. 10C depicts an embodiment of a data structure 1060 that can be used to further reduce the amount of data to be coded and delivered to the terminals. In the illustrated example, ten IPG pages are available, with each page represented by a guide portion (g) and a common video portion (v). For example, IPG page 1 is represented by $g_1/v_1$, IPG page 2 is represented by $g_2/v_1$, and so on. In data structure 1060, ten guide portions $g_1$ through $g_{10}$ are associated with the first video portion ($v_1$). Each portion can be slice-based encoded as described below.

FIG. 10C also illustrates an exemplary assignment of PIDs to various portions of the IPG pages. In FIG. 10C, only the content that is assigned a PID is delivered to the terminals. The intra-coded guide portions $g_1$ through $g_{10}$ are assigned to PID1 through PID10, respectively. One of the common intra-coded video portion $v_1$ (e.g., IPG page 10) is assigned to PID11. In this form, substantial bandwidth saving is achieved by delivering the intra-coded video portion $v_1$ only once. Finally, the predictive-coded pictures $g_1/v_2$ through $g_1/v_{15}$ are assigned to PID12. As shown in FIG. 10C, a substantial saving in bandwidth is achieved by transmitting only one group of fourteen predictive-coded pictures, $g_1/v_2$ through $g_1/v_{15}$. The PID assignment and decoding processes are described in further detail below.

The matrix representations described in FIGS. 10A through 10C may be used to represent program guide data with different contexts such broadcast, narrowcast, pointcast, shared pointcast, and others.

E. Slice-Level Processing

1. Encoding Slices

To enhance error recovery, the MPEG-2 standard contemplates the use of a "slice layer" in which a video picture is divided into one or more slices. A slice contains a sequence of one or more contiguous macroblocks. The sequence can begin and end at any macroblock boundary within a picture. An MPEG-2 decoder, when provided a corrupted bitstream, uses the slice layer to avoid reproducing a completely corrupted picture. For example, if a corrupted bitstream is decoded and the decoder determines that the present slice is corrupted, the decoder skips to the next slice and begins decoding. As such, only a portion of the reproduced picture is corrupted.

In accordance with the MPEG-2 standard, each slice includes one or more macroblocks. (A picture may consist of 27 rows and 22 columns of macroblocks.) Each macroblock is defined as a rectangular group of picture elements (pixels). A slice may start at any macroblock location in a picture and extend from left-to-right and top-to-bottom through the picture. The stop point of a slice can be chosen such that any macroblock can be the start or end boundary. The slice layer syntax and its use in forming an MPEG-2 bitstream is known to those skilled in the art and not described herein.

In accordance with an aspect of the invention, the IPG pages can be encoded at the slice layer to achieve greater flexibility in the encoding process and improved compression efficiency. A slice-based encoding system enables the guide and video of the IPG to be efficiently coded and flexibly transmitted, as described below. Consequently, a viewer can easily and quickly move from one IPG page to another.

The slice-based encoding technique separately encodes the guide and video portions of the IPG page. As such, the guide and video portions can each be represented by one or more different slices.

Figure 11:
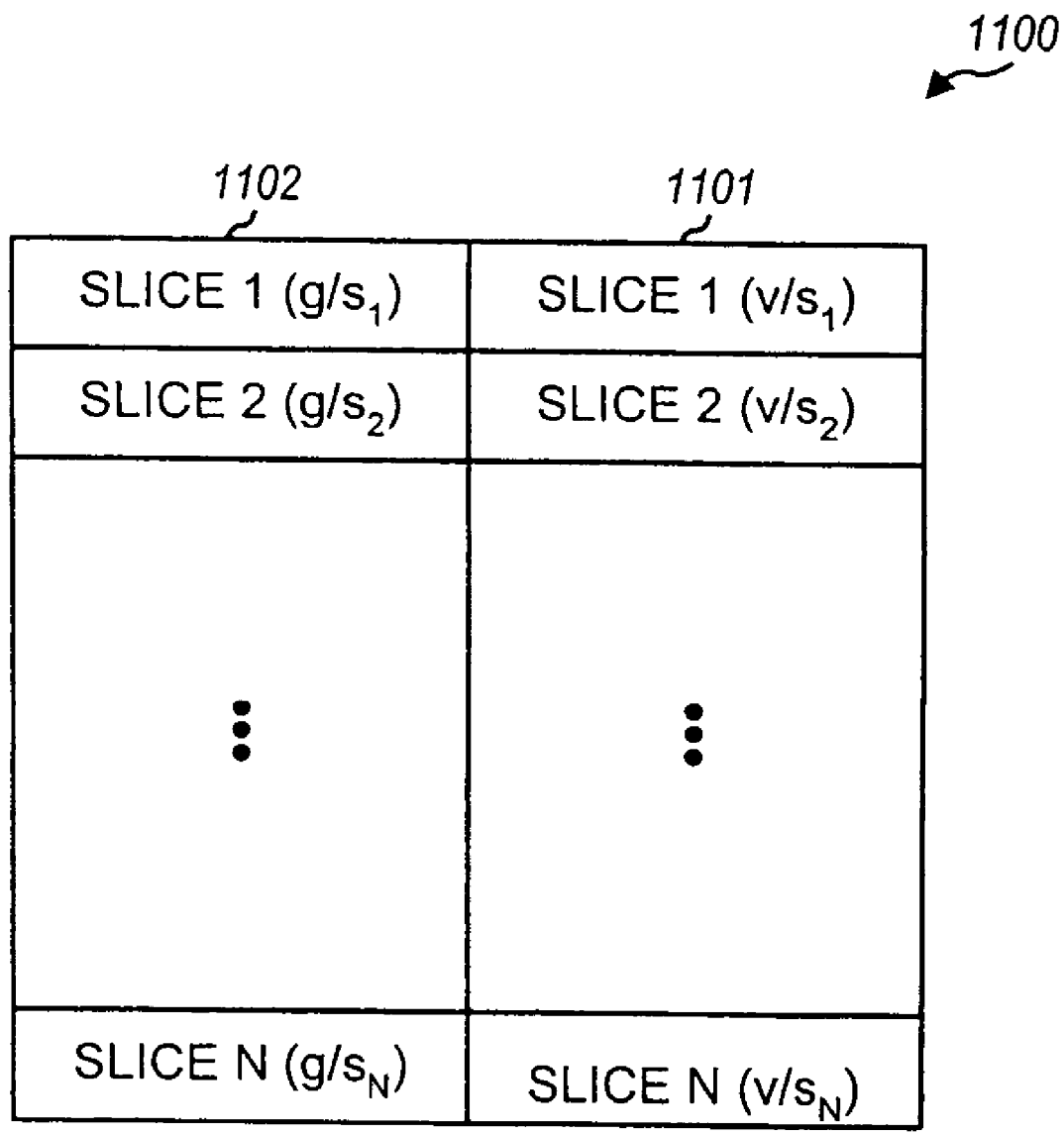
FIG. 11 is a diagram of an embodiment of a slice division of an IPG page.

FIG. 11 illustrates an exemplary slice division of IPG page 900 shown in FIG. 9 in which the guide portion and the video portion are each divided into N slices (e.g., $g/s_1$ through $g/s_N$ for the guide portion, and $v/s_1$ through $v/s_N$ for the video portion). Each slice includes a number of macroblocks. For example, if there are 22 macroblocks per row for the IPG page, then each portion may include 11 macroblocks per row.

The slices in the guide portion can be pre-encoded to form a "slice form grid page" database that contains a number of encoded slices of the guide portion. In this implementation, the guide slices can be recalled from the database and flexibly combined with the separately encoded video slices to form the IPG page. Alternatively, the encoding process for the guide portion can also be performed real-time during the broadcast process. The IPG is transmitted to the local neighborhood equipment and, ultimately, to the terminals. The local neighborhood equipment may be designed and operated to assemble the IPG data for the neighborhood, as described below.

Although the following description of the slice-based encoding technique is presented in the context of IPG, slice-based encoding is equally applicable to a broad range of applications, such as broadcast video-on-demand, e-commerce, Internet, video education services, and others. Slice-based encoding is especially advantageous for delivery of video sequences with common content.

Figure 13:
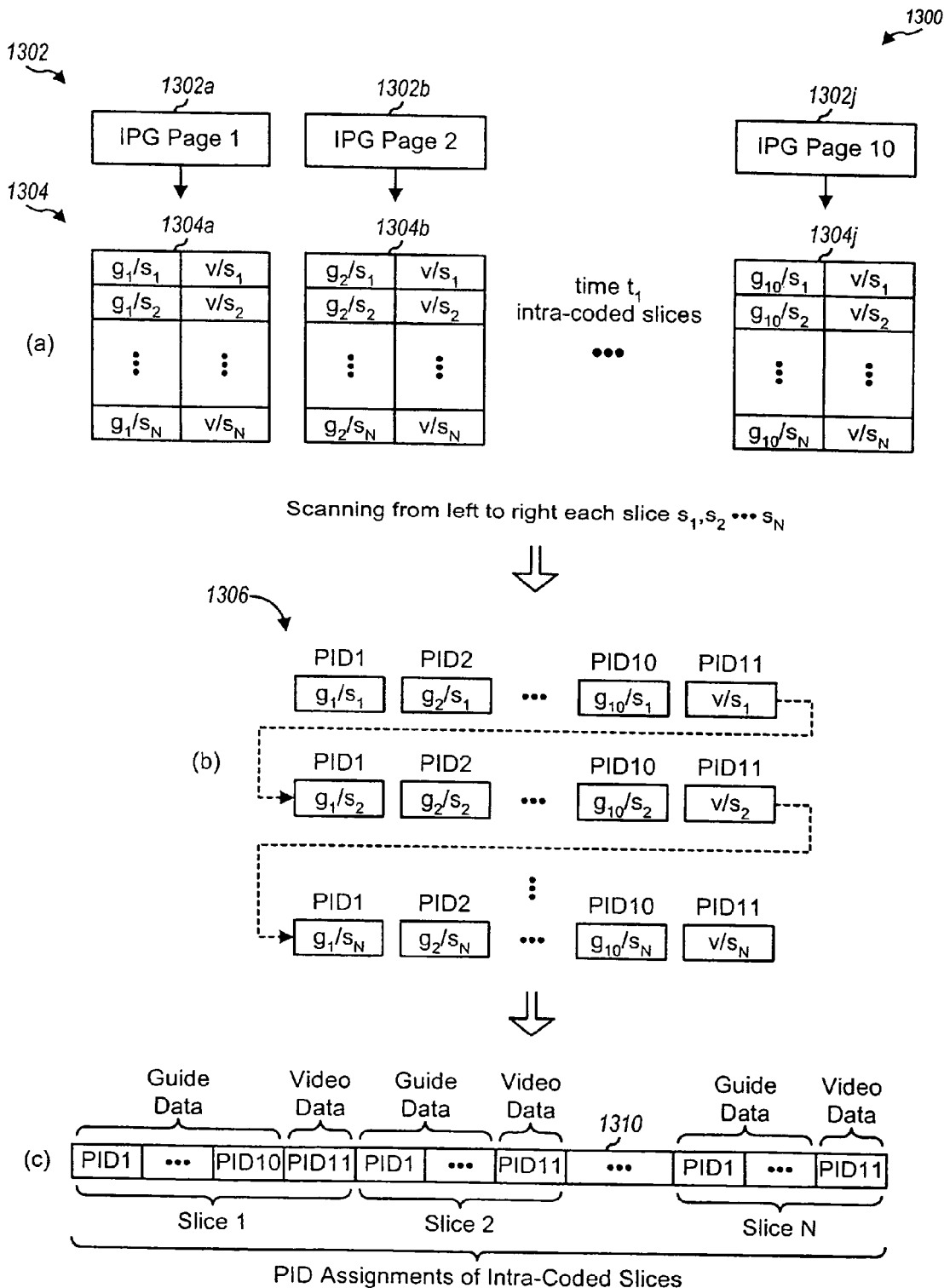
FIG. 13 is a flow diagram of a process for generating a portion of transport stream containing intra-coded video and graphics slices.

FIG. 13 depicts a process 1300 that can be used to form a bitstream 1310 that includes the intra-coded slices encoded at time index $t_1$ in FIG. 10C. At step 1302, a number of IPG pages 1302a through 1302j are provided to the encoding unit. At step 1304, each IPG page is slice-based encoded to form, for example, the guide portion slices $g_1/s_1$ through $g_1/s_N$ and the video portion slices $v/s_1$ through $v/s_N$ for the IPG page.

The slice-based encoding process for the guide and video portions can be performed based on various encoding schemes. For example, the guide slices can be pre-encoded by a software MPEG-2 encoder or encoded by the same encoder used to encode the video portion. If the same encoder is employed, the parameters of the encoding process can be adjusted dynamically for the two portions. Regardless of the encoder implementation and encoding parameters, each portion is encoded independently. In encoding the video portion, the encoding can be performed assuming a full picture size (i.e., a picture covering both the guide and video portions) with the guide portion of the full picture being padded with null data. Step 1304 is performed at the head-end.

At step 1306, the encoded guide and video portion slices are sent to the local neighborhood equipment. If the local neighborhood equipment is implemented as part of the head-end, then the encoded slices are delivered to the local neighborhood equipment in a packetized elementary stream (PES) format or a similar format as the output of the video encoders. If the local neighborhood equipment is implemented as a remote network equipment, the encoded slices are formatted into a form suitable for delivery over a network (e.g., via a cable modem protocol or some other method). Once the slice-based streams are available at the local neighborhood equipment, the slice combiner at step 1306 orders the slices into a form suitable for decoding at the terminals.

As depicted in part (b) of FIG. 13, the guide and video slices are ordered in a manner as if the original pictures in part (a) of FIG. 13 were scanned in a left-to-right and top-to-bottom order. Each of the slice packets is then assigned to an appropriate PID by the multiplexer, as described in below. For example, PID1 can be assigned to guide slices $g_1/s_1$ through $g_1/s_N$, PID2 can be assigned to guide slices $g_2/s_1$ through $g_2/s_N$, and so on, PID10 can be assigned to guide slices $g_{10}/s_1$ through $g_{10}/s_N$, and PID11 can be assigned to video slices $v/s_1$ through $v/s_N$. The resultant transport stream containing the intra-coded guide and video slices is illustrated in part (c) of FIG. 13. Based on this transport stream structure, a receiving terminal retrieves the original picture by reconstructing a video picture row-by-row. For example, if PID1 is desired, the terminal first retrieves the guide slice $g_1/s_1$ assigned PID1 then the video slice $v/s_1$ assigned PID11, next retrieves the guide slice $g_1/s_2$ assigned PID1 then the video slice $v/s_2$ assigned PID11, and so on.

Figure 14:
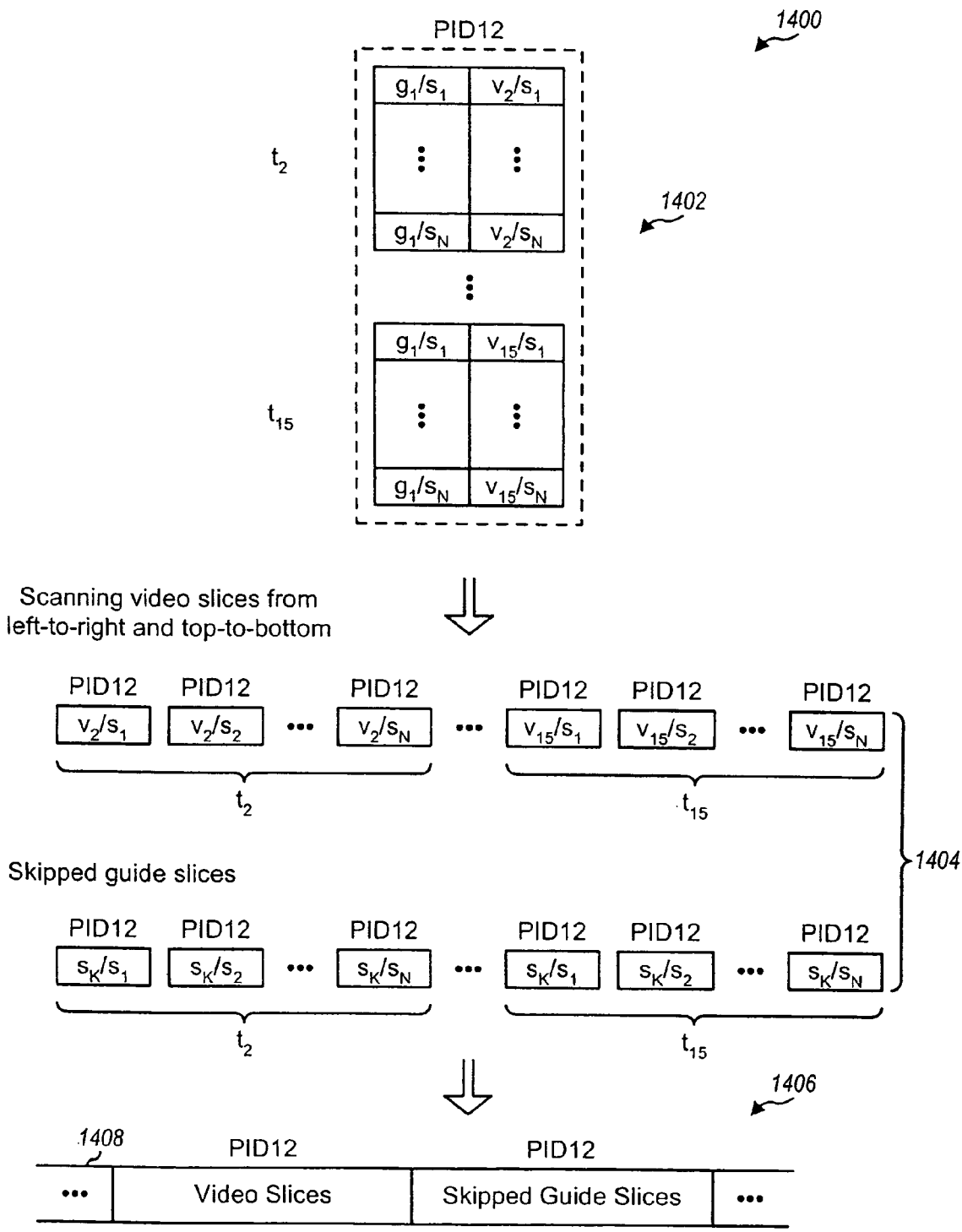
FIGS. 14 and 15 are flow diagrams of two processes for generating a portion of transport stream containing predictive-coded video and graphics slices.

FIG. 14 illustrates a process 1400 for producing a bitstream 1408 that includes the slices for the predictive-coded pictures accompanying the transport stream generation process 1300 described in FIG. 13 for the intra-coded pictures. As shown in FIG. 10C, illustratively, only the predictive-coded slices belonging to IPG page 1 are delivered.

At step 1402, the predictive-coded slices are generated at the head-end independently and then forwarded to a local neighborhood equipment located locally or in a remote network location. At step 1404, slices in the predictive-coded guide and video portions (e.g., from time periods $t_2$ through $t_{15}$) are scanned from left-to-right and top-to-bottom in slice-combiner and the complete data are assigned PID12 by the multiplexer. It can be noted that the guide slices $g_1/s_1$ through $g_1/s_N$ at each time period $t_2$ through $t_{15}$ do not change from their corresponding intra-coded slices at time period $t_1$. Therefore, these slices can be coded as skipped macroblocks "$s_K$". Conventional encoding systems do not necessarily skip macroblocks in a region even when there is no change from picture to picture. In order to provide this functionality, the encoder is given the parameters for the slices to skip macroblocks without any further encoding evaluations. At step 1406, the slice packets are ordered into a portion of a final transport stream. In an embodiment, the final transport stream first includes the video slice packets for time periods $t_2$ through $t_{15}$ (i.e., $v_2/s_1$ through $v_2/s_N$ for $t_2$, and so on, and $v_{15}/s_1$ through $v_{15}/s_N$ for $t_{15}$), then includes the skipped guide slices $s_K/s_1$ through $s_K/s_N$ from time periods $t_2$ through $t_{15}$.

Figure 15:
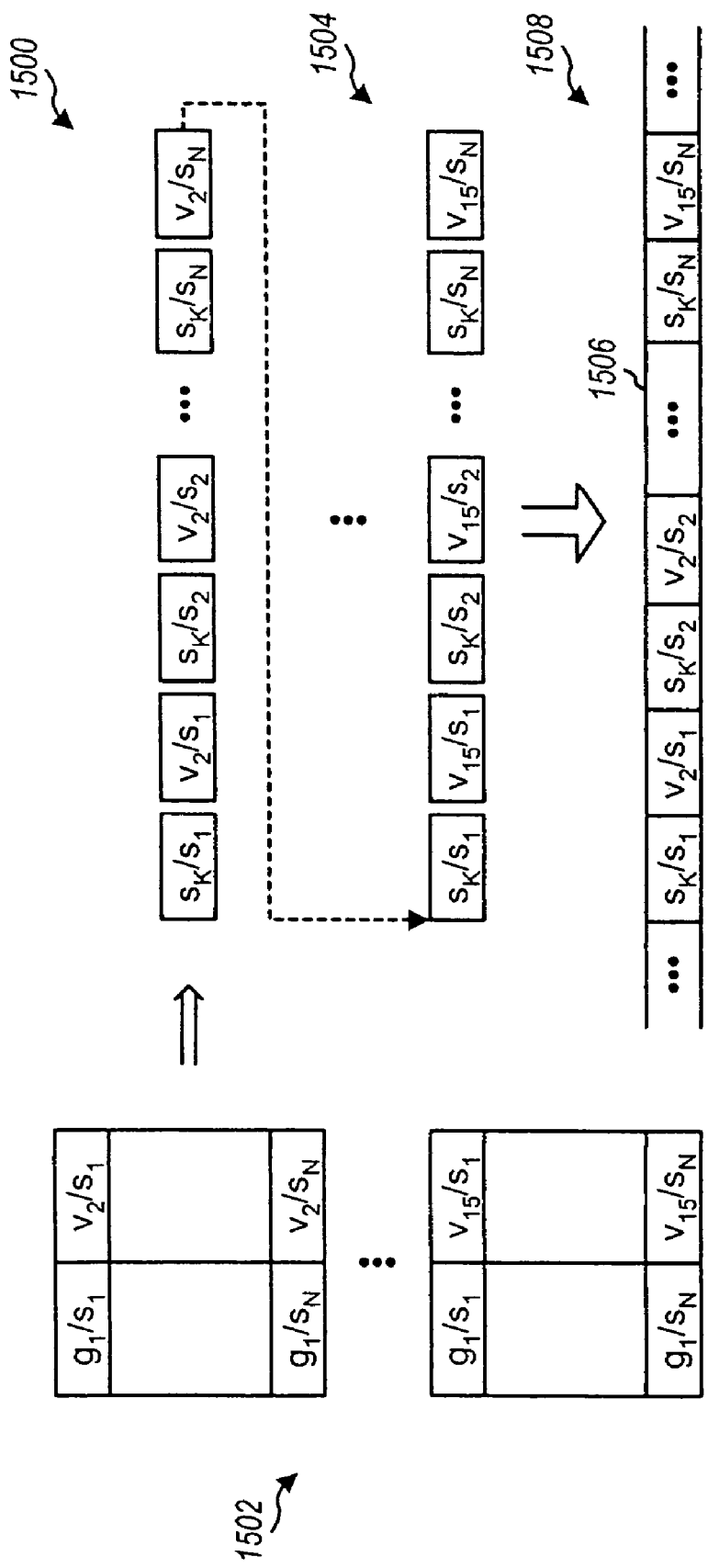

FIG. 15 illustrates a process 1500 for producing a predictive-coded slice bitstream 1506 in accordance with another embodiment of the invention. Process 1500 is an alternative embodiment to process 1400 in FIG. 14, which scans the skipped guide portion and video portion separately. At step 1502, the predictive-coded slices are produced. At step 1504, the coded slices are scanned to intersperse the "skipped" slices ($s_K$) with the video slices (v/s). In process 1500, the slices are scanned from left-to-right and top-to-bottom completely, including the skipped guide and video data. As such, at step 1508, bitstream 1506 has the skipped guide and video slices distributed uniformly throughout the transport stream.

Figure 16:
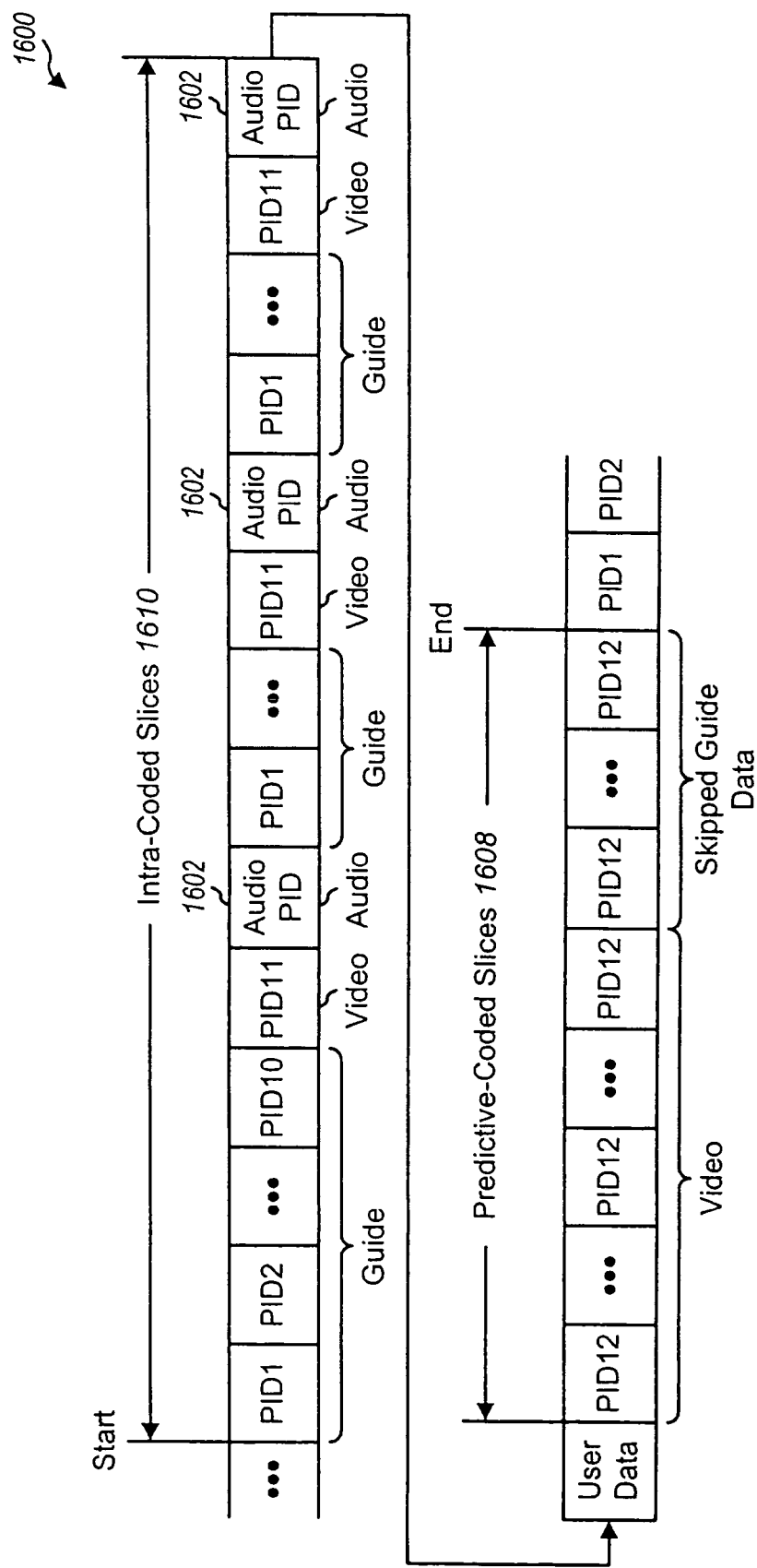
FIG. 16 is a diagram of a data structure of a transport stream used to transmit the IPG page shown in FIG. 9.

FIG. 16 depicts an MPEG-compliant transport stream 1600 that includes the complete information needed by a decoder at the terminal to recreate IPG pages that were slice-based encoded. Transport stream 1600 comprises intra-coded bitstream 1310 for the guide and video slices (PID1 to PID11), a number of audio packets 1602 identified by an audio PID, and bitstream 1508 containing the predictive-coded slices in PID12. The rate of audio packet insertion between video packets is determined based on the audio and video sampling ratios. For example, if audio is digitally sampled at one tenth of video sample rate, then an audio packet may be inserted into the transport stream for every ten video packets. Transport stream 1600 may also contain, illustratively after every 64 packets, data packets that carry overlay updates, raw data, HTML, java, URL, instructions to load other applications, user interaction routines, and the like, to the terminals. Data PIDs are assigned to different set of data packets related to the guide slice sets and also the video slice sets.

The above encoding embodiments assumed that the IPG page was divided into one guide portion and one video portion. For example, in FIG. 11, the guide portion is defined as the left half of the IPG page and the video portion is defined as the right half of the IPG page. However, the invention can be extended to have one or more guide portions and one or more video portions. Each video portion may contain video having different rates of motion or a stationary image. For example, the first portion may have a rate of 27 frames per second, and the second and third portions may each have a rate of 2 frames per second.

Figure 17:
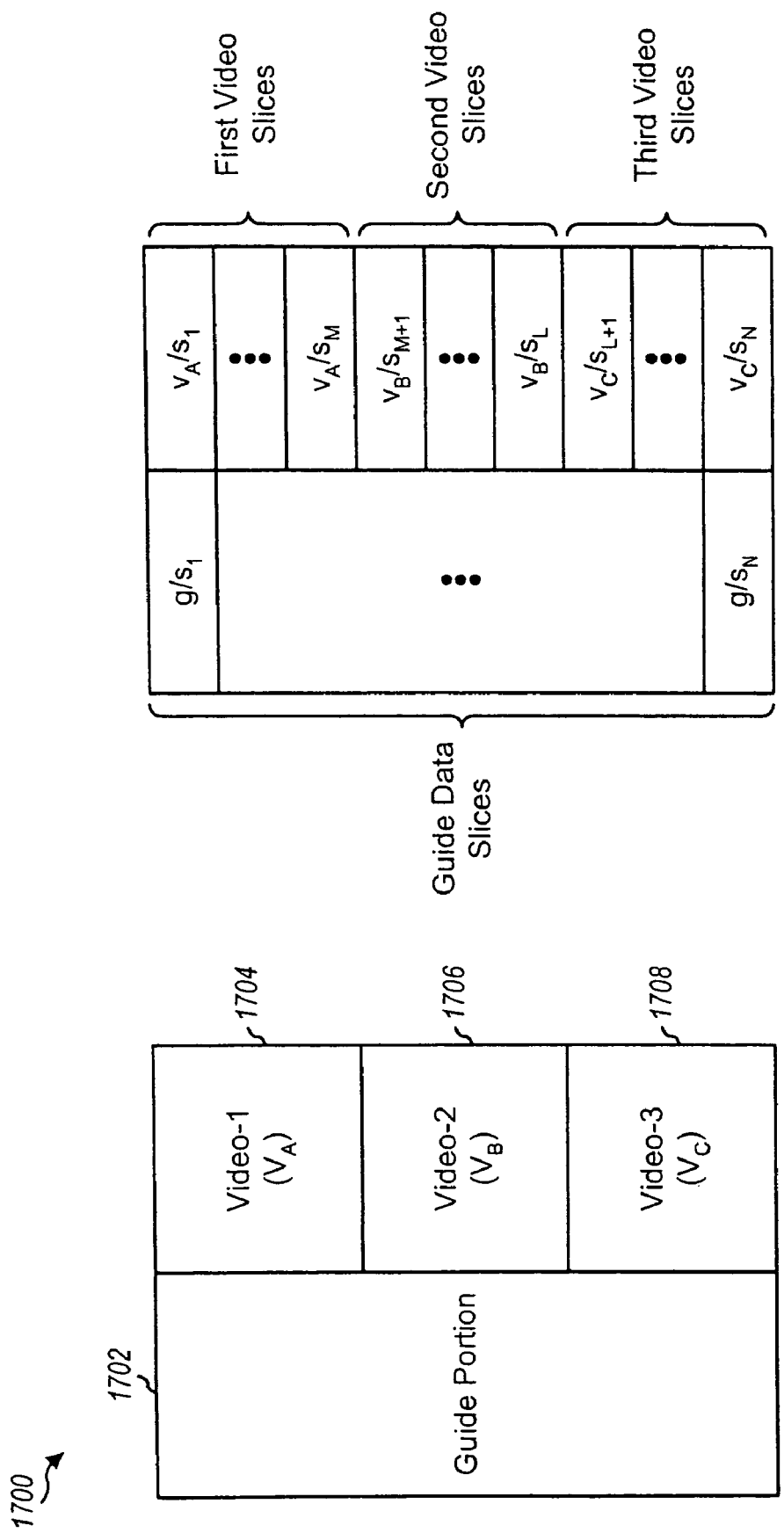
FIGS. 17A and 17B are diagrams of an IPG page having a graphics portion and a number of video portions and a corresponding slice map for the IPG page, respectively.

FIG. 17A illustrates an embodiment of an IPG page 1700 having a guide portion 1702 and three video portions 1704, 1706 and 1708. To encode IPG page 1700, each portion is separately encoded and assigned a respective PID.

FIG. 17B illustrates an assignment map for encoding each portion of IPG page 1700 shown in FIG. 17A. Guide portion 1702 is encoded as slices $g/s_1$ through $g/s_N$, the first video portion 1704 is encoded as slices $v_A/s_1$ through $v_A/s_M$, the second video portion 1706 is encoded as slices $v_B/s_{M+1}$ through $v_B/s_L$, and the third video portion 1708 is encoded as slices $v_C/s_{L+1}$ through $v_C/s_N$.

Figure 18:
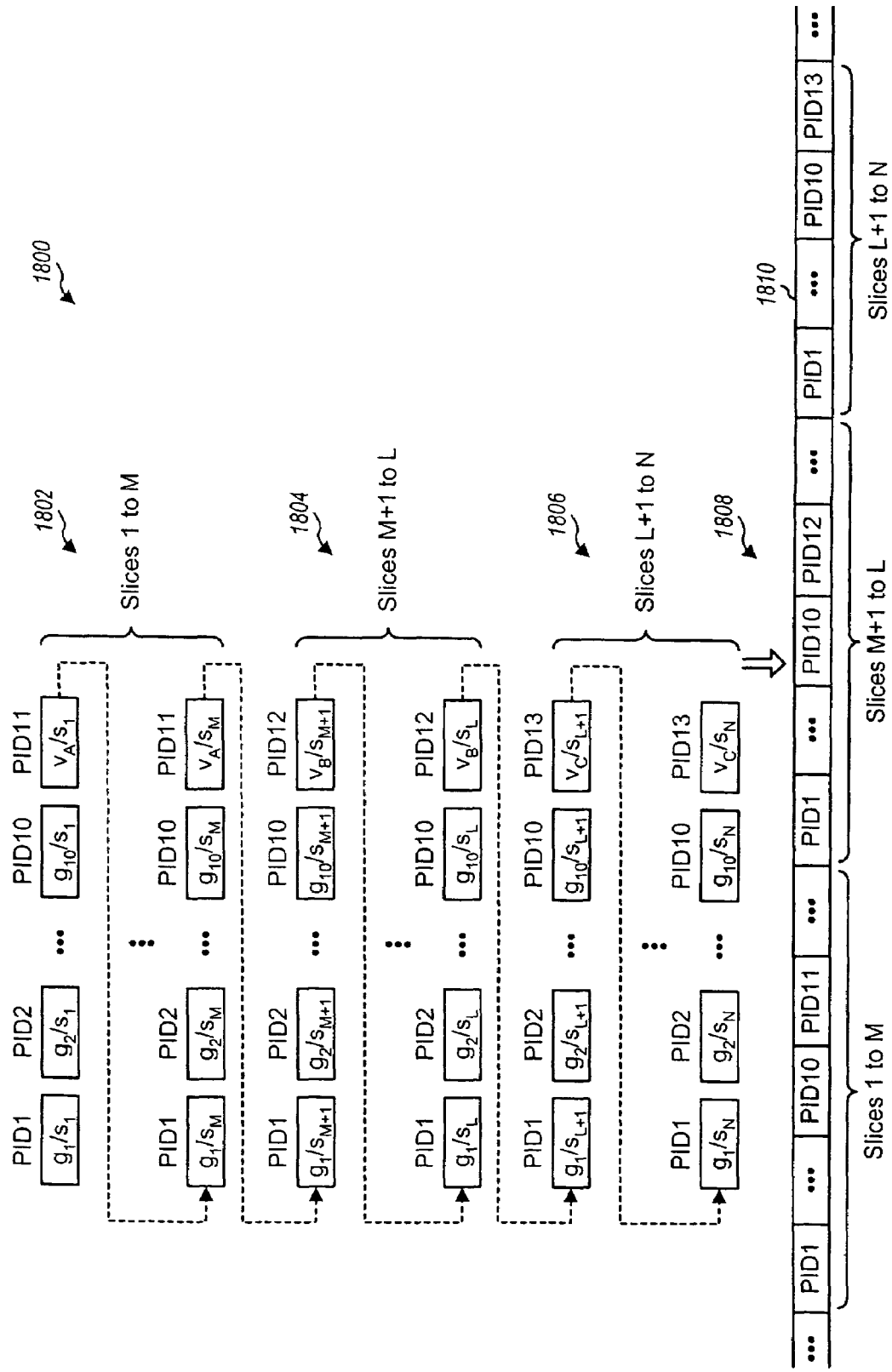
FIG. 18 is a flow diagram of a process for generating a portion of transport stream containing intra-coded video and graphics slices for an IPG having a graphics portion and a number of video portions.

FIG. 18 depicts a scanning process 1800 used to produce a bitstream 1810 that includes the intra-coded slices for IPG page 1700 shown in FIG. 17B. Scanning process 1800 scans from left-to-right and from top-to-bottom through the slices shown in FIG. 17B. As the encoded IPG is scanned, PIDs are assigned to the slices. In this example, the guide portion slices for the 10 IPG pages in time period $t_1$ (see FIG. 10C) are assigned PID1 through PID10. The first video portion slices are assigned PID11, the second video portion slices are assigned PID12 and the third video portion slices are assigned PID13.

At step 1802, slices 1 through M are processed, and the guide slices are assigned PID1 through PID10 and the first video portion slices are assigned PID 11. At step 1804, slices M+1 to L are processed, and the second video portion slices are assigned PID 12. And at step 1806, slices L+1 to N are processed, and the third video portion slices are assigned PID 13. The resultant bitstream 1810 contains the PIDs for slices 1 through M, followed by the PIDs for slices M+1 through L, and lastly by the PIDs for slices L+1 through N.

Figure 19:
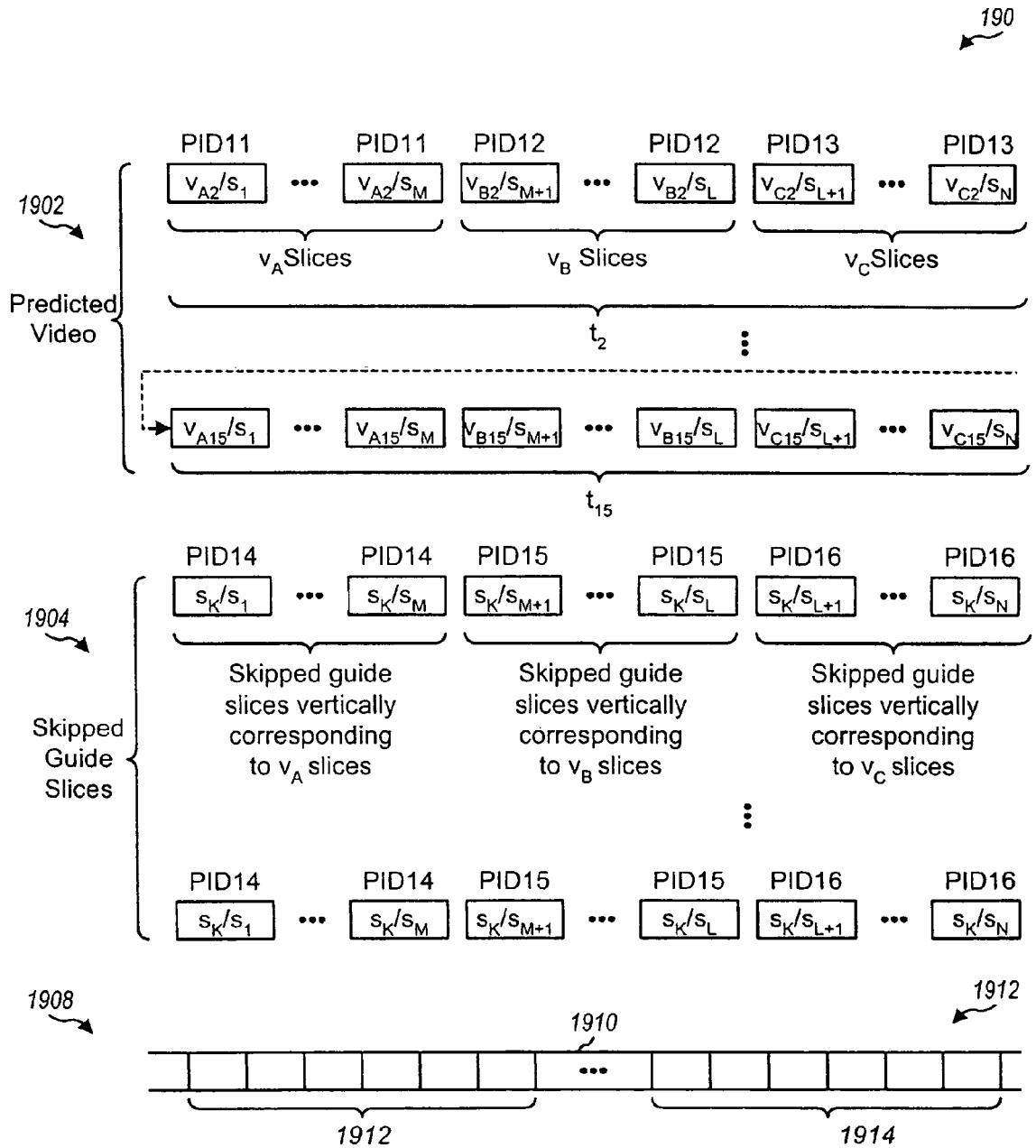
FIG. 19 is a flow diagram of a process for generating a portion of transport stream containing predictive-coded video and graphics slices for an IPG having a graphics portion and a number of video portions.

FIG. 19 depicts a process 1900 for assigning PIDs to the predictive-coded slices for IPG page 1700 shown in FIG. 17B. The scanning process is performed, at step 1902, from left-to-right and from top-to-bottom through the $v_A$, $v_B$, and $v_C$ predictive-coded slices. PIDs are assigned such that the $v_A$ video slices are assigned PID 11, the $v_B$ video slices are assigned PID12, and the $v_C$ slices are assigned PID13.

After the video predictive-coded slices have been assigned PIDs, the skipped slices are also assigns PIDs, at step 1904. The skipped guide slices that vertically correspond to the $v_A$ video slices are assigned PID14, the skipped guide slices that vertically correspond to the $v_B$ video slices are assigned PID15, and the skipped guide slices that vertically correspond to the $v_C$ video slices are assigned PID16. At step 1908, the resultant predictive-coded bitstream 1910 comprises the predictive-coded video slices 1912 and the skipped slices 1914. Bitstream 1810 of intra-coded slices (FIG. 18) and bitstream 1910 of predictive-coded slices (FIG. 19) are combined into a transport stream having a form similar to that shown in FIG. 16.

To change pages in the guide, it is desirable to be able to switch between programs (e.g., video PIDs for groups of slices) in a seamless manner. This is not easily achievable using a standard channel change with the terminal switching directly from PID-to-PID, because such operation normally flushes the video and audio buffers and typically result a blank screen for half a second.

To provide seamless switching at the decoder, a splice countdown (or random access indicator) method is employed at the end of each video sequence to indicate the point at which the video should be switched from one PID to another.

Using the same profile and a constant bit rate for coding, the video and guide encoding units generate streams for different IPG pages having similar lengths compared to each other. This is due to the fact that the source material is almost identical, and differs only in the characters in the guide from one IPG page to another. Thus, while the streams are generated having approximately equal lengths, they typically do not have exactly equal lengths. For example, for any given sequence of 15 video pictures, the number of transport packets in the sequence typically varies from one IPG page to another. Thus, a fine adjustment is used to synchronize the beginnings and ends of the sequences across all IPG pages to support the operation of the splice countdown switching method.

An aspect of the invention provides techniques to synchronize a number of streams to enable seamless switching at the terminal. Three synchronization methods are provided.

In the first synchronization method, for each (e.g., 15-picture) sequence, the multiplexer in the local neighborhood equipment identifies the length of the longest IPG page for that particular sequence. The local neighborhood equipment then adds sufficient null packets to the end of each IPG page so that all IPG pages have the same length. The multiplexer then adds switching packets at the end of the sequence, after the null packets.

The second synchronization method uses buffering for all packets for all IPG pages for each (e.g., 15-picture) sequence. The buffered packets can be ordered in the transport stream such that the packets for each IPG page can appear at slightly higher or lower frequencies, so that the IPG pages all finish at the same point. Switching packets are then added by the multiplexer in the local neighborhood equipment at the end of each stream, which does not include the null padding.

The third synchronization method starts each sequence together and then waits until all packets for all IPG pages have been generated. Once the generation of all packets is completed, switching packets are placed in the streams at the same time and point in each stream.

Depending on the implementation of the decoder within the terminal and the requirements of the application being supported, each of the above synchronization methods can be advantageously applied. For example, the first synchronization method, which uses null padding, can be applied to avoid bursts of N packets of the same PID into a decoder's video buffer faster than the MPEG specified rate (e.g., 1.5 Mbit).

The above synchronization methods can be applied to other synchronization applications, and can be used to derive other methods for synchronizing the streams for seamless switching.

F. Multiplexing Structures, Latency Reduction, and Stream Indexing

1. Level Zero, Level One, and Level Two Encoding

As shown in FIG. 10A, in the basic ensemble data structure 1000, each of the video sequences is encoded independently in a vertical dimension and assigned a separate PID. In this encoding structure, the ten coded video streams assigned PIDs 1-10 contain redundant information that is included in the delivered transport stream. In particular, ten video pictures (with each video picture including the guide and video portions) are sent in parallel for each time period. In the description below, this first encoding technique is referred to as "level zero" encoding.

As shown in FIG. 10B, in data structure 1030, a substantial portion of the redundancy is removed. Using only elements 1032a through 1032j and 1034, all elements in each row and column of the matrix may be reconstructed. While ten video pictures (with each video picture including the guide and video portions) are sent for the intra-coded time period $t_1$, only one video picture (including the guide and video portions) is sent for the predictive-coded time periods $t_2$ through $t_{15}$. In the description below, this second encoding technique is referred to as "level one" encoding.

As shown in FIG. 10C, in encoding structure 1060, redundancy is further removed by dividing each picture into portions, encoding each portion as slices, and transmitting the unique slices. These slices are later appropriately recombined to regenerate the pictures. In the description below, this third encoding technique is referred to as "level two" encoding.

In each of these three encoding techniques, the elementary streams are multiplexed as described below.

2. Multiplexing Structures, Program Mapping, and Transport Stream Formation

Figure 20:
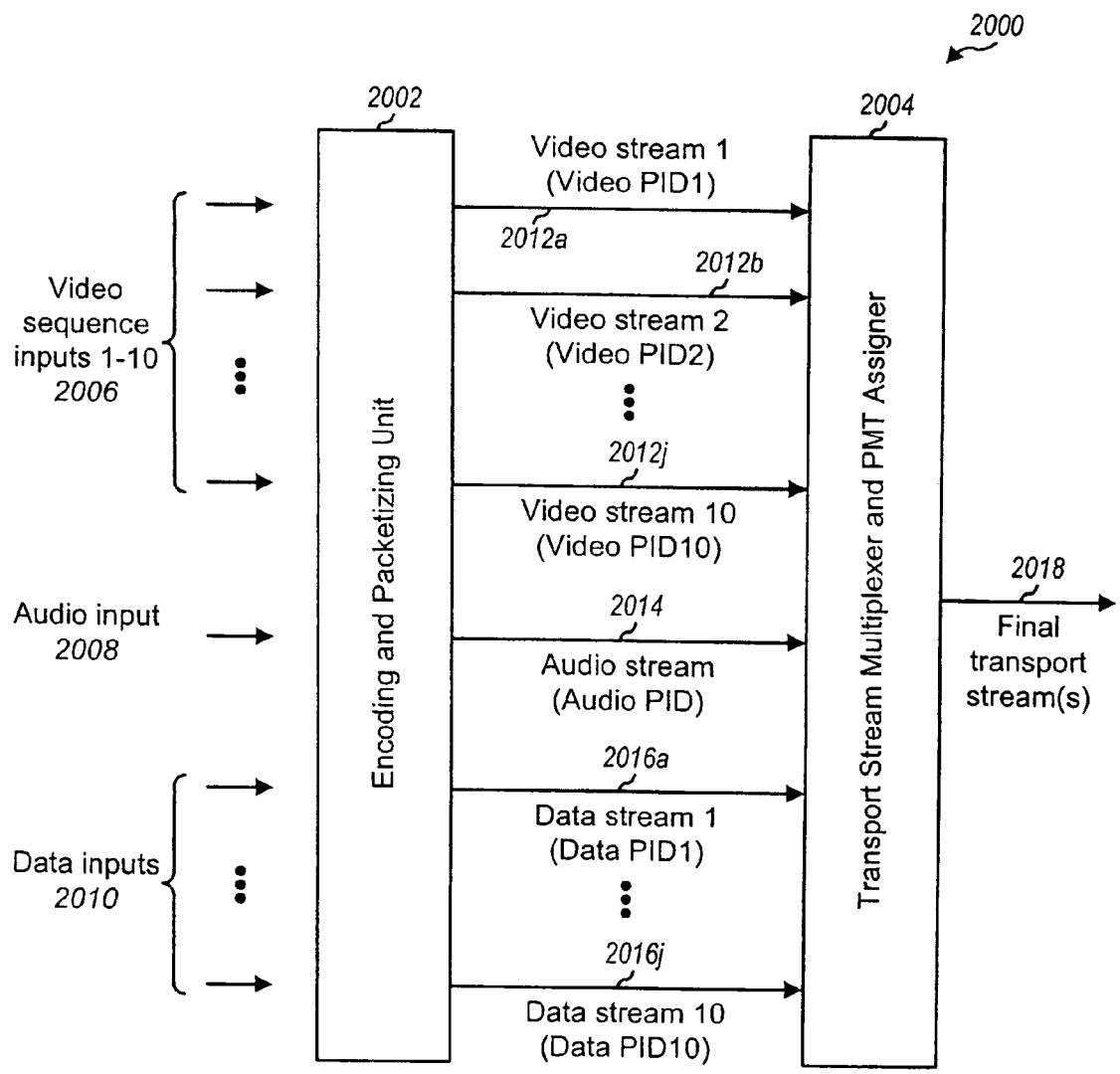
FIG. 20 is a block diagram illustrating an apparatus for encoding, packetizing, multiplexing, and assigning programs to video, audio, and data in accordance with a "level zero" embodiment of the invention.

FIG. 20 is a block diagram illustrating an apparatus for encoding, packetizing, multiplexing, and assigning programs to video, audio, and data in accordance with a "level zero" embodiment of the invention. As described above, the "level zero" embodiment delivers ten video pictures for each time period (in addition to an audio signal). Apparatus 2000 includes an encoding and packetizing unit 2002 and a transport stream multiplexer and program map table (PMT) assigner 2004.

In the example shown in FIG. 20, for each time period, encoding and packetizing unit 2002 receives ten video sequence inputs 2006, one audio input 2008, and ten data inputs 2010. Encoding and packetizing unit 2002 encodes and packetizes each of these inputs. In this example, encoding and packetizing unit 2002 outputs ten video streams 2012, one audio stream 2014, and ten data streams 2016.

In this example, each video input is encoded independently and packetized into a respective video stream. The ten video inputs 2006 are encoded by aligning the pictures of the video inputs to each other so that each group of pictures (GOP) starts at approximately the same time point for each input. Each output video stream 2012 is assigned a respective video PID. The single common audio input is also encoded and packetized into a separate audio stream, which is assigned an audio PID. In addition, the ten data inputs are packetized into ten separate data streams, with each data stream being assigned a respective data PID.

Transport stream multiplexer and PMT assigner 2004 receives the outputs from encoding and packetizing unit 2002. In this example, transport stream multiplexer and PMT assigner 2004 receives the ten video streams 2012, one audio stream 2014, and ten data streams 2016. Transport stream multiplexer and PMT assigner 2004 multiplexes the received streams to form one or more final transport streams 2018. In the case of a single final transport stream, one packet of each (video, audio, and data) stream may be sequentially time multiplexed to form the final transport stream. For example, a packet from video stream 1, then a packet from video stream 2, then a packet from video stream 3, and so on, can be multiplexed into the final transport stream.

Transport stream multiplexer and PMT assigner 2004 also provides packets conveying a program mapping table (PMT). The PMT specifies packet identifier (PID) values for program components. For example, a program may correspond to a particular broadcast channel, and the PMT may specify the PID values for the video, audio, and data relating to that broadcast channel. The packets conveying the PMT are also included in final transport stream(s) 2018.

Figure 21A:
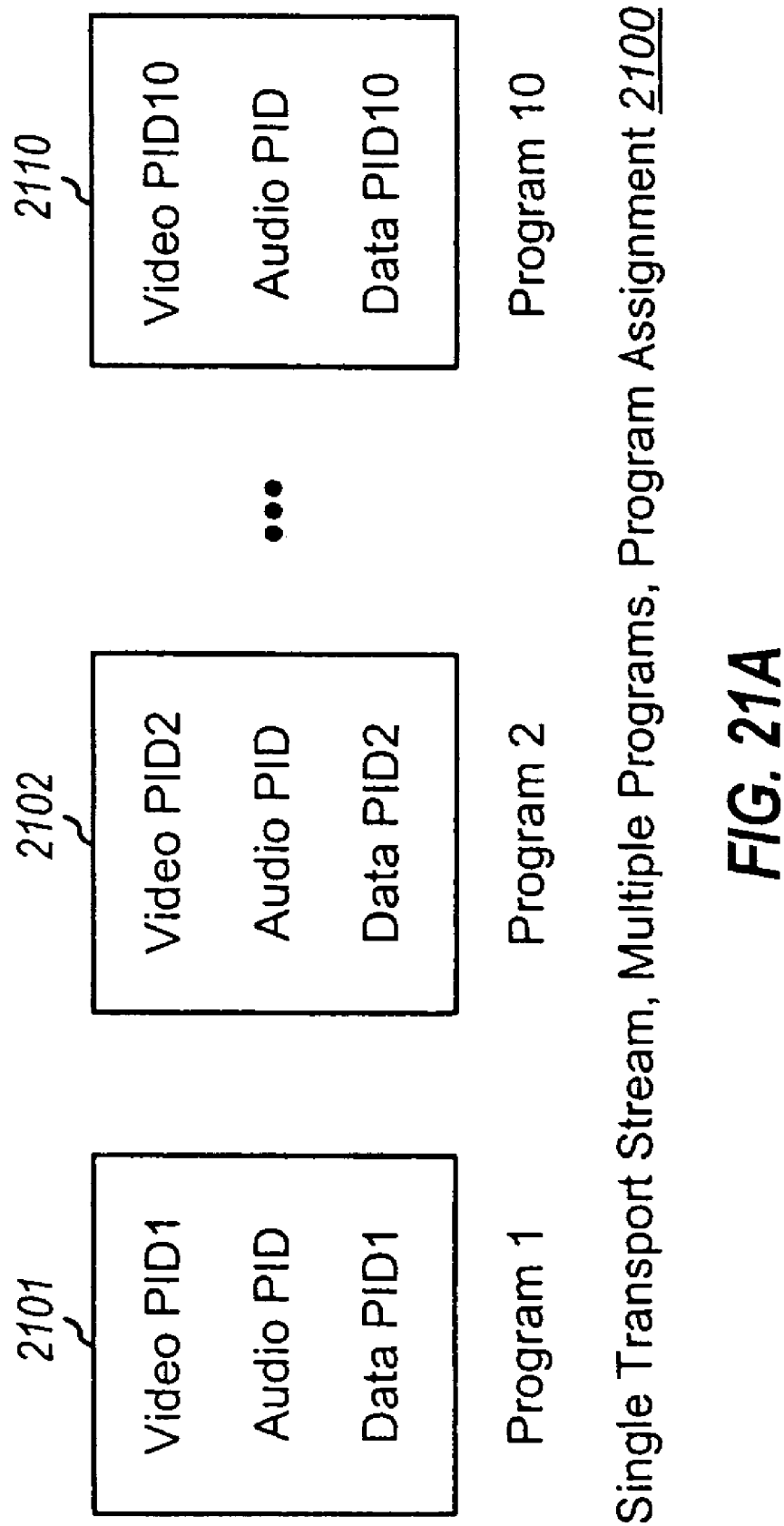
FIGS. 21A and 21B are diagrams illustrating a program assignment structure for a multiple-program final transport stream and a single-program final transport stream, respectively, in accordance with a "level zero" embodiment of the invention.

FIG. 21A is a diagram illustrating a program assignment structure 2100 for a single final transport stream with multiple programs in accordance with an embodiment of the invention. Program assignment structure 2100 assigns to each program a video PID, an audio PID, and a data PID.

In this example, for each program, the video PID is one of ten video PIDs, the audio PID is the same for each program, and the data PID is one of ten data PIDs. For example, program 1 2101 is assigned video PID1, the audio PID, and data PID1, program 2 2102 is assigned video PID2, the audio PID, and data PID2, and so on, and program 10 2110 is assigned video PID10, the audio PID, and data PID10. It can be noted that although the audio PID is referenced for every program, the audio packets are multiplexed into final transport stream 2018 only once.

Figure 21B:
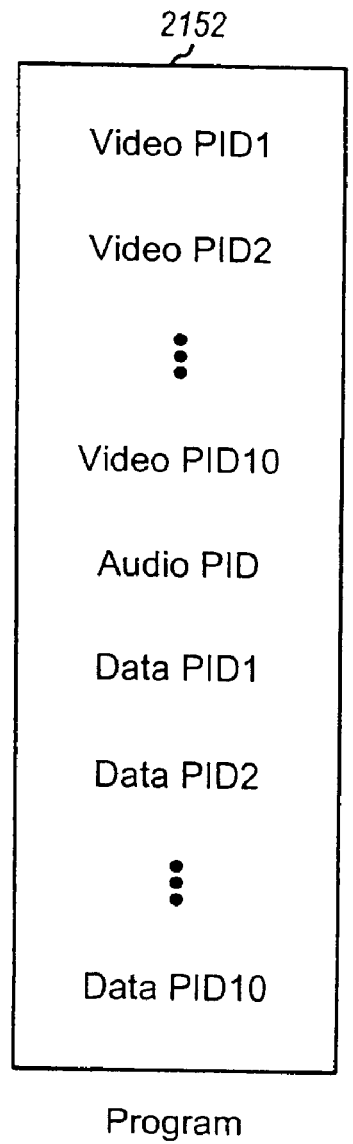

FIG. 21B is a diagram illustrating a program assignment structure 2150 for a final transport stream with a single program in accordance with a "level zero" embodiment of the invention. In this example, program assignment 2150 assigns to single program 2152 the ten video PIDs, the audio PID, and the ten data PIDs. This assignment results in a reduced number of programs.

Figure 22:
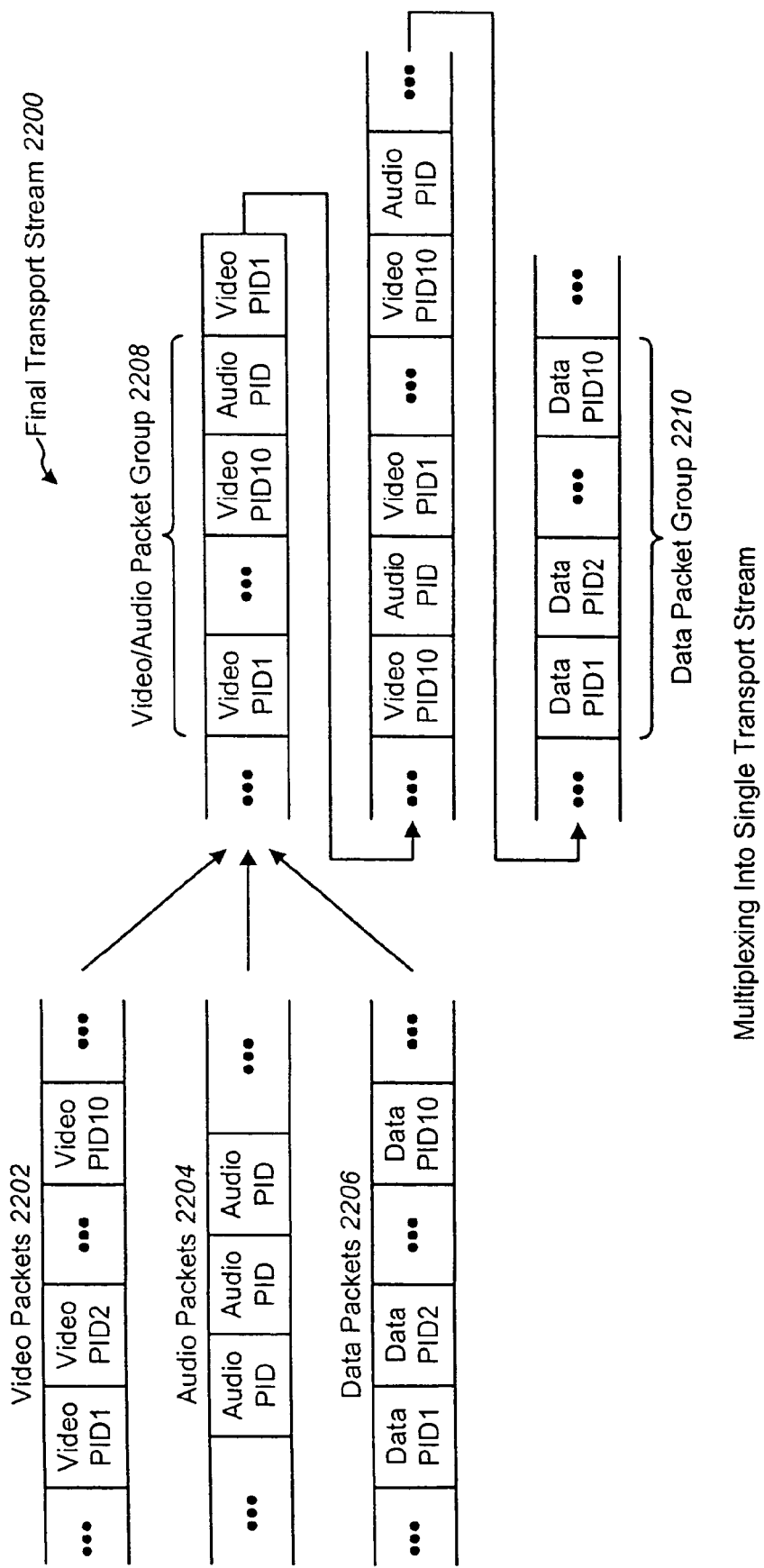
FIG. 22 is a diagram illustrating multiplexing of video, audio, and data packets into a final transport stream in accordance with a "level zero" embodiment of the invention.

FIG. 22 is a diagram illustrating the multiplexing of video, audio, and data packets into a final transport stream in accordance with a "level zero" embodiment of the invention. In this example, video packets 2202 include packets with video PIDs 1-10, audio packets 2204 include packets with the audio PID, and data packets 2206 include packets with data PIDs 1-10.

Transport stream multiplexer 2004 multiplexes these various packets into one or more final transport streams 2200. In the example shown in FIG. 22, the packets are multiplexed into a single final transport stream 2200. As shown, for example, the video and audio packets may be interleaved and the data packets may be arranged separately from them.

In particular, since audio typically has a lower rate compared with video (e.g., one tenth the video rate), the audio packets may be inserted into final transport stream 2200 illustratively every $10^{th}$ video packet. Similarly, data typically also has a lower rate compared with video. Hence, for example, 64 video/audio packet groups 2208 may be sent sequentially, followed by a single data packet group 2210, followed by another 64 video/audio packet groups 2208, followed by another data packet group 2210, and so on. The number of video/audio packet groups sent sequentially may be adjusted depending on the data rate in comparison to the video/audio rate.

Figure 23:
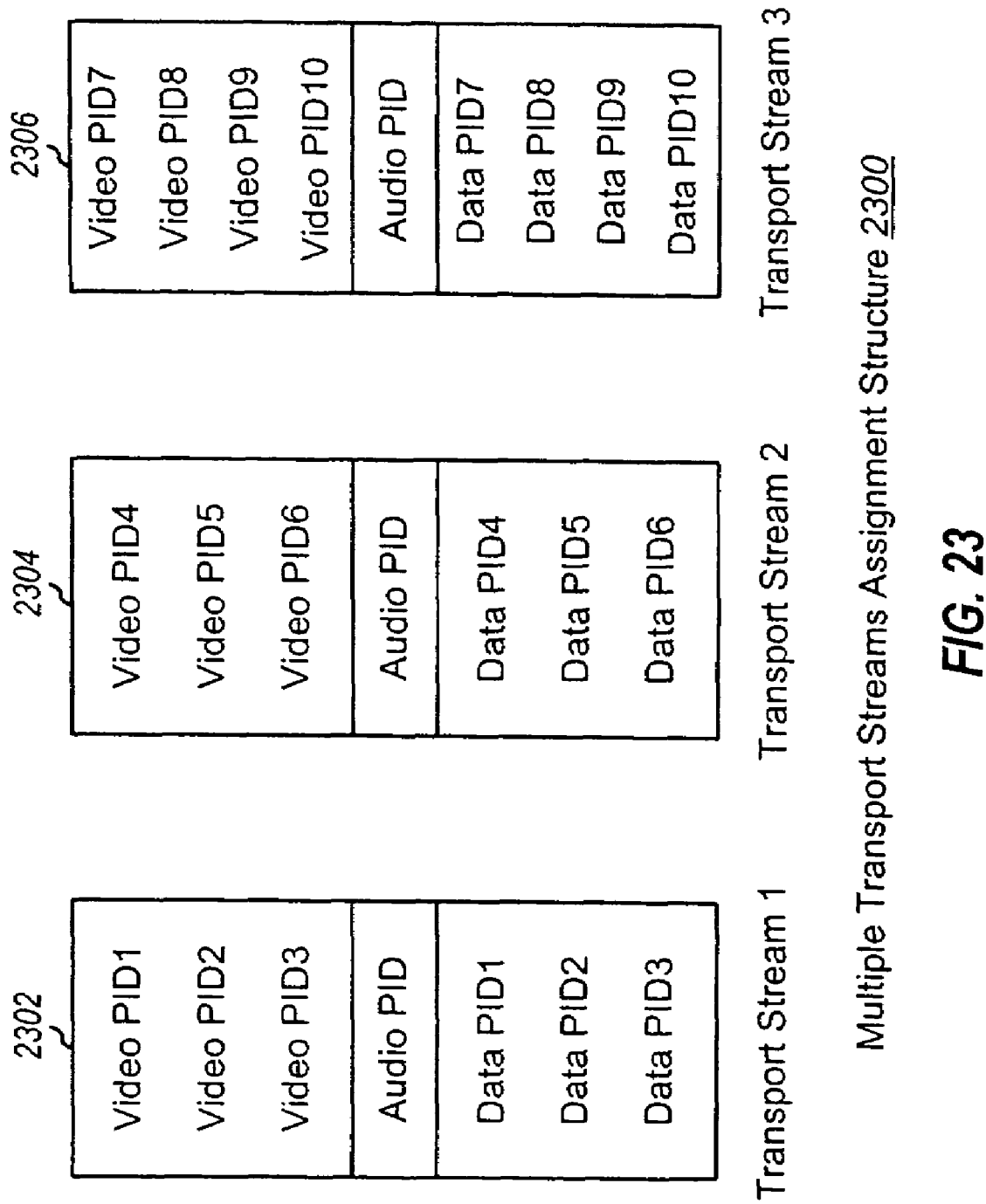
FIG. 23 is a diagram illustrating an assignment structure for multiple final transport streams in accordance with a "level zero" embodiment of the invention.

FIG. 23 is a diagram illustrating an assignment structure 2300 for multiple final transport streams in accordance with a "level zero" embodiment of the invention. In this example, assignment structure 2300 assigns the various video, audio, and data packets to three transport streams. Also, in this specific example, transport stream 1 2302 is assigned video PIDs 1-3, the audio PID, and data PIDs 1-3. Transport stream 2 2304 is assigned video PIDs 4-6, the audio PID, and data PIDs 4-6. And transport stream 3 2306 is assigned video PIDs 7-10, the audio PID, and data PIDs 7-10. The particular assignment structure selected depends on the number of PIDs and the number of transport streams. Unlike this example, in a preferred embodiment, the number of video PIDs is evenly divisible by the number of transport streams.

In addition, different program assignments may be imposed on each final transport stream to yield a single program or multiple programs in a manner analogous to that described above for FIGS. 21A and 21B.

Figure 24:
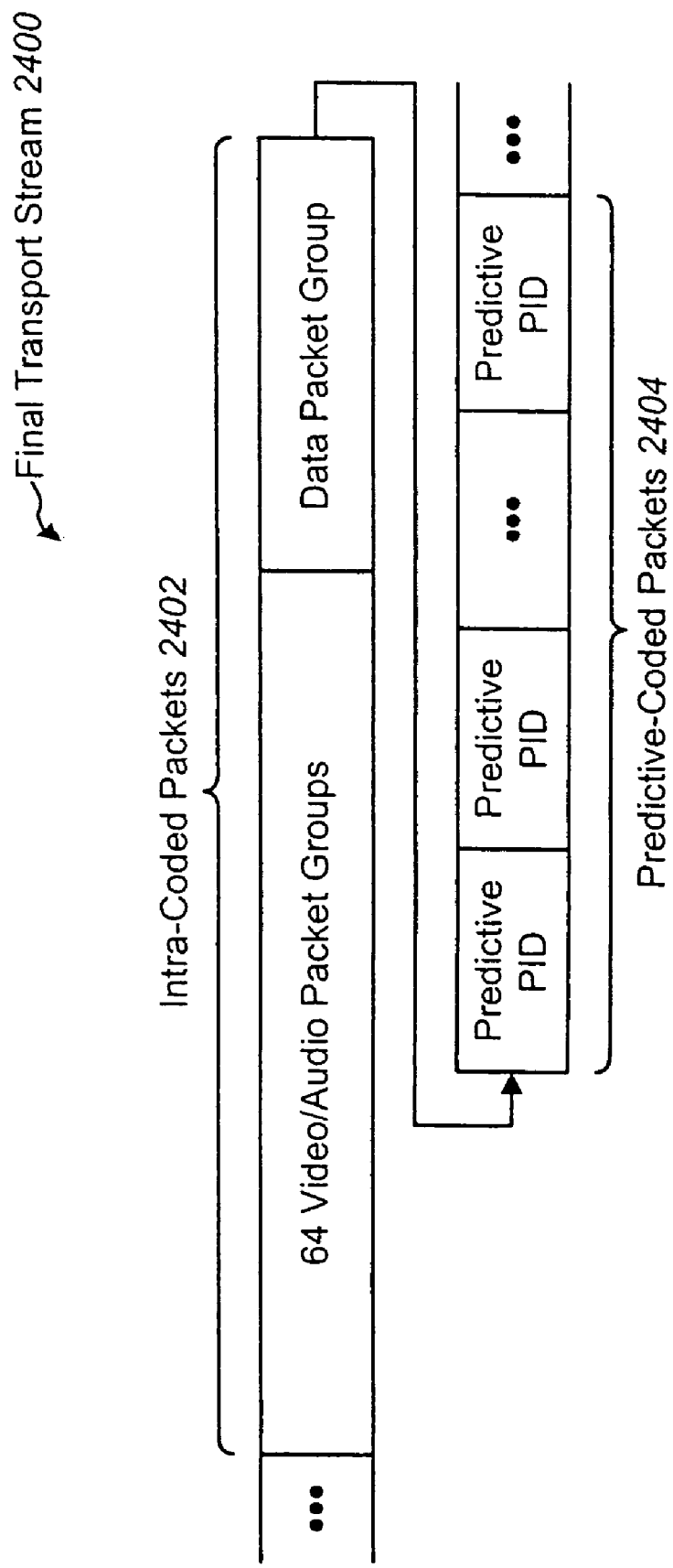
FIG. 24 is a diagram illustrating a final transport stream in accordance with a "level one" embodiment of the invention.

FIG. 24 is a diagram illustrating a final transport stream 2400 in accordance with a "level one" embodiment of the invention. As described above, the "level one" embodiment sends ten video pictures for each intra-coded time period ($t_1$), but only one video picture for each predictive-coded time period. Final transport stream 2400 in FIG. 24 includes intra-coded packets 2402 and predictive-coded packets 2404.

Intra-coded packets 2402 may include, for example, 64 sequential video/audio packet groups, followed by a data packet group, much like final transport stream 2200 shown in FIG. 22. These intra-coded packets 2402 include information from intra-coded pictures 1032$a$ through 1032$j$ in FIG. 10B. However, unlike final transport stream 2200 shown in FIG. 22, final transport stream 2400 of FIG. 24 only includes packets for intra-coded pictures. For predictive-coded pictures, final transport stream 2400 includes predictive-coded packets 2404, which carry information relating to predictive-coded pictures 1034 in FIG. 10B.

In addition, different program assignments may be imposed on the final transport stream to yield a single program or multiple programs in a manner analogous to that described above for FIGS. 21A and 21B.

Figure 25A:
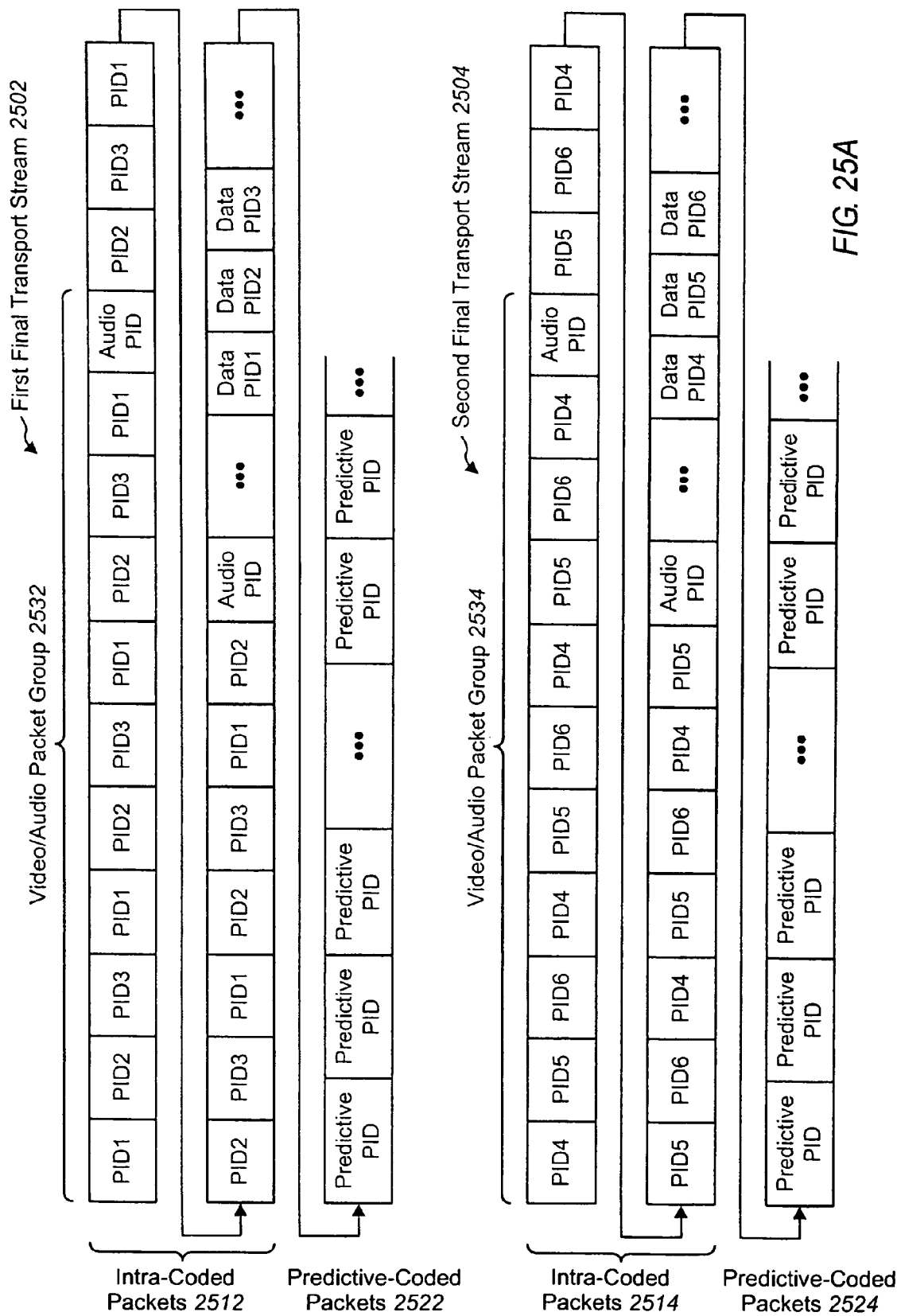
FIGS. 25A and 25B are diagrams illustrating multiple final transport streams in accordance with a "level one" embodiment of the invention.
Figure 25B:
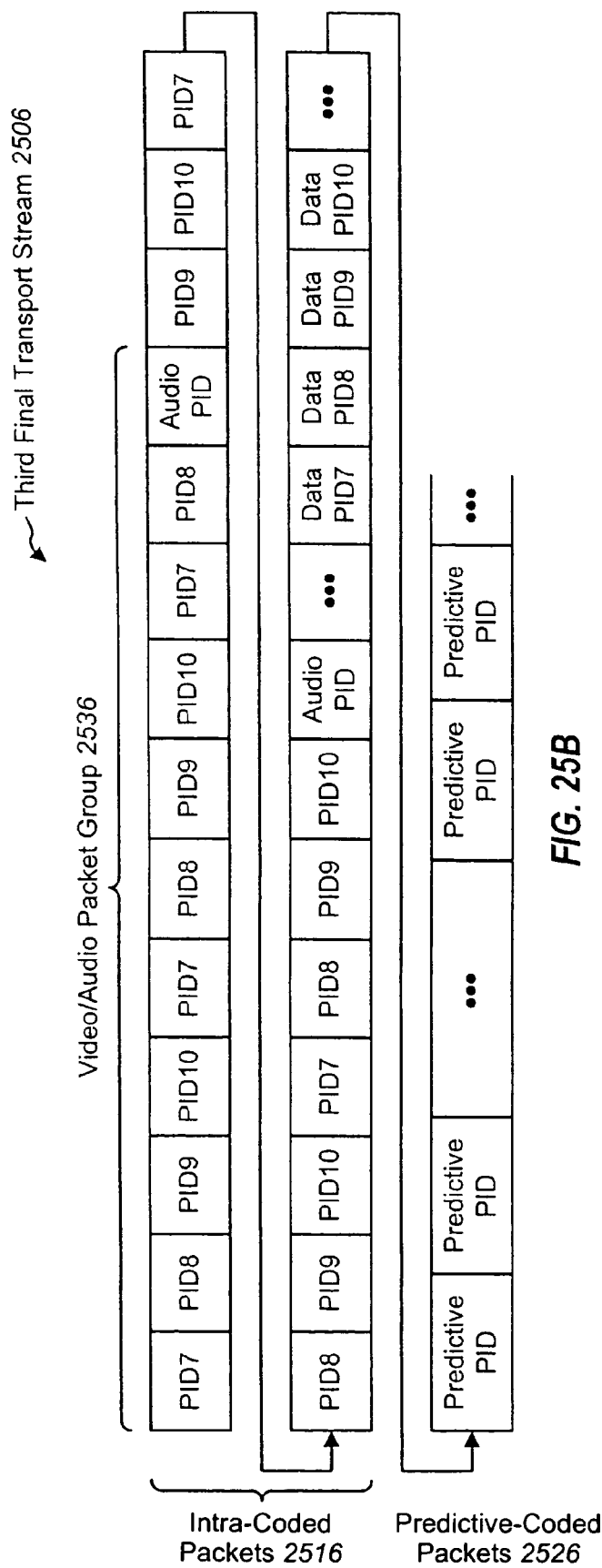

FIGS. 25A and 25B are diagrams illustrating multiple final transport streams in accordance with a "level one" embodiment of the invention. The example illustrated in FIGS. 25A and 25B includes three final transport streams: a first final transport stream 2502, a second final transport stream 2504, and a third final transport stream 2506. Each final transport stream includes intra-coded packets and predictive-coded packets.

Intra-coded packets 2512 for first final transport stream 2502 include video/audio packet groups 2532. Each video/audio packet groups 2532 includes, in this example, ten video packets with video PIDs 1-3 and an audio packet with the audio PID. For example, 64 video/audio packet groups 2532 may be serially included in first final transport stream 2502, followed by a group of data packets with data PIDs 1-3, and followed by predictive-coded packets 2522.

Similarly, intra-coded packets 2524 for second final transport stream 2504 include video/audio packet groups 2534. Each video/audio packet groups 2534 includes, in this example, ten video packets with video PIDs 4-6 and an audio packet with the audio PID. For example, 64 video/audio packet groups 2534 may be serially included in second final transport stream 2504, followed by a group of data packets with data PIDs 4-6, and followed by predictive-coded packets 2524.

Finally, intra-coded packets 2526 for third final transport stream 2506 include video/audio packet groups 2536. Each video/audio packet groups 2536 includes, in this example, ten video packets with video PIDs 7-10 and an audio packet with the audio PID. For example, 64 video/audio packet groups 2536 may be serially included in third final transport stream 2506, followed by a group of data packets with data PIDs 7-10, and followed by predictive-coded packets 2526.

Again, the particular assignment structure selected for use may depend on the number of PIDs and the number of transport streams. In addition, different program assignments may be imposed on each final transport stream to yield a single program or multiple programs in a manner analogous to that described above for FIGS. 21A and 21B.

Figure 26:
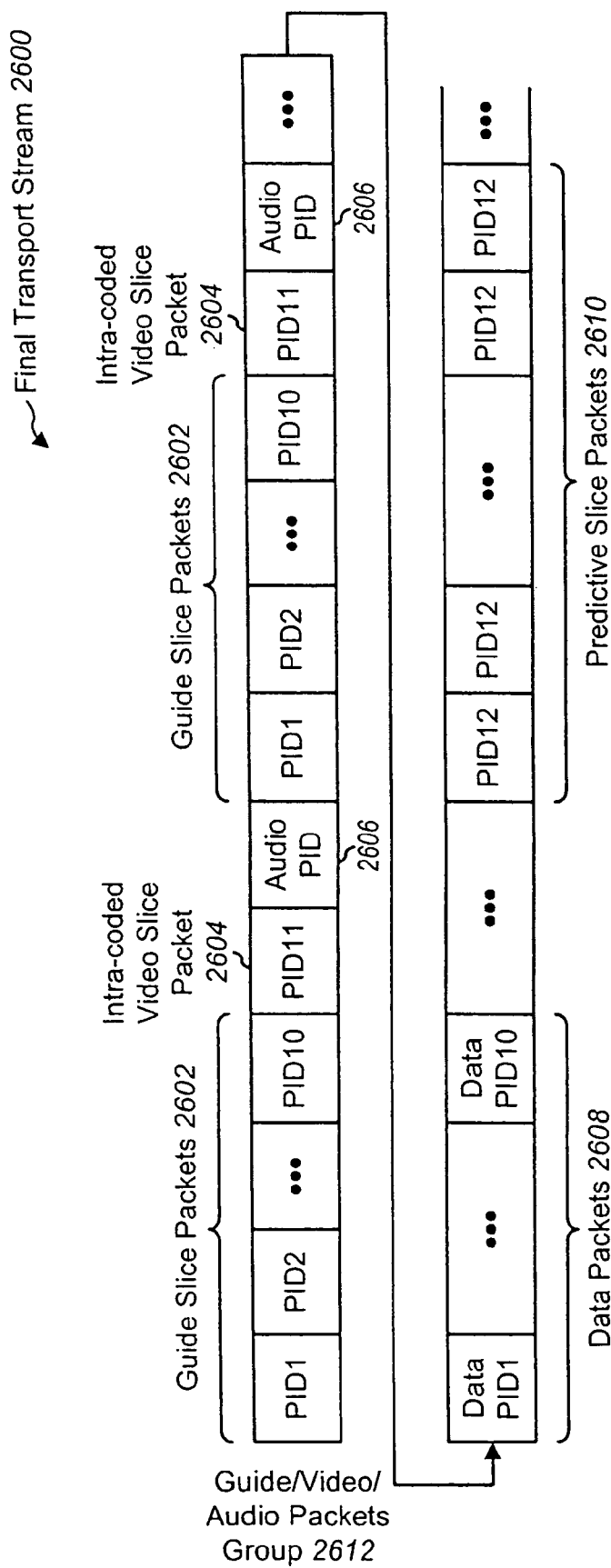
FIG. 26 is a diagram illustrating a final transport stream in accordance with a "level two" embodiment of the invention.

FIG. 26 is a diagram illustrating a final transport stream 2600 in accordance with a "level two" embodiment of the invention. As described above, the "level two" embodiment divides each picture into slices and transmits the unique slices. The received slices are later appropriately recombined to regenerate the pictures. Final transport stream 2600 in FIG. 26 includes guide slice packets 2602, intra-coded video slice packets 2604, audio packets 2606, data packets 2608, and predictive slice packets 2610.

In this example, guide slice packets 2602 include intra-coded guide slices with PIDs 1-10 that are respectively associated with the ten IPG pages ($g_1$-$g_{10}$) shown in FIG. 10C. Intra-coded video slice packets 2604 include intra-coded video slices with PID11, which correspond to the video picture ($v_1$) shown in FIG. 10C. In a preferred embodiment, audio packets 2606 with the audio PID are interleaved with guide slice packets 2602 and intra-coded video slice packets 2604 (e.g., as shown in FIG. 26) to form a guide/video/audio packet group 2612.

As shown in FIG. 26, data packets 2608 may follow guide/video/audio packet group 2612. Data packets 2608 may include, for example, data PIDs 1-10. Subsequently, following data packets 2608 are predictive slice packets 2610. Predictive slice packets 2610 include the predictive-coded slices with PID12, as shown in FIG. 10C.

Alternatively, the slices may be divided into multiple final transport streams in a manner analogous to that described above for FIGS. 23, 25A, and 25B. In addition, different program assignments may be imposed on each final transport stream to yield a single program or multiple programs in a manner analogous to that described above for FIGS. 21A and 21B.

The above examples are merely illustrative and not limiting. For example, the invention is not limited to embodiments with only ten IPG pages. Rather, the invention contemplates the use of any number of pages in the IPG, and ten pages are described only by way of illustration.

3. Latency Reduction

As described above in relation to the multiplexing structures, the IPG is preferably delivered using a single final transport stream. However, as the number of IPG pages increases, multiple final transport streams may be used depending on the bandwidth requirements of the elementary streams. When multiple transport streams are used, transitions between transport streams may have the undesired effect of introducing latencies (i.e., delays). The invention provides various methods to reduce switching latencies.

In a first method to reduce switching latencies between transport streams, related IPG pages are grouped into the same transport stream. Related IPG pages may be close in content, or close in time, or close in other relationship. Grouping related IPG pages advantageously provides for rapid changes between video PIDs within the same transport stream.

Grouping related IPG pages also enables the construction of relatively small transport streams that may be delivered in a targeted fashion to specific local neighborhoods and/or at specific times. Such targetable transport streams may be used to further reduce switching latencies.

For example, consider a first transport stream transmitting IPG pages for the next 1-hour of broadcast programming to a neighborhood. Suppose a viewer in the neighborhood wants to look ahead in the program listings to look at the following 1-hour of broadcast programming. Ordinarily, this may require a terminal to request the desired IPG pages from the head-end. However, in accordance with an embodiment of the invention, the latency of receiving such IPG pages may be reduced by the automatic transmission, along with the first transport stream, of a second transport stream for the IPG pages. This is advantageous in that the terminal needs not specifically request those IPG pages from the head-end.

FIG. 27A shows a second method to reduce switching latencies between transport streams. As shown in FIG. 27A, certain packets may be redundantly carried by more than one transport stream in order to reduce switching latencies. In the specific example illustrated in FIG. 27A, the video packets with PID3 are redundantly carried by both transport streams 2702 and 2704. Since the same video PID is included in two transport streams, a terminal can utilize either stream or both streams while transitioning from one transport stream to the other. In this manner, delays experienced by the viewer when the terminal changes from one transport stream to another are reduced because the transition may occur as a background process which does not interrupt the display.

The structure in which PIDs overlap between transport streams may be applied in various embodiments where multiple final transport streams are utilized. For example, the overlapping PID structure is applicable whether level zero, level one, or level two encoding is utilized. As a specific example, the slice-based single transport stream formation depicted in FIG. 26 may be extended to multiple slice-based transport streams with overlapping PIDs as described below.

Figure 27B:
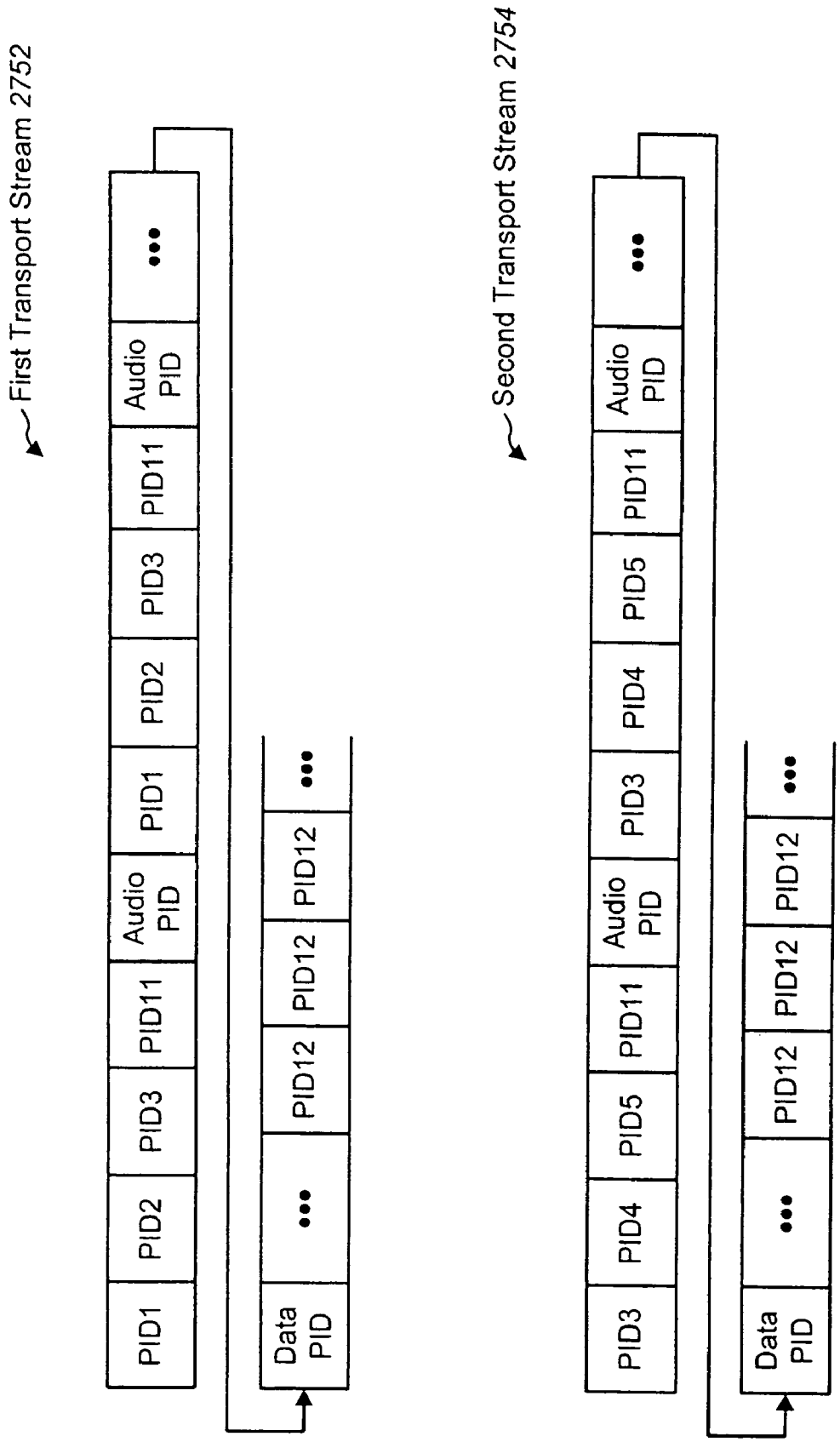
FIG. 27B is a diagram illustrating slice-based multiple transport streams with overlapping PIDs to reduce latencies in accordance with an embodiment of the invention.

FIG. 27B is a diagram illustrating slice-based multiple transport streams with overlapping PIDs to reduce latencies in accordance with an embodiment of the invention. In the example shown, each of transport streams 2752 and 2754 carries intra-coded guide slices identified by three PIDs. However, the three PIDs for the first transport stream 2752 overlap with the three PIDs for the second transport stream 2754. In particular, each transport stream includes intra-coded guide slices identified by PID3.

The PID(s) to be shared between transport streams may be determined in various manners. In an embodiment, the IPG page that will most probably be used by a viewer to switch from one transport stream to another is determined or predetermined. For example, if the first transport stream can include pages listing broadcast programming and a page listing pay-per-view (PPV) movies, and the second transport stream can include pages enabling the ordering of PPV movies and related electronic commerce pages. The page listing PPV movies in the first transport stream may be predetermined to be the page most probably used by a viewer to switch from the first transport stream to the second transport stream. Hence, in accordance with an embodiment of the invention, the page listing PPV movies would be included in the first transport stream as well as the second transport stream, to efficiently and effectively reduce the latency in switching between the two transport streams.

It can be noted that each of the multiple transport streams described above may be structured as a single program or multiple programs. In an application where all the streams need to share the same time base, a single program is preferred. In other applications where the streams can have different time bases, multiple programs can be used whereby streams with similar time bases are grouped together and assigned to the same program.

Figure 28:
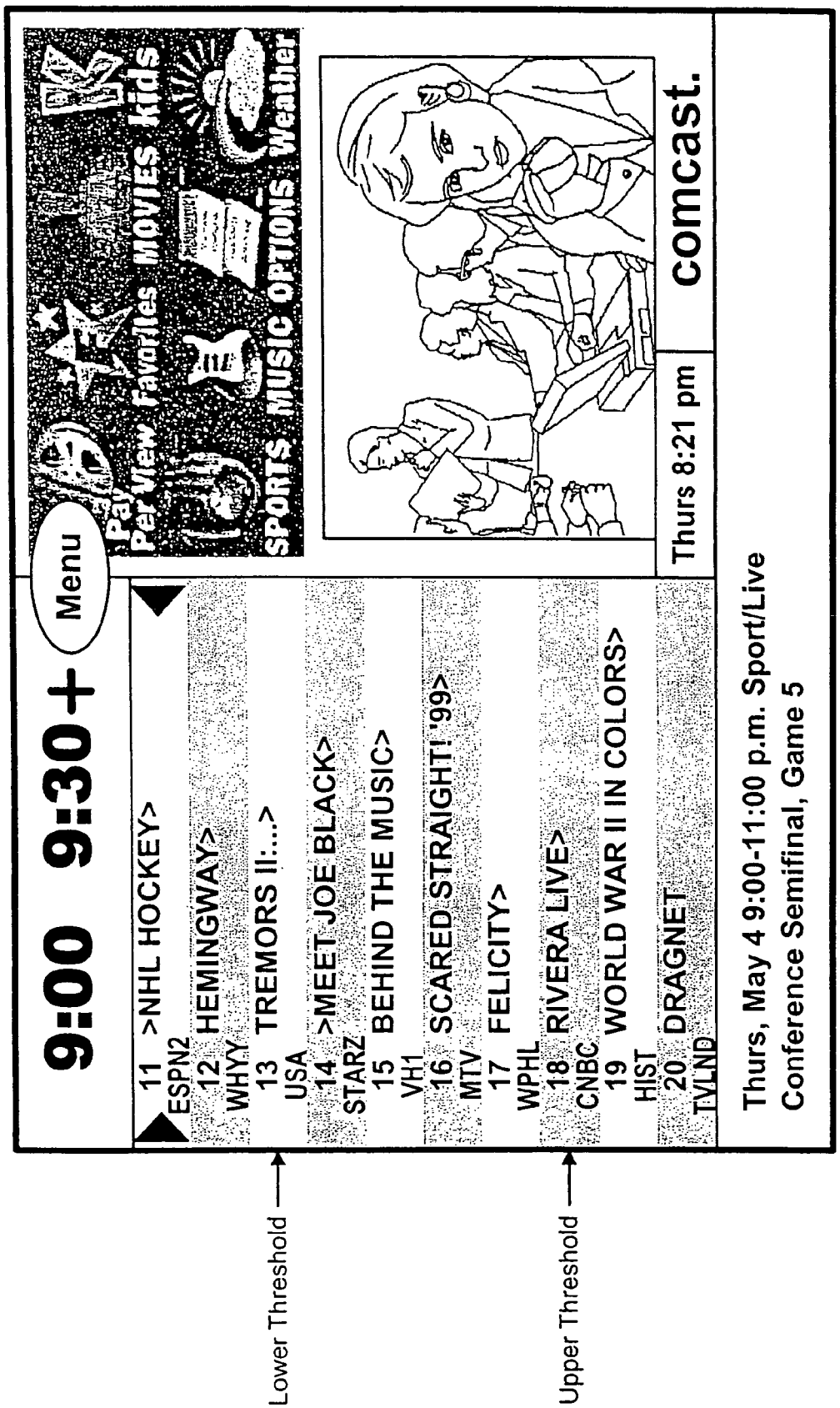
FIG. 28 is a diagram illustrating an IPG page with two threshold levels for stream priming in accordance with an embodiment of the invention.

FIG. 28 illustrates a third method for reducing switching latencies between transport streams. FIG. 28 shows an example IPG page with two threshold levels for stream priming in accordance with an embodiment of the invention. Stream priming is a method whereby a terminal anticipates that packets with particular PIDs may soon be needed and so requests those packets prior to the actual need for them.

For example, as shown in FIG. 28, switching from one IPG page to another may be anticipated using certain threshold settings in the guide portion of the IPG page. Consider a viewer traversing vertically within the page and passing an upper threshold (e.g., channel 18). Before the viewer selection reaches the end of the page, the terminal starts searching for the PIDs carrying the program guide for the next upper group of channels (e.g., channels 21-30). In accordance with an embodiment of the invention, if the current transport stream does not include those PIDs, then those PIDs are requested from the head-end once the threshold has been passed. The head-end then delivers those PIDs, either in another transport stream, or by modifying the contents of the current transport stream. The delivery may be accomplished using either a pointcast to the requesting terminal or a narrowcast to a set of terminals that includes the requesting terminal. Analogous processes would occur when a viewer traverses vertically within the IPG page and passes a lower threshold.

The stream priming technique reduces latency by viewer user movement within a page to predict page switching beforehand and taking the appropriate action.

The stream priming technique may also be applied in a time dimension. For example, near the end of a particular 1-hour time period (e.g., within the last ½ hour of the period), the terminal may anticipate that a viewer may want to view the listings in the next 1-hour time period. Hence, if the current transport stream does not include the listings for the next time period, then the listings for the next time period are requested in anticipation of the demand.

4. Stream Indexing

In an embodiment, the head-end provides a program mapping table (PMT) for each broadcast channel. The PMT conveys to each terminal the PID assignment for each IPG (video, audio, and data) page being provided.

Consider, for example, a program guide including 24 time slots per day, with each time slot covering one hour. Further, consider a system with 20 IPG pages per time slot, with each IPG page assigned with a corresponding video PID. In this example, 24 slots×20 PIDs per slot=480 PIDs are required to provide program guide for one day. Also, if two weeks of programming content is to be stored at the head-end, then 14 days×480 PIDs per day=6720 PIDs are required for two weeks of program guide.

For each IPG page (e.g., each video PID), a data message can be used to deliver overlay, user interaction, and other desired features and functionality related to the page. This data may be delivered either using a separate data PID for each IPG page, or via a data PID that is shared by multiple IPG pages. The former option, however, may be impractical for a typical system. This is because if one data PID is needed for each IPG page, then the total number of PIDs needed to be stored at the head-end for two weeks doubles from 6720 to 13,440. Such a high number of PIDs are not currently supported by a typical encoding system. For example, MPEG-2 provides only 8192 PIDs for use due to its 13-bit PID, and some of those PIDs are pre-assigned or reserved.

Figure 29:
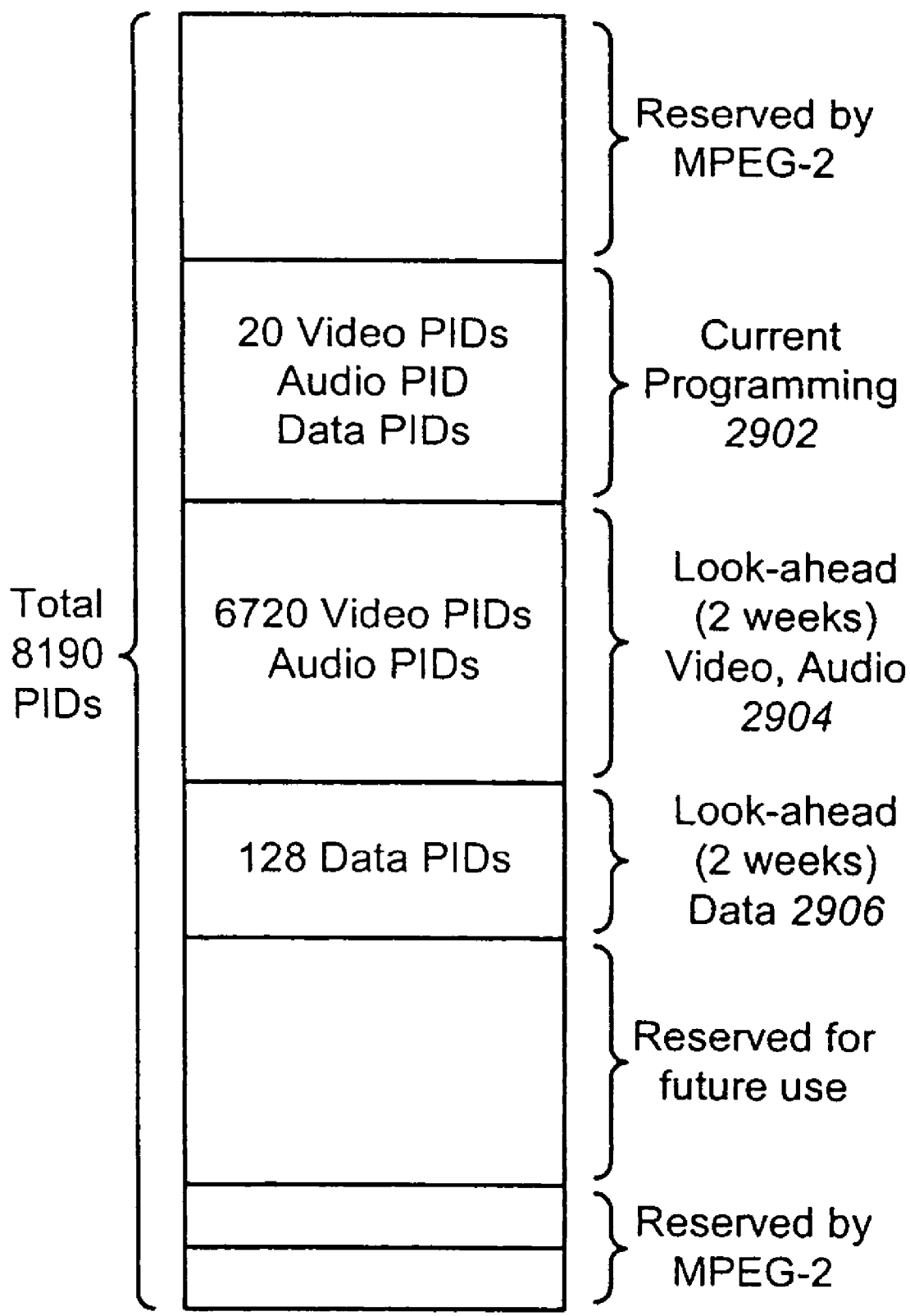
FIG. 29 is a diagram illustrating a program mapping table (PMT) in accordance with an embodiment of the invention.

FIG. 29 is a diagram illustrating a program mapping table (PMT) in accordance with an embodiment of the invention. The PMT includes a current programming area 2902 that contains, illustratively, 20 video PIDs, related data PIDs, and an audio PID for the 20 IPG pages covering the current 1-hour time slot (i.e., the time slot covering the programming currently being broadcast). Current programming area 2902 of the PMT is used (like a cache memory in some fashion) to temporarily store information that is most likely to be accessed by the viewers.

A next area 2904 of the PMT is allocated for the 2 weeks of video and audio programming to be stored. Illustratively, this area 2904 may include 6720 video and audio PIDs. Note that the current video and audio programming are also stored in this area 2904 (as well as in current programming area 2902).

A next area 2906 of the PMT is allocated for the 2 weeks of look-ahead data information associated with the look-ahead video information. For purposes of illustration, this look-ahead data area 2906 may be allocated 128 data PIDs, with each data PID being used to store look-ahead data information relating to multiple video PIDs.

Other areas of the PMT include areas reserved by MPEG-2 and areas reserved for future use.

Figures 30A, 30B:
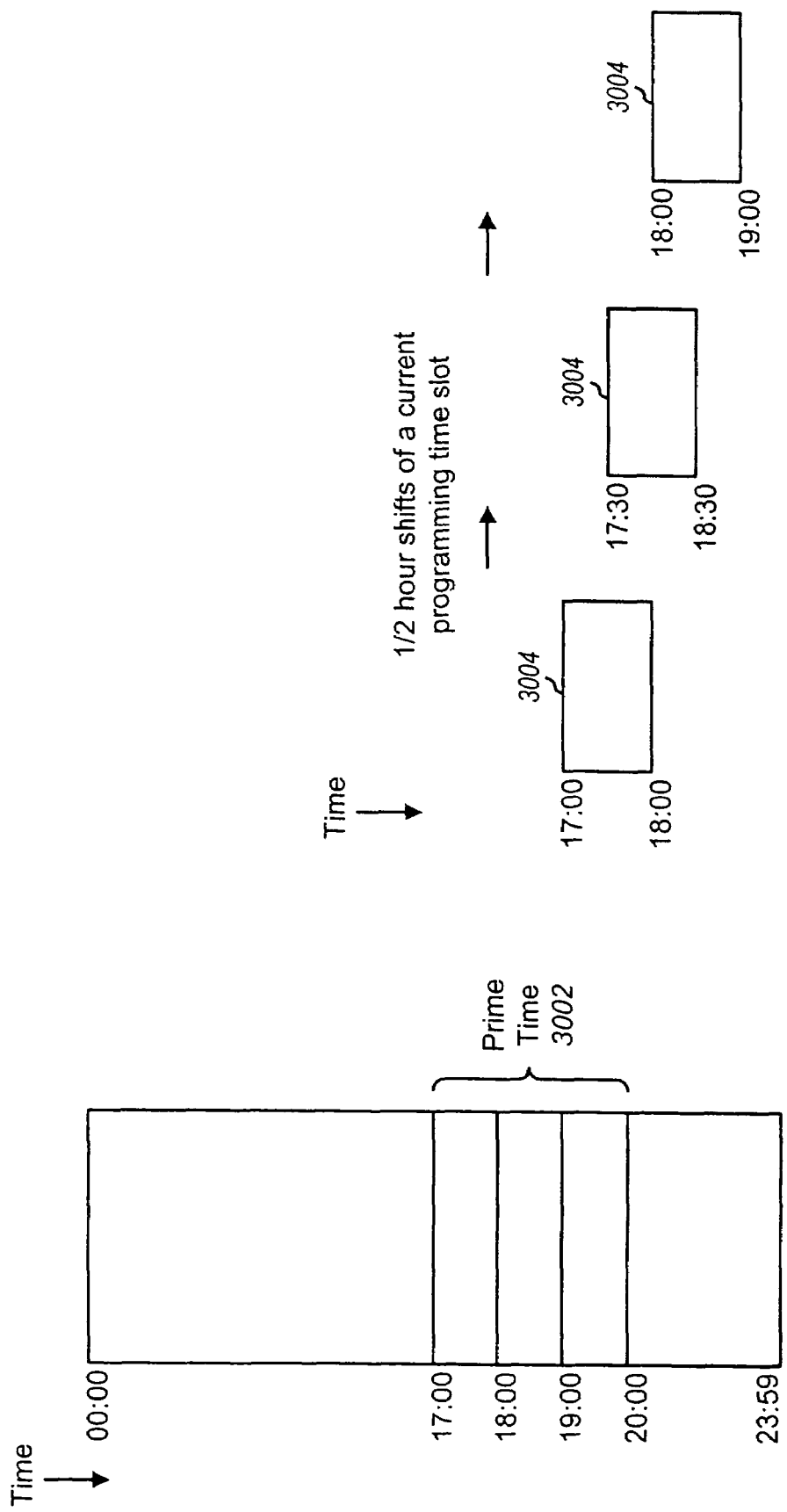
FIGS. 30A and 30B are diagrams illustrating prime time slots and half-hour shifts of a current programming time slot, respectively, in accordance with an embodiment of the invention.

FIGS. 30A and 30B are diagrams illustrating (a) prime time slots and (b) half-hour shifts of the current programming time slot, respectively, in accordance with an embodiment of the invention. As shown in FIG. 30A, the time periods in a day during which broadcast programming is most popularly watched are the three time slots between 5:00 pm (17:00) and 9:00 pm (21:00). In addition to such defined prime time period from 5:00 pm to 9:00 pm, the prime time information may be adjusted according to statistics of viewing on a local neighborhood or national scale.

As shown in FIG. 30B, the current programming time slot 3004 may be shifted in half-hour increments. While the 2 weeks of look-ahead IPG video data are stored in 1-hour time slots (e.g., 17:00 to 18:00, 18:00 to 19:00, and so on), the current programming time slot 3004 is arranged by half hour increments by retrieving and re-organizing the look-ahead video data as necessary.

Figure 31:
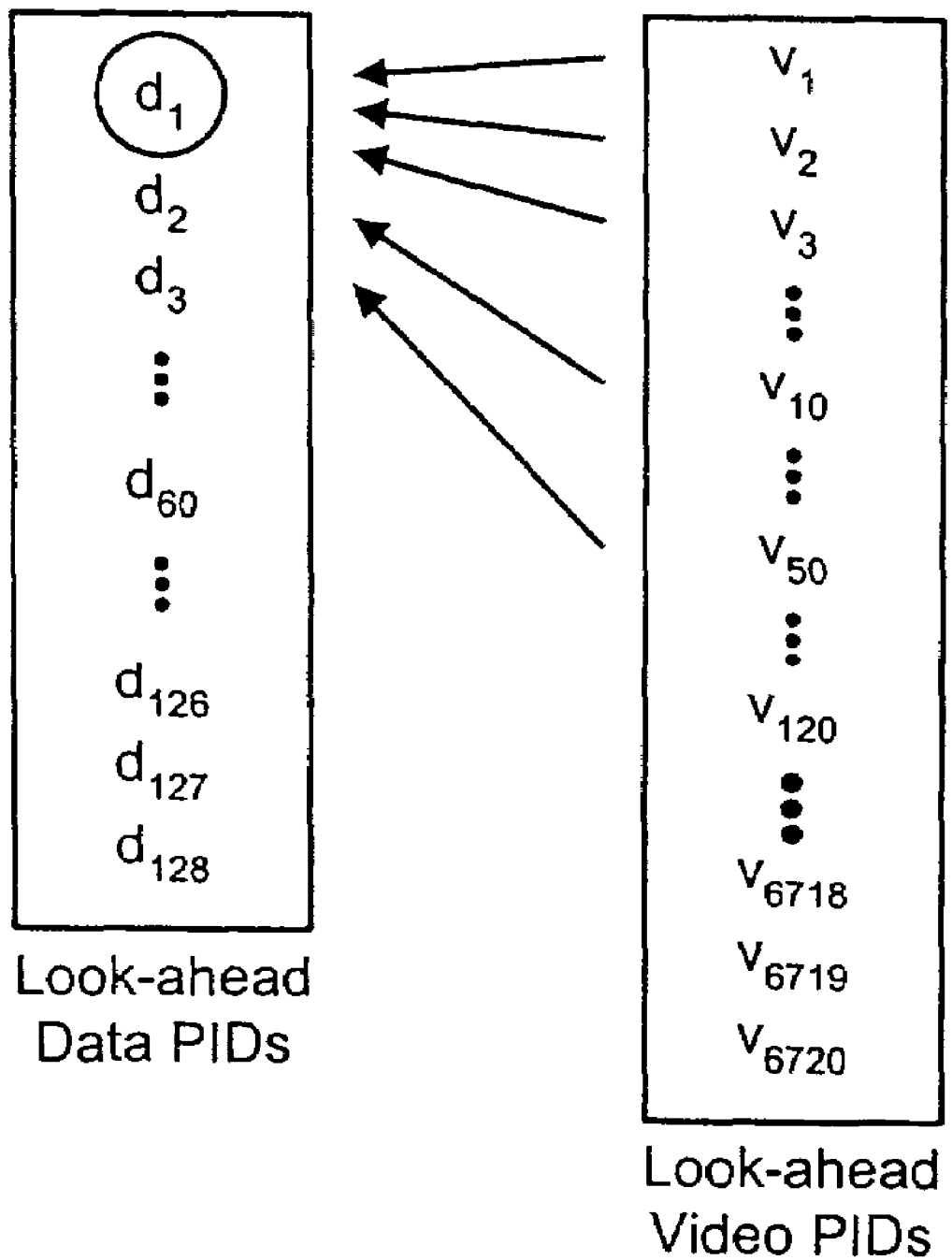
FIG. 31 is a diagram illustrating a mapping of look-ahead video PIDs to look-ahead data PIDs in accordance with an embodiment of the invention.

FIG. 31 is a diagram illustrating a mapping of look-ahead video PIDs to look-ahead data PIDs in accordance with an embodiment of the invention. Such a mapping is used when there is substantially more look-ahead video PIDs (6720 in this example) than look-ahead data PIDs (128 in this example). When there is substantially more video PIDs than data PIDs, each data PID is used on average to carry data information for multiple video PIDs. In this example, since there are 6720 look-ahead video PIDs and 128 look-ahead data PIDs, approximately 50 video PIDs are assigned on the average to each data PID. In particular, FIG. 31 illustrates, by way of example, the possible assignment of the first 50 look-ahead video PIDs to the first look-ahead data PID.

If the stream serving capability of the head-end were unlimited, then all 2 weeks of the look-ahead streams may be delivered from the head-end to the terminals. However, the limited stream serving capability of the head-end prevents this. In addition, it may not be necessary in practice to deliver all 2 weeks of the look-ahead streams because viewers do not typically require the guide information so far in advance.

Hence, in accordance with an embodiment of the invention, only a subset of the 2 weeks of look-ahead streams may be delivered at any given moment in time.

Figure 32:
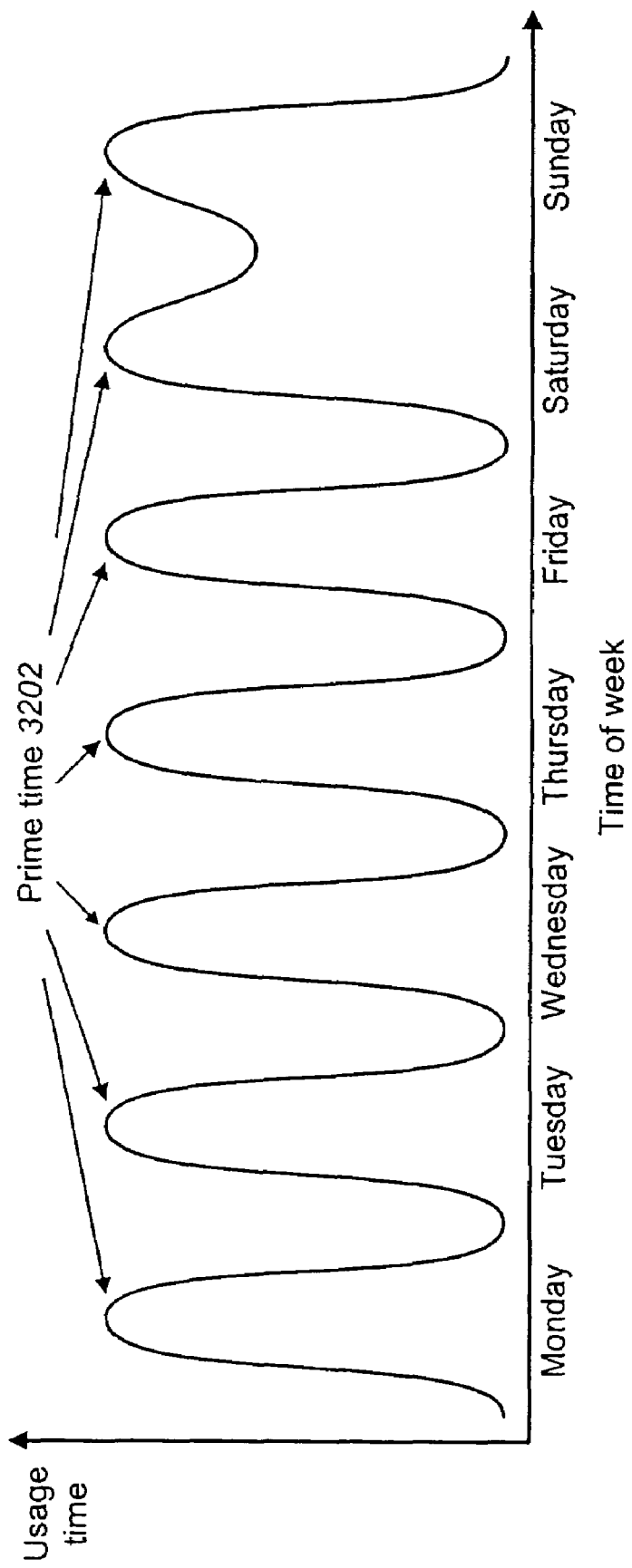
FIG. 32 is a diagram illustrating television usage time during a typical week.

FIG. 32 is a diagram illustrating television usage time during a typical week. As shown in FIG. 32, the usage typically peaks during the prime time period 3202 of a day. The daily pattern generally repeats itself during the weekdays, with non-prime time usage increasing on the weekends.

In addition to the general usage pattern with its weekly cycle illustrated in FIG. 32, certain IPG pages may receive particularly heavy viewing from certain viewer groups during certain time intervals. For example, the sport channel lists may receive particularly heavy viewing during the NBA (National Basketball Association) playoff games in the NBA playoff season. Hence, further evaluation of viewer IPG usage statistics may reveal other cyclic structures with different periods. These cyclic structures may be seasonal, as in the NBA playoff example.

These cyclic structures depend on, and may be characterized based on, common variables relating to the IPG system being used. These common variables may include, for example, t, p, and d. The variable t is a number from 1 to 24 representing a particular 1-hour time slot in a day. For example, the time slot from noon to 1:00 pm may be represented by t=13. The variable p is a number represents a particular IPG page among the total number of IPG pages (e.g., from 1 to 20). The variable d is a number from 1 to 14 representing a particular day of the 2 weeks of look-ahead programming (i.e., the number of look-ahead days).

Figure 33A:
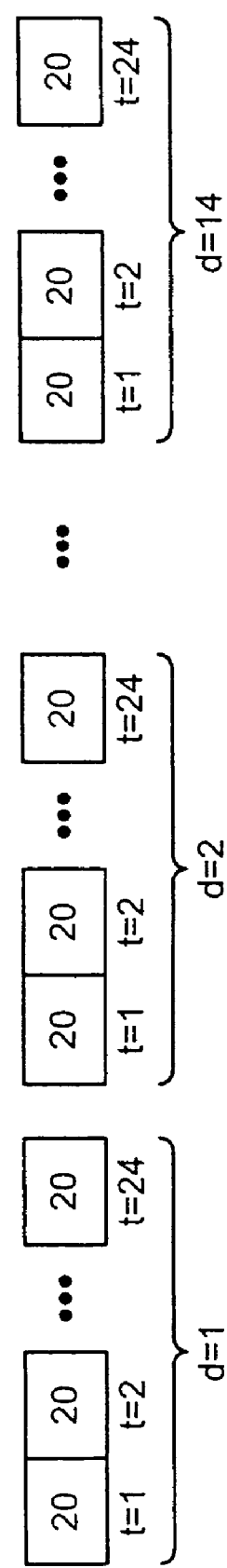

FIG. 33A is a diagram illustrating a first look-ahead video PID layout 3300 in accordance with an embodiment of the invention. For each day, first video PID layout 3300 groups the 20 video PIDs for each time slot together, and further organizes the groups serially in ascending order of the variable t, going from t=1 to t=24. Further, first layout 3300 serially repeats the daily organization for each of the 14 days, going from d=1 to d=14.

Based on first look-ahead video PID layout 3300, daily prime time viewings follow each other in a cycle with a periodicity of 480 PIDs (the number of video PIDs for a day). This periodicity corresponds to incrementing the variable d by one.

Other possible viewing cycles may have different periodicities in terms of the variables p, t, and d. For example, a very popular show broadcast every Monday at 9:00 PM (in time slot t=21) may have its corresponding IPG page (e.g., page p=17) viewed very frequently. This would relate to a viewing cycle for page p=17 at time slot t=21 which repeats in increments of 7 for variable d. Hence, many viewing cycles may be characterized in terms of periodicities in the variables p, t, and d.

It may be undesirable to map many very popularly viewed video PIDs on the same data PID because of the uneven load distribution this may cause. Instead, it is advantageous to distribute the popularly viewed video PIDs evenly among the data PIDs to balance the load. One algorithm for such distribution is described below.

FIG. 33B is a diagram illustrating a method 3320 of forming a second look-ahead video PID layout in accordance with an embodiment of the invention. Method 3320 of forming the second layout includes two steps. The first step 3322 involves choosing the largest prime number that is less than or equal to the number of look-ahead data PIDs available. In this example, the number of look-ahead data PIDs available is 128, so the prime number within that constraint is 127.

The second step 3324 involves assigning a data PID to each video PID. This is done by taking the video PID number and performing a modulo with the prime number. Equivalently, the video PID number is divided by the prime number and the remainder of that division is the data PID number to be assigned to the video PID. For example, if the video PID number is 260, then data PID number 6 is assigned.

Method 3320 of FIG. 33B results in uniform distribution among the data PIDs of extensively viewed video PIDs with various cyclic periods. The uniform distribution results because a prime number does not contain any multiples of any other number, so a periodic sequence of numbers divided by a prime number yields a different remainder for each entry in the sequence.

For example, consider the following cyclic sequence of video PIDs with a periodicity of 480: 0, 480, 960, and so on. Dividing each entry in the sequence by the prime number 127 yields the following remainders: 0, 99, 71, and so on. This sequence of remainders becomes the data PIDs assigned to the corresponding video PIDs. Notice that the assigned data PID is generally not repeated using this method. In this way, method 3320 achieves even distribution among data PIDs of extensively viewed video PIDs with various cyclic periods.

Alternatively, if the divisor selected is not a prime number, then the distribution may be uneven. For example, if the divisor is 120, then for the above cyclic sequence of video PIDs with periodicity of 480, dividing by 120 yields the following remainders: 0, 0, 0, 0, and so on. Hence, in this example, each of the video PIDs in the sequence would be assigned to the same data PID (e.g., data PID0). If all those video PIDs were for prime time, then data PID0 would receive a large and uneven load of usage.

Figure 33C:
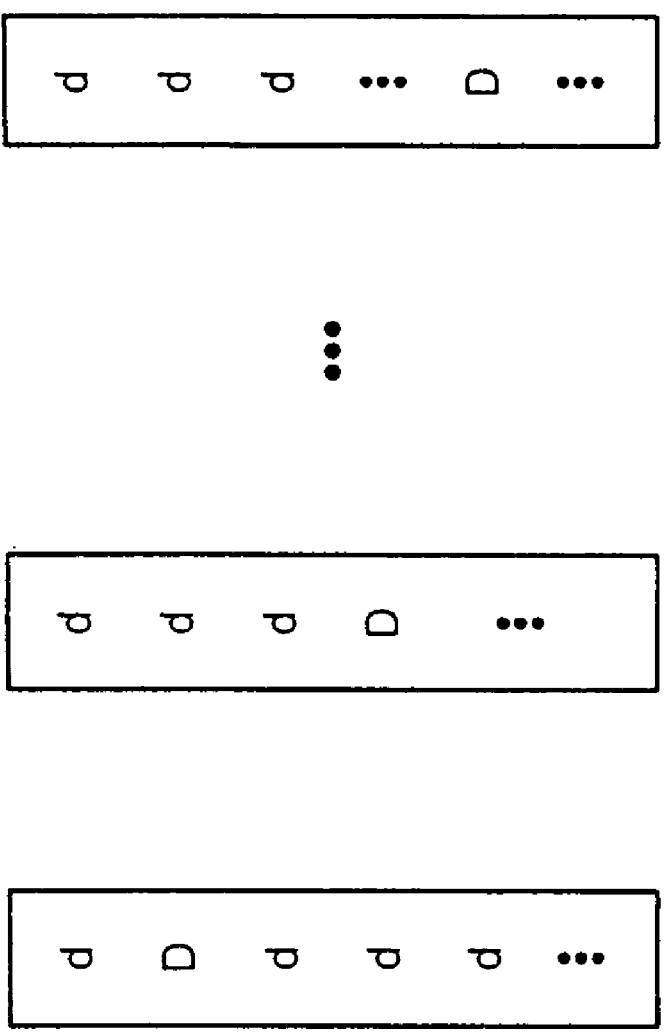
FIG. 33C is a diagram illustrating the distribution of data messages among data PIDs in accordance with an embodiment of the invention.

FIG. 33C is a diagram illustrating the distribution of data messages among data PIDs in accordance with an embodiment of the invention. FIG. 33C relates to the case where multiple data messages (associated with multiple video PIDs) share the same data PID.

In FIG. 33C, the small "d" represents non-prime time data messages, and the capital "D" represents prime time data messages. Due to the application of method 3320 of FIG. 33B to determine assignment of the data messages to the data PIDs, the prime time data messages D are evenly distributed among the data PIDs.

G. System

1. Head-End

Figure 12A:
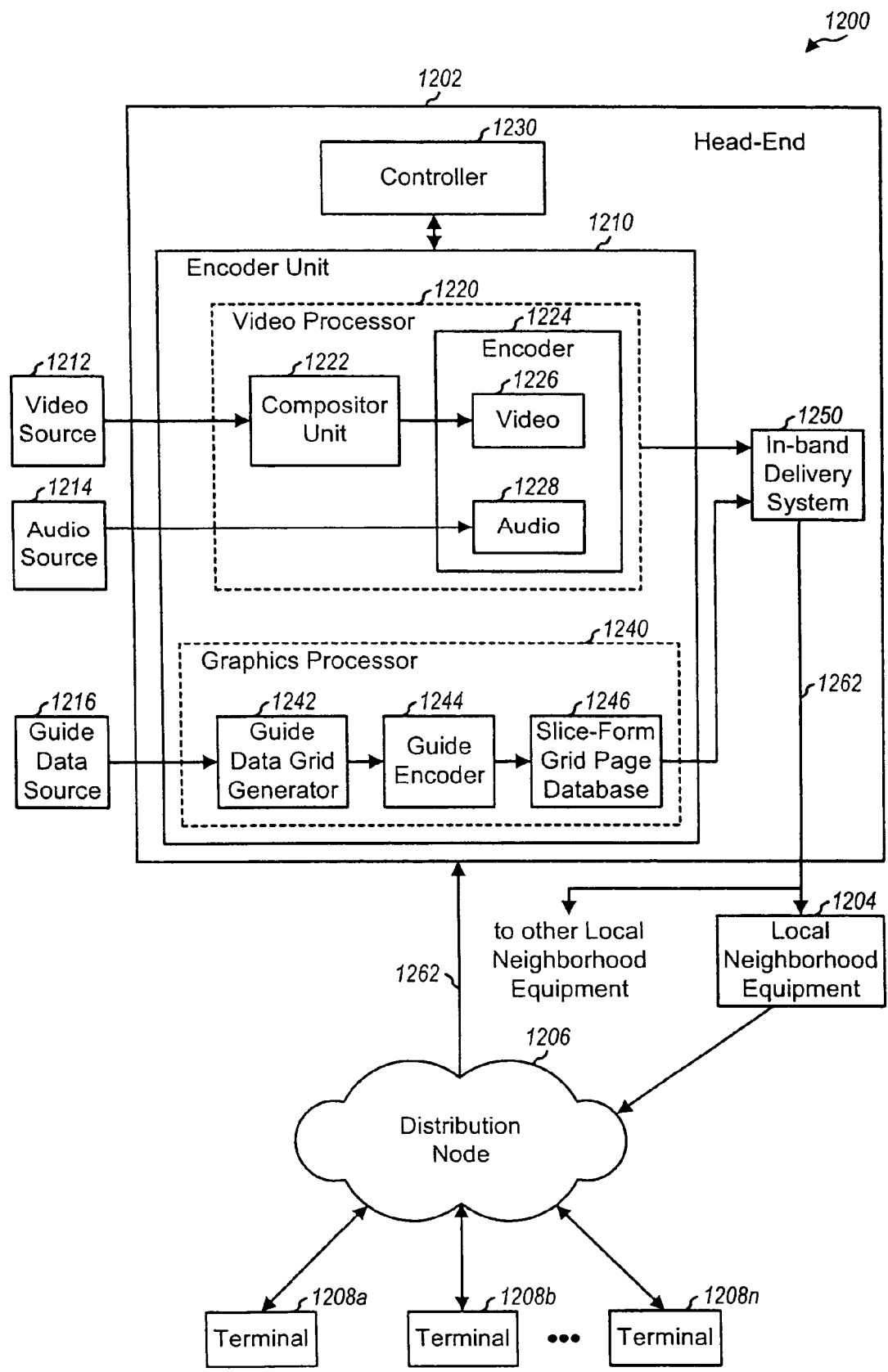
FIG. 12A is a diagram of a server-centric system architecture for managing delivery of an interactive user interface.

FIG. 12A is a block diagram of an embodiment of an information distribution system 1200 that can be used to provide interactive program guide and to implement various aspects of the invention. Distribution system 1200 includes a head-end 1202, local neighborhood equipment (LNE) 1204, one or more distribution nodes 1206 (e.g., a hybrid fiber-coax network), and a number of set top terminals (STTs) 1208.

Distribution system 1200 is described in further detail in U.S. patent application Ser. No. 08/984,710, filed Dec. 3, 1997; Ser. No. 09/431,330, entitled "SERVICE PROVIDER SIDE IPG ENCODER," filed Nov. 1, 1999; Ser. No. 09/539,228, entitled "MESSAGING PROTOCOL FOR DEMAND-CAST SYSTEM AND BANDWIDTH MANAGEMENT," filed Mar. 30, 2000; and Ser. No. 09/604,835, entitled "SYSTEM AND METHOD FOR DELIVERY OF SHORT-TIME DURATION VIDEO SEGMENTS," filed Jun. 27, 2000. These patent applications are assigned to the assignee of the invention and incorporated herein by reference. One specific implementation of distribution system 1200 is known as the DIVA™ System provided by DIVA Systems Corporation.

Head-end 1202 produces a number of digital streams that contain encoded information in (e.g., MPEG-2) compressed format. These streams are then modulated using a modulation technique that is compatible with a communications channel 1262 that couples head-end 1202 to one or more LNEs 1204 (only one LNE 1204 is shown in FIG. 12A for simplicity). LNE 1204 is typically located away from head-end 1202. LNE 1204 selects data for viewers in the LNE's neighborhood and re-modulates the selected data in a format that is compatible with distribution node 1206. Although system 1200 is depicted as having head-end 1202 and LNE 1204 as separate components, those skilled in the art can realize that the functions of the LNE may be incorporated into head-end 1202. Also, the elements of system 1200 can be physically located anywhere, and need not be near each other.

In system 1200, the program streams are addressed to particular STT locations that requested the information through an interactive menu. An interactive menu structure for requesting video-on-demand is disclosed in commonly assigned U.S. patent application Ser. No. 08/984,427, filed Dec. 3, 1997. Another example of the interactive menu for requesting multimedia services is the interactive program guide disclosed in commonly assigned U.S. Patent Application Serial No. 60/093,891, filed in Jul. 23, 1998.

To assist a viewer in selecting programming, head-end 1202 produces information that can be assembled to create an IPG page such as that shown in FIG. 9. Head-end 1202 produces the components of the IPG page as bitstreams that are compressed prior to transmission.

Within head-end 1202, a video source 1212 supplies a video sequence for the video portion of the IPG pages, an audio source 1214 supplies one or more audio signals associated with the video sequence, and a guide data source 1216 provides program guide data for the guide portion of the IPG pages. The guide data is typically in a database format, where each entry describes a particular program by its title, presentation time, presentation date, descriptive information, channel, and program source. The video sequence, audio signals, and program guide data are provided to an encoder unit 1210.

Encoder unit 1210 (which is described in further detail below) compresses the received video sequence into one or more elementary streams, the audio signals into one or more elementary streams, and the guide produced from the guide data into one or more elementary streams. The elementary streams can be produced using a picture-based encoding technique, a slice-based encoding technique, or a combination thereof, as described above. The elementary streams are then provided to an in-band delivery system 1250 (e.g., cable modem).

Within delivery system 1250, the elementary streams are assembled into one or more transport streams that are then modulated using a modulation format that is compatible with communication channel 1262. For example, communication channel 1262 may be a fiber optic channel that carries high-speed data from head-end 1202 to a number of LNE 1204. LNE 1204 selects the IPG page components that are applicable to its neighborhood and re-modulates the selected data into a format that is compatible with distribution node 1206. A detailed description of LNE 1204 is described in U.S. patent application Ser. No. 09/583,388, entitled "ENCODING OPTIMIZATION TECHNIQUES FOR ENCODING PROGRAM GRID SECTIONS OF SERVER-CENTRIC INTERACTIVE PROGRAM GUIDE," filed May 30, 2000, assigned to the assignee of the invention and incorporated herein by reference.

STT 1208 receives and demodulates the signals provided by distribution node 1206 and decodes the demodulated signals to retrieve the IPG pages from the stream. The design of STT 1208 is described in further detail below.

As shown in FIG. 12A, encoder unit 1210 includes a video processor 1220 and a graphics processor 1240. Video processor 1220 further includes a compositor unit 1222 and an encoder 1224. Compositor unit 1222 combines the video sequence from video source 1212 with advertising video, advertiser or service provider logos, still graphics, animation, other video information, or a combination thereof. The video sequence from compositor unit 1222 is then provided to encoder 1224.

Encoder 1224 includes one or more video encoders 1226 (e.g., real-time MPEG-2 encoders) and one or more audio encoders 1228 (e.g., AC-3 encoders). Video encoder 1226 receives the video sequence from compositor unit 1222 and forms a (e.g., slice-based) bitstream (e.g., an MPEG-2 compliant bit stream) for the video portion of an IPG page. In an embodiment, video encoder 1226 "pads" the graphics portion (illustratively the left half portion of the IPG page corresponding to the guide listing) with null data. The null data may be replaced by the graphics grid slices (e.g., at a later step, within the LNE). In this embodiment, video encoder 1226 is designed for, and efficiently processes only motion video information, excluding the graphics data. Audio encoder 1228 receives the audio signals and forms a bitstream for the audio portion of the IPG page. Encoder 1224 produces one or more elementary streams containing picture-based or slice-based encoded video and audio information.

A controller 1230 couples to encoder unit 410 and manages the (e.g., slice-based) encoding process such that the video encoding process is temporally and spatially synchronized with the grid encoding process. For slice-based encoding, this synchronization can be achieved by defining the slice start and stop locations according to the objects in the IPG page layout and managing the encoding process as defined by the slices.

In an embodiment, the graphics (e.g., guide) portion of the IPG page is separately encoded by graphics processor 1240. Graphics processor 1240 receives the guide data from guide data source 1216. A guide data grid generator 1242 within graphics processor 1240 formats the guide data into a "grid", e.g., having a vertical axis of program sources and a horizontal axis of time increments. The guide grid is a video picture that is encoded using a guide encoder 1244 designed for video with text and graphics content. Guide encoder 1244, which can be implemented in software, encodes the guide data grid (e.g., via a slice-based encoding technique) to produce one or more bitstreams that collectively represent the entire guide data grid. Guide encoder 1244 is designed to effectively encode the graphics and text content.

For slice-based encoding, controller 1230 defines the start and stop macroblock locations for each slice. The result is a GOP structure having intra-coded pictures containing intra-coded slices and predicted pictures containing predictive-coded slices. The intra-coded slices are separated from the predictive-coded slices. Each coded slice is separately stored in a slice-form grid page database 1246. The individual slices can be addressed and retrieved from database 1246 as required for transmission. Controller 1230 controls the slice-based encoding process and further manages database 1246.

For a server-centric system, since the program guide database resides at the head-end, a two-way communication system via a back-channel 1264 from terminal 1208 through distribution node 1206 to head-end 1202, is utilized to support requests from the terminal. Back-channel 1264 can be used to send requests and other messages from terminal 1208 to head-end 1202.

2. Local Neighborhood Equipment (LNE)

Figure 12B:
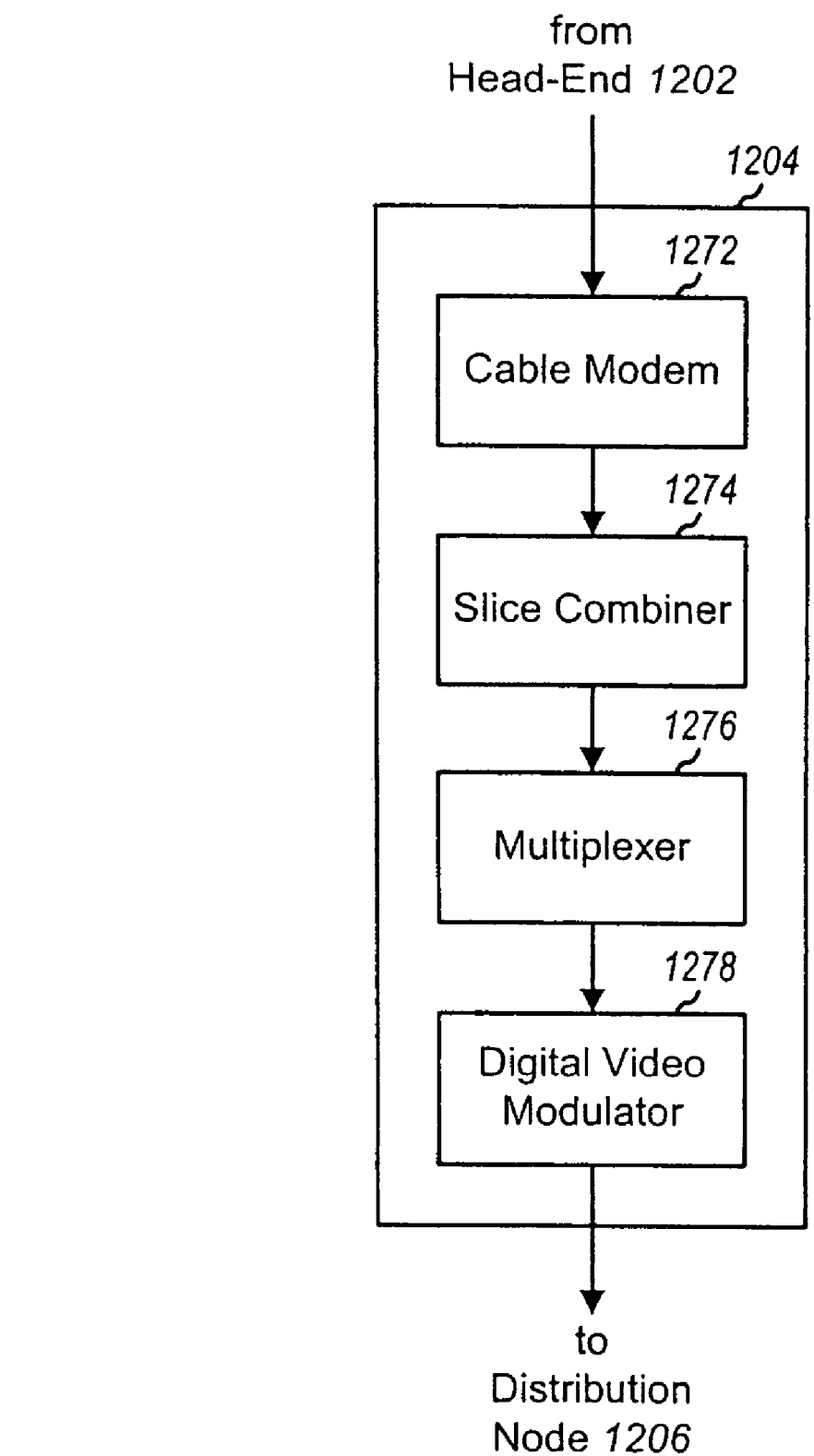
FIG. 12B is a diagram of a local neighborhood equipment.

FIG. 12B is a block diagram of an embodiment of LNE 1204. In this embodiment, LNE 1204 includes a cable modem 1272, slice combiner 1274, a multiplexer 1276 and a digital video modulator 1278. LNE 1204 is coupled illustratively via cable modem 1272 to head-end 1202 and receives one or more transport streams containing the encoded video, guide, data, and audio information. Cable modem 1272 demodulates the signal from head-end 1202 and extracts the (MPEG) coded information from the received signal. Slice combiner 1274 combines the received video slices with the guide slices in an order such that the decoder at the terminals can easily decode the IPG without further slice re-organization. The resultant combined slices are assigned PIDs and formed into one or more (e.g., MPEG-compliant) transport streams by multiplexer 1276. The scanning, combination, and multiplexing of the slices are described above. The transport stream(s) are transmitted via a digital video modulator 1278 to distribution node 1206.

LNE 1204 is programmed to extract particular information from the signal transmitted by head-end 1202. As such, LNE 1204 can extract video and guide slices that are targeted to the viewers coupled to the LNE. For example, LNE 1204 can extract specific channels for representation in the guide grid that are available to the viewers coupled to that LNE. As such, unavailable channels to a particular neighborhood would not be depicted in a viewer's IPG. Additionally, the IPG can include targeted advertising, e-commerce, program notes, and others. As such, each LNE can combine different guide slices with different video slices to produce IPG pages that are prepared specifically for the viewers coupled to that particular LNE. Other LNEs may select different IPG component information that is relevant for their associated viewers.

3. Set Top Terminal

Figure 34:
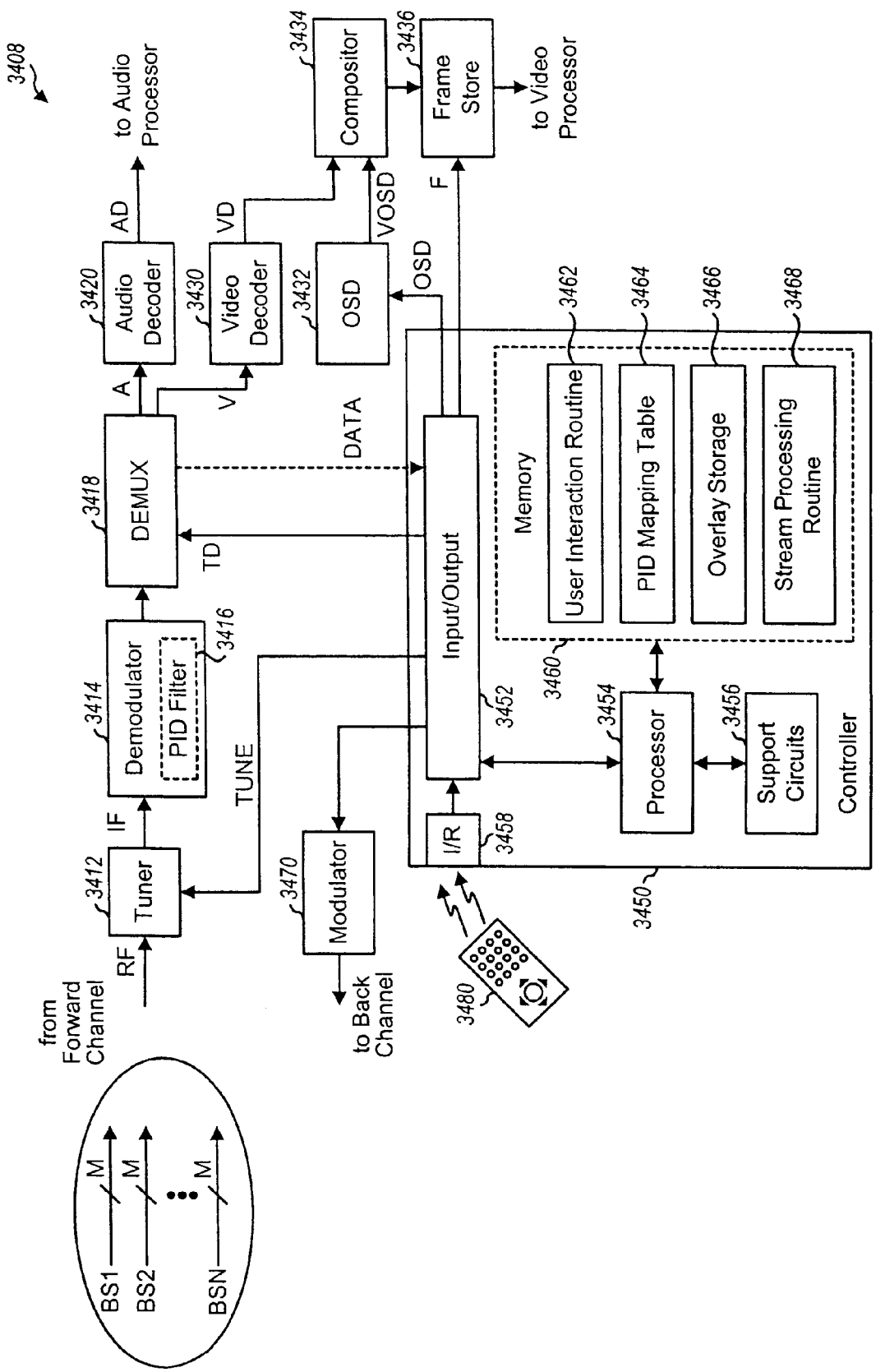
FIG. 34 is a block diagram of a receiver within subscriber equipment suitable for use in an interactive information distribution system.

FIG. 34 depicts a block diagram of an embodiment of set top terminal (STT) 3408 suitable for producing an IPG page and supporting various aspects of the invention. STT 3408 includes a tuner 3412, a demodulator 3414, a transport demultiplexer 3418, an audio decoder 3420, a video decoder 3430, an on-screen display (OSD) processor 3432, a video compositor 3434, a frame store memory 3436, a controller 3450, and a modulator 3470. User interaction is provided via a remote control unit 3480. Tuner 3412 receives, e.g., a radio frequency (RF) signal comprising, for example, a number of broadcast (e.g., QAM) signals from a downstream (forward) channel. Tuner 3412, in response to a control signal TUNE, tunes to and processes a particular broadcast signal to produce an intermediate frequency (IF) signal. Demodulator 3414 receives and demodulates the IF signal to produce an information stream, illustratively an MPEG transport stream. The transport stream is provided to a transport stream demultiplexer 3418.

Demultiplexer 3418, in response to a control signal TD produced by controller 3450, demultiplexes (i.e., extracts) an audio stream A and a video stream V. The audio stream A is provided to audio decoder 3420, which decodes the audio stream and provides a decoded audio stream to an audio processor (not shown) for subsequent presentation. The video stream V is provided to video decoder 3430, which decodes the compressed video stream V to produce an uncompressed video stream VD that is provided to video compositor 3434. OSD processor 3432, in response to a control signal OSD produced by controller 3450, produces a graphical overlay signal VOSD that is provided to video compositor 3434. In an embodiment, during transitions between streams representing different IPG pages, the buffers in the decoder are not reset. As such, the pages seamlessly transition from one page to another.

Video compositor 3434 merges the graphical overlay signal VOSD and the uncompressed video stream VD to produce a modified video stream (i.e., the underlying video images with the graphical overlay) that is provided to frame store unit 3436. Frame store unit 3436 stores the modified video stream on a frame-by-frame basis according to the frame rate of the video stream. Frame store unit 3436 provides the stored video frames to a video processor (not shown) for subsequent processing and presentation on a display device.

Controller 3450 includes an input/output module 3452, a microprocessor 3454, support circuitry 3456, an infrared (IR) receiver 3458, and a memory 3460. Input/output module 3452 forms an interface between controller 3450 and tuner 3412, transport demultiplexer 3418, OSD processor 3432, back-channel modulator 3470, and remote control unit 3480. Microprocessor 3454 cooperates with support circuitry 3456 such as power supplies, clock circuits, cache memory, and the like as well as circuits that assist in executing the software routines that are stored in memory 3460.

Although controller 3450 is depicted as a general-purpose processor that is programmed to perform specific interactive program guide control function in accordance with the invention, the controller can be implemented in hardware as an application specific integrated circuit (ASIC). As such, the process steps described herein are intended to be broadly interpreted as being equivalently performed by software, hardware, or a combination thereof.

In the embodiment shown in FIG. 34, remote control unit 3480 includes an 8-position joystick, a numeric pad, a "Select" key, a "Freeze" key and a "Return" key. User manipulations of the joystick or keys of the remote control device are transmitted to controller 3450 via an infrared (IR) link or an RF link. Controller 3450 is responsive to such user manipulations, executes related user interaction routines 3462, and uses particular overlays that are available in an overlay storage 3466.

After the signal is tuned and demodulated, the video streams are recombined via a stream processing routine 3468 to form the video sequences that were originally compressed. Stream processing routine 3468 employs a variety of methods to recombine slice-based streams, including using PID filter 3416 and demultiplexer 3418, as described in the aforementioned U.S. patent application Ser. No. 09/583,388. Note that the PID filter implemented illustratively as part of demodulator 3414 is utilized to filter the undesired PIDs and retrieve the desired PIDs from the transport stream. The packets to be extracted and decoded to form a particular IPG page are identified by a PID mapping table 3464. After stream processing routine 3468 has processed the streams into the correct order (assuming the correct order was not produced in the LNE), the slices are sent to (MPEG) video decoder 3430 to generate the original uncompressed IPG pages.

If a transport stream with two PIDs as described above is to be received and processed (e.g., for slice-based decoding), stream processing unit 3468 recombines the intra-coded slices with their corresponding predictive-coded slices in the appropriate order before the recombined streams are coupled to video decoder 3430. This process can be implemented by software or hardware, or a combination thereof. In the slice structure, only one slice is assigned per row and each row is divided into two portions (e.g., the guide portion and the video portion). In order for the receiving terminal to reconstruct the original video picture, one method is to construct the first row from its two slices in the correct order by retrieving two corresponding slices from the transport stream, then construct the second row from its two slices, and so on. In this manner, the terminal processes two PIDs in the same time period.

PID filter 3416 can be programmed to pass the desired PIDs and filter out the undesired PIDs. The desired PIDs are identified by controller 3450 after the viewer selects particular IPG page to review. PID mapping table 3464 is accessed by controller 3450 to identify which PIDs are associated with the desired IPG. If PID filter 3416 is available in the receiver terminal, it is used to retrieve the PIDs containing slices for the guide and video portions. Demultiplexer 3418 then extracts packets from these PIDs and provides the packets to video decoder 3430, in the order in which they arrived. If the STT does not have optional PID filter 3416, then demultiplexer 3418 performs the PID filtering and extracting functions. Depending on the particular STT implementation, a corresponding method is used to recombine and decode slice-based streams. These various methods are described in further detail below and in the aforementioned U.S. patent application Ser. No. 09/583,388.

H. Recombination Method for Slice-Based Decoding

The transmitted slices for the IPG pages, encoded in the manner described above, can be recombined in various manners. Some of these recombination methods are described below.

1. First Recombination Method

In the first recombination method, the slice-based intra-coded streams (e.g., for the guide and video portions) and the slice-based predictive-coded streams (for the predictive-coded pictures) to be recombined keep their separate PIDs until the point where they are depacketized. The recombination process is conducted within the transport demultiplexer of the terminal. For illustrative purposes, in a multi-program transport stream, each program consists of an I-PID for each intra-coded guide portion, one or more I-PIDs for the intra-coded video portion, a predictive PID for the predictive-coded guide and video portions, an audio PID, and a number of data PIDs. Any packet with a PID that matches any of the PIDs within the desired program (as identified in a program mapping table) are depacketized and the payload is sent to the video decoder. Payloads are sent to the decoder in the order in which the packets arrive at the demultiplexer.

Figure 35:
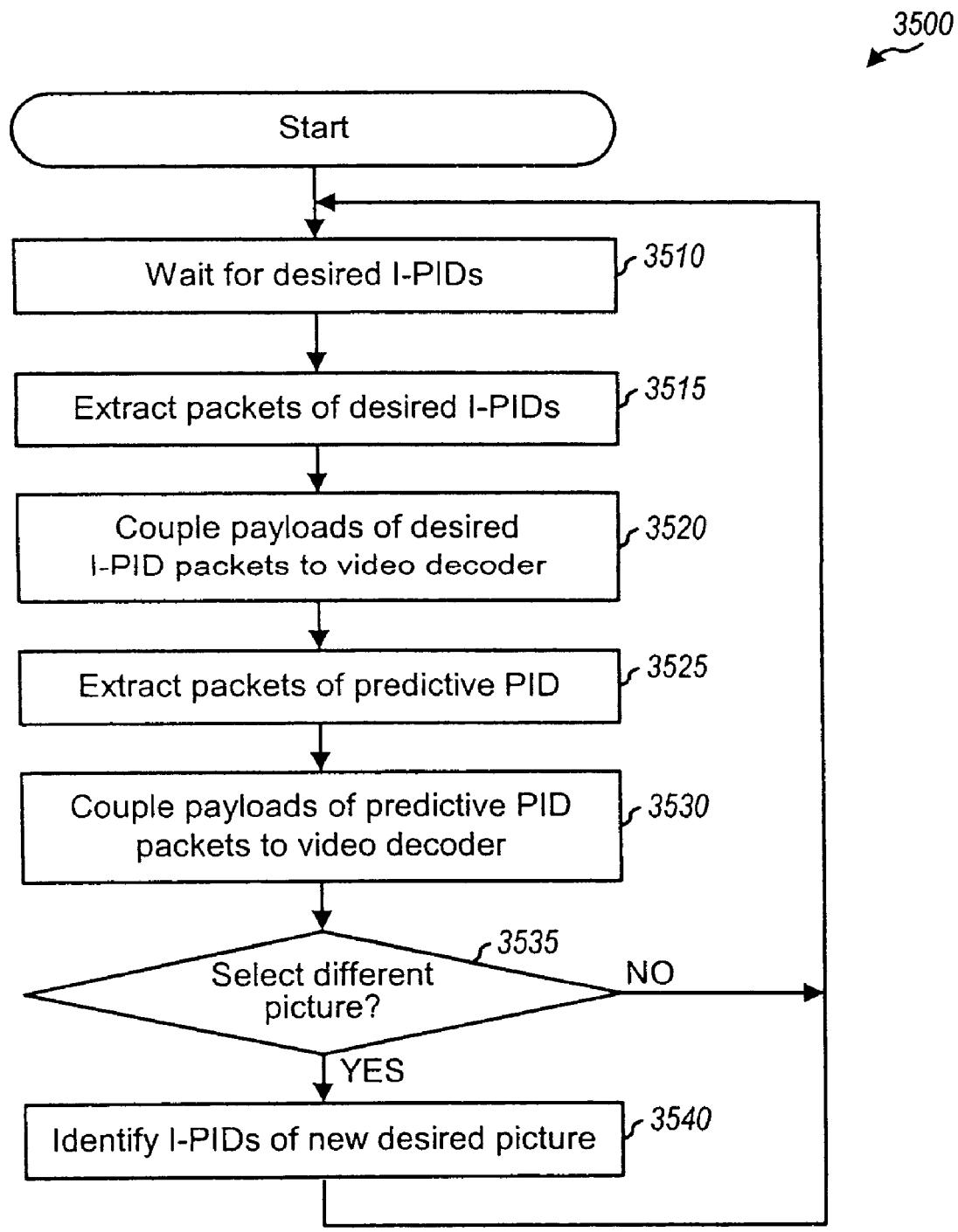
FIGS. 35-38 are flow diagrams of the first, second, third, and fourth slice recombination processes, respectively, in accordance with an embodiment of the invention.

FIG. 35 is a flow diagram of an embodiment of a first recombination process 3500. At step 3510, the process waits for a (viewer) selection for a picture (e.g., a particular IPG page) to be received. The I-PID for the selected picture, as the first picture of a video stream's GOP, identifies the stream to be received. However, since the slice-based encoding technique assigns two or more I-PIDs to the stream (i.e., an I-PID for the guide portion and one or more I-PIDs for the video portion), all (two or more) I-PIDs assigned for the selected picture are identified. A packet having any one of the identified I-PIDs is then detected.

At step 3515, the I-PID packets (e.g., packets with PID1 and PID11 for IPG page 1 in FIG. 10C) are extracted from the transport stream, including the header information and data, until the next picture start code. The header information within the first received I-PID access unit includes a sequence header, a sequence extension, a group start code, a GOP header, a picture header, and a picture extension, which are known to a reader that is skilled in MPEG-1 and MPEG-2 compression standards. The header information in the next I-PID access unit that belongs to the second and later GOPs includes the group start code, the picture start code, the picture header, and an extension. At step 3520, the payloads of the packets that include header information related to the video stream and the intra-coded picture are coupled to the video decoder as video information stream V.

At step 3525, the slice-based predictive-coded packets PRED-PID (e.g., PID12 in FIG. 10C) for fourteen predictive-coded pictures in a GOP of size fifteen are extracted from the transport stream. At step 3530, the payloads of the packets that include the header information related to the video stream and the predicted-coded pictures are coupled to the video decoder as video information stream V. At the end of step 3530, a complete GOP, including the intra-coded and predictive-coded slices, are available to the video decoder. As the payloads are sent to the decoder in the order in which the packets arrive at the demultiplexer, the video decoder decodes the recombined stream with no additional recombination processing.

At step 3535, a query is then made whether a different picture is requested, (e.g., a new IPG is selected). If a different picture is not requested, then the process returns to step 3510 and the demultiplexer waits for the next packets having the PIDs of the desired I-PIDs. Otherwise, if a different picture is requested, then the I-PIDs of the new desired picture are identified at step 3540, and the process returns to step 3510.

The process shown in FIG. 35 can be used to produce an MPEG-compliant video stream V by recombining the desired intra-coded slices and the predictive-coded slices from the GOP structure.

2. Second Recombination Method

In the second method for recombining the video stream, the transport stream is modified using a PID filter. The PID filter can be implemented as part of the demodulator, as shown in FIG. 34, or as part of the demultiplexer.

For illustrative purposes, in a multi-program transport stream, each program can include a number of I-PIDs for the video and guide portions, a predictive PID for the video and guide portions, an audio PID, and a number of data PIDs. Any packet with a PID that matches any of the PIDs in the desired program, as identified by the program mapping table (PMT) has its PID modified to the lowest PID in the program (the PID that is referenced first in the program's PMT). As a specific example, a program can include a guide slice I-PID of 50, a video slice I-PID of 51, and a predictive PID of 52. For this program, the PID-filter modifies the video I-PID and the predictive PID to 50 and thereby, the intra-coded and predictive-coded access units attain the same PID number and become a portion of a common stream. As a result, the transport stream from the PID filter contains a program with a single video stream having packets that appear in the proper order to be decoded as valid MPEG bitstream.

Note that the incoming bit stream does not necessarily contain any packets with a PID equal to the lowest PID referenced in the program's PMT. Also note that it is possible to modify the PIDs to other PID numbers than lowest PID without changing the operation of the process.

When the PIDs of incoming packets are modified to match the PIDs of other packets in the transport stream, the continuity counters of the merged PIDs may become invalid at the merge points, since each PID has its own continuity counter. For this reason, the discontinuity indicator in the adaptation field is set for any packets that may immediately follow a merge point. Any decoder components that check the continuity counter for continuity properly processes the discontinuity indicator bit.

Figure 36:
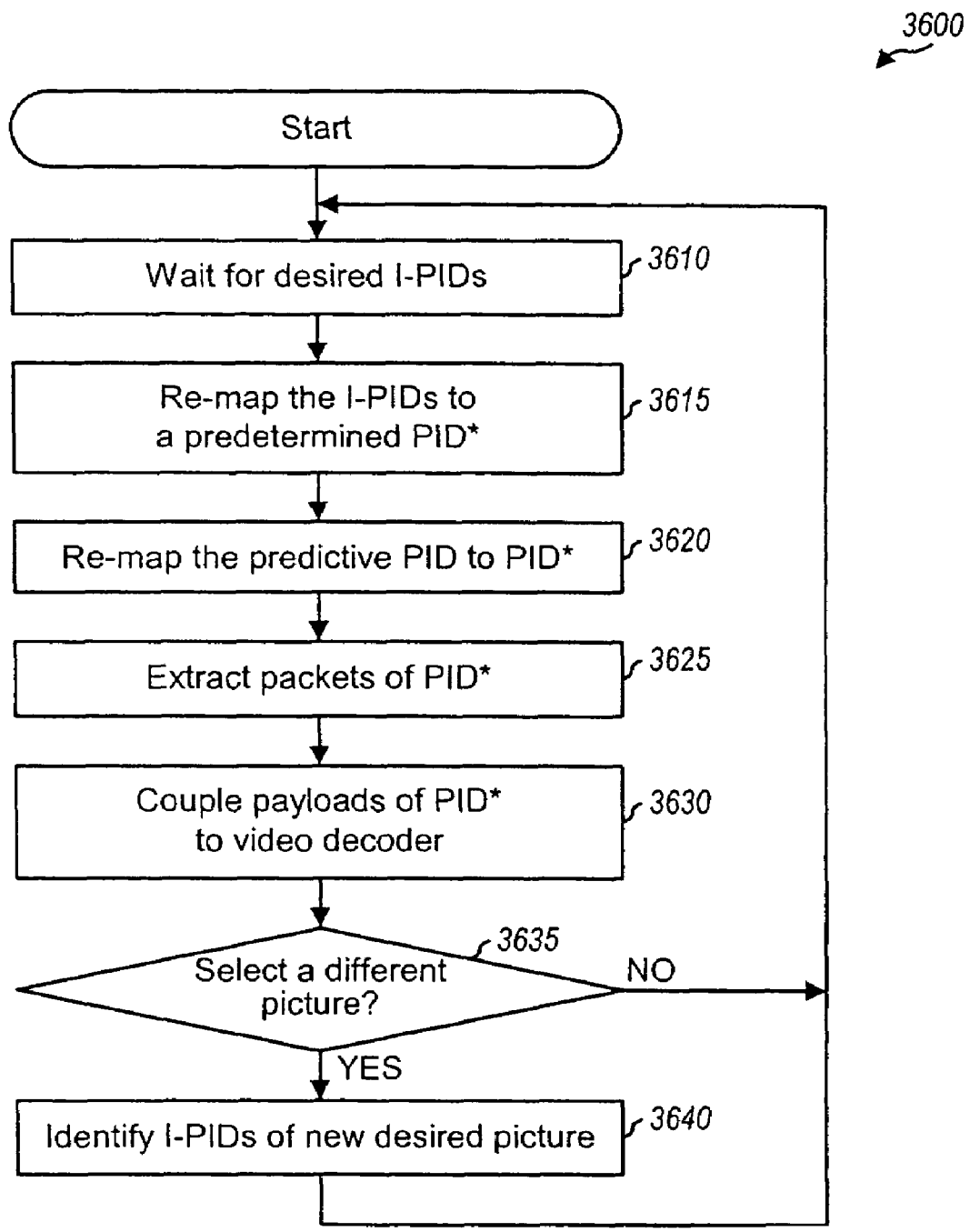

FIG. 36 is a flow diagram of an embodiment of a second recombination process 3600. At step 3610, the process waits for a (viewer) selection of two I-PIDs (e.g., two PIDs corresponding to the guide and video slices) to be received. The I-PIDs, comprising the first picture of a video stream's GOP, identify the two streams to be received. A packet having any one of the selected I-PIDs is then detected.

At step 3615, the PIDs of the intra-coded guide and video portions are re-mapped to a particular number (e.g., PID*). At this step, the PID filter modifies all PIDs of the desired I-stream packets to PID*. At step 3620, the PID number of the predictive-coded pictures (predictive PID) is also re-mapped to PID* by the PID filter, which modifies all PIDs of the predictive PID packets to PID*.

At step 3625, the packets of the PID* stream are extracted from the transport stream by the demultiplexer. At step 3630, the payloads of the packets that includes the video stream header information and the intra-coded and predictive-coded slices are coupled to the video decoder as video information stream V. It should be noted that the slice packets are ordered in the transport stream in the same order as they are to be decoded (e.g., the guide slice packets for first row followed by the video slice packets for first row, then the slices for the second row, and so on).

At step 3635, a query is made whether a different picture (e.g., another IPG page) is requested. If a different picture is not requested, then the process returns to step 3610 where the demultiplexer waits for the next packets having the identified I-PIDs. Otherwise, if a different picture is requested, then the I-PIDs of the new desired picture are identified at step 3640 and the process returns to step 3610.

The process shown in FIG. 36 is used to produce an MPEG-compliant video stream by merging the intra-coded slices and predictive-coded slices before the demultiplexing process.

3. Third Recombination Method

The third recombination method accomplishes MPEG bitstream recombination by using splicing information in the adaptation field of the transport packet headers and by switching between video PIDs based on splice countdown concept.

In the third recombination method, the MPEG streams signal the PID-to-PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive another video PID. It should be noted that special attention to splicing syntax is required for systems that use splicing for other purposes.

Figure 37:
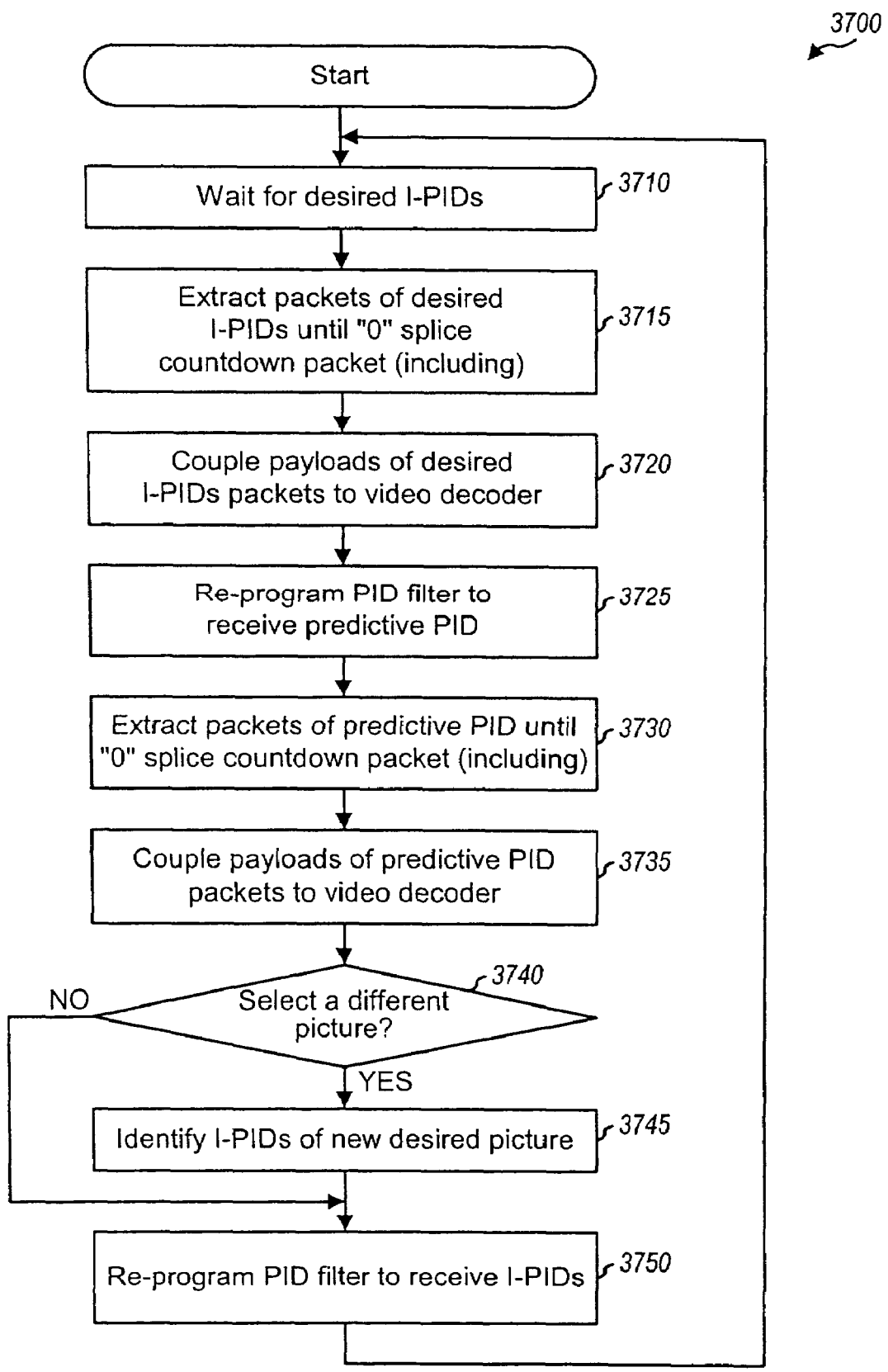

FIG. 37 is a flow diagram of an embodiment of a third recombination process 3700. At step 3710, the process waits for a (viewer) selection of the I-PIDs to be received for the desired IPG page. The I-PIDs, comprising the first picture of a stream's GOP, identify the stream to be received. A packet having any one of the selected I-PIDs is then detected.

At step 3715, the I-PID packets are extracted from the transport stream until, and including, the I-PID packet with a slice countdown value of zero. At step 3720, the payloads of the packets that include the header information related to the video stream and the intra-coded slices are coupled to the video decoder as video information stream V.

At step 3725, the PID filter is re-programmed to receive the predictive-coded pictures. At step 3730, the predictive-coded packets (e.g., PID12 packets in FIG. 10C) are extracted from the transport stream. At step 3735, the payloads of the packets that include the header information related to the video stream and the predictive-coded pictures are coupled to the video decoder. At the end of step 3735, a complete GOP, including the intra-coded slices and the predictive-coded slices, are available to the video decoder. As the payloads are sent to the video decoder in the order in which the packets arrive at the demultiplexer, the video decoder decodes the recombined stream with no additional recombination processing.

At step 3740, a query is made whether a different picture (e.g., another IPG page) is requested. If a different picture is not requested, the process proceeds to step 3750 where the PID filter is re-programmed to receive the previous desired I-PIDs. Otherwise, if a different picture is requested, then the I-PIDs of the new desired picture are identified at step 3745 and the process proceeds to step 3750 where the PID filter is re-programmed to receive the new I-PIDs. The process then returns to step 3710, where the demultiplexer waits for the next packets having the PIDs of the desired picture.

The process shown in FIG. 37 can be used to produce an MPEG-compliant video stream, where the PID-to-PID switch is performed based on a splice countdown concept. It should be noted that the slice recombination can also be performed using the second recombination method whereby the demultiplexer receives the PIDs and extracts packets from the transport stream based on the splice countdown concept. In this case, the same process is applied as shown in FIG. 37 with the difference that, instead of reprogramming the PID filter after the "0" splice countdown packet, the demultiplexer is programmed to depacketize the desired PIDs.

4. Fourth Recombination Method

For terminals that do not include a PID filter and for those in which the demultiplexer cannot process two PIDs for splicing the streams, a fourth recombination method described below can be used for stream recombination. In a terminal not capable of processing two PIDs, two or more streams with different PIDs are spliced together via an additional splicing software or hardware and can be implemented as part of the demultiplexer. In the fourth recombination method, information about which PID to be spliced as the next step is provided to the demultiplexer. The demultiplexer then processes only one PID, but a different PID after the splice occurs.

Figure 38:
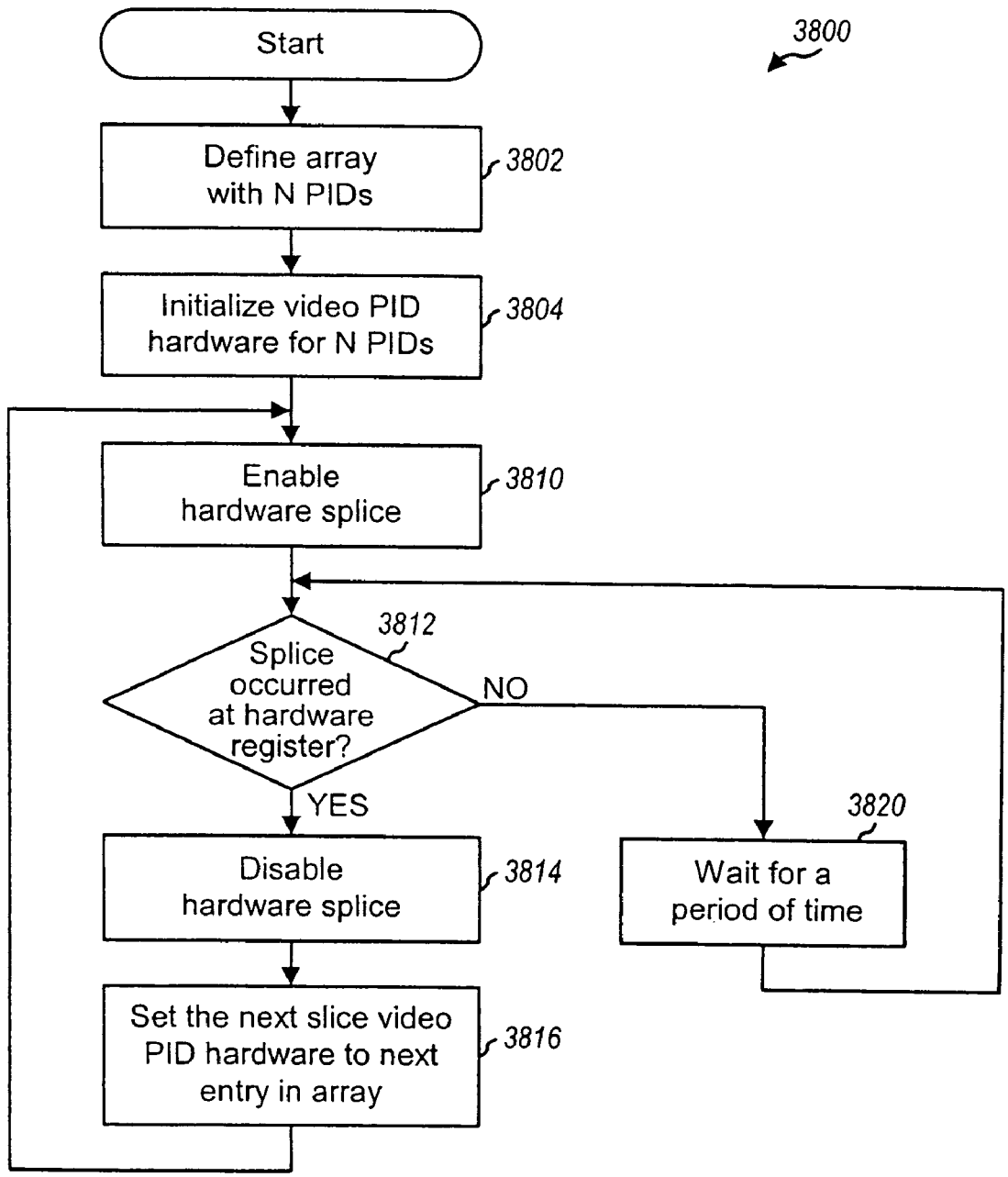

FIG. 38 is a flow diagram of an embodiment of a fourth recombination process 3800 for recombining the IPG streams. At step 3802, the process defines an array of elements having a size that is equal to the number of expected PIDs to be spliced. It is possible to distribute splice information in a picture as desired according to the slice structure of the picture and the desired processing form at the terminal. For example, in the slice-based streams described above, for an I-picture, splice information may be inserted into slice row portions of the guide and video data. At step 3804, the process initializes the video PID hardware for each entry in the array. At step 3810, the hardware splice process is enabled and the packets are extracted by the demultiplexer. The packet extraction may also be performed at another step within the demultiplexer. At step 3812, the process checks a hardware register to determine if a splice has been completed. If the splice has occurred, the process disables the splice hardware, at step 3814, and sets the video PID hardware to the next entry in the array, at step 3816. The process then returns to step 3810. If the splice has not occurred, the process proceeds to step 3820, waits for a period of time, and then returns to step 3812.

In the above-described manner, the slices are spliced together by the hardware within the terminal. To facilitate recombination of the slices, the terminal is sent an array of valid PID values for recombining the slices via a user data in the transport stream or another communications link between the terminal and the head-end. The array is updated dynamically to ensure that the correct portions of the IPG are presented to the viewer correctly. Since the splice points in the slice-based streams may occur at a frequent level, a software application may not have the capability to control the hardware for splicing operation as discussed above. In such case, a firmware may be dedicated to control the demodulator hardware at a higher rate for the splicing process.

I. Delivery of IPG using Temporal Slice Persistence

1. Partitioning of IPG Pages

Figure 39A:
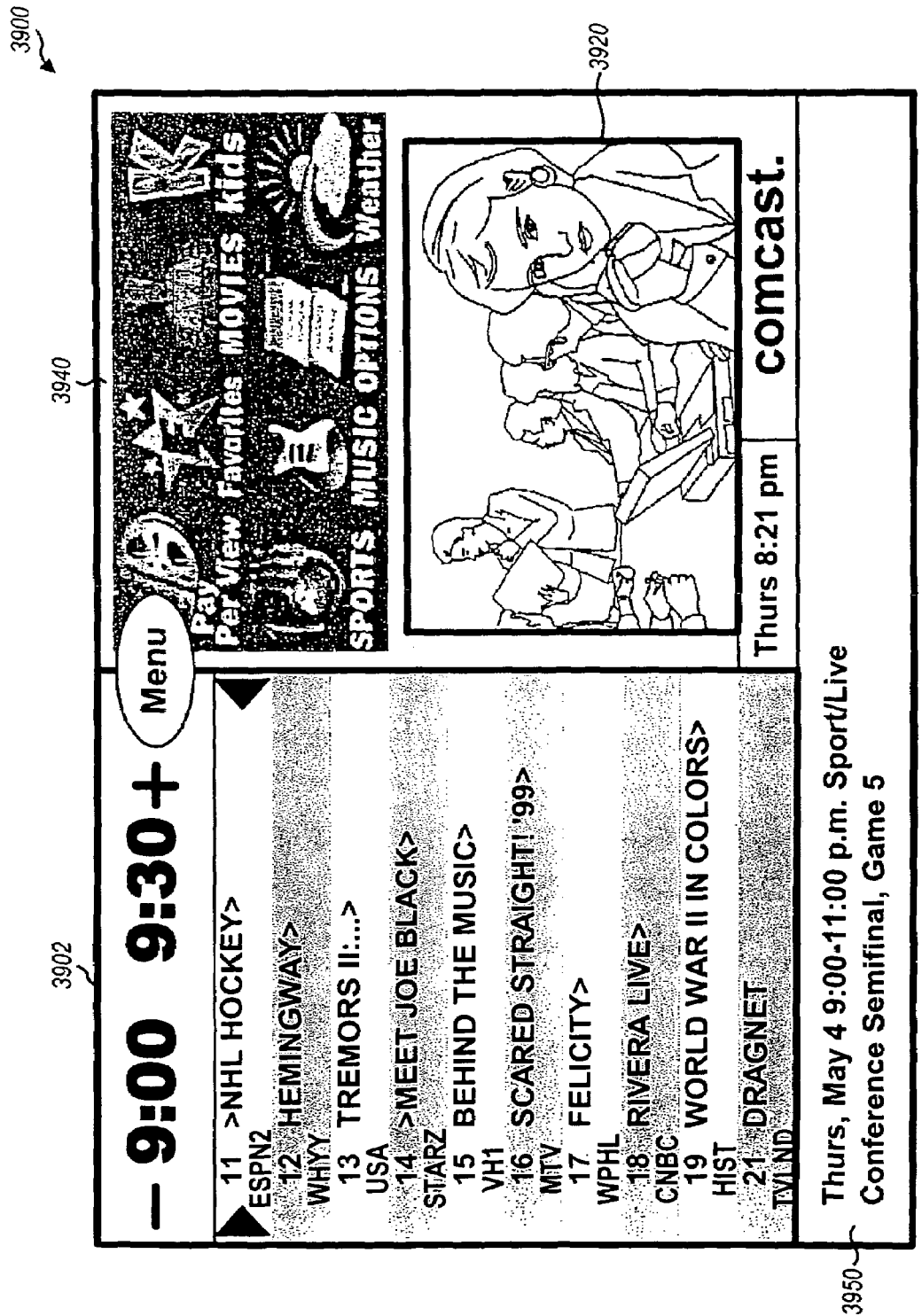
FIGS. 39A and 39B are diagrams of two partitioning of an IPG page in accordance with an embodiment of the invention.

FIG. 39A is a diagram of a partitioning of an IPG page 3900 in accordance with an embodiment of the invention. IPG page 3900 can be partitioned into a number of regions or portions including a guide portion 3902, a video portion 3920, a filter object region 3940, and a program description region 3950. Guide portion 3902 and filter object region 3940 each further includes a number of objects. IPG page 3900 is described in further detail above and in the aforementioned U.S. patent application Ser. No. 09/466,990.

In an embodiment, guide portion 3902 for each IPG page is specific to the page, is different from other pages, and further does not change over time. In an embodiment, a common time-varying video portion is used for all IPG pages. Depending on the particular IPG page design (such as IPG page 3900 in FIG. 39A), the video portion may comprise different size motion video screens. Efficient coding and transmission of various portions of IPG page 3900 can be achieved based on these characteristics, as described in further detail below.

Figure 39B:
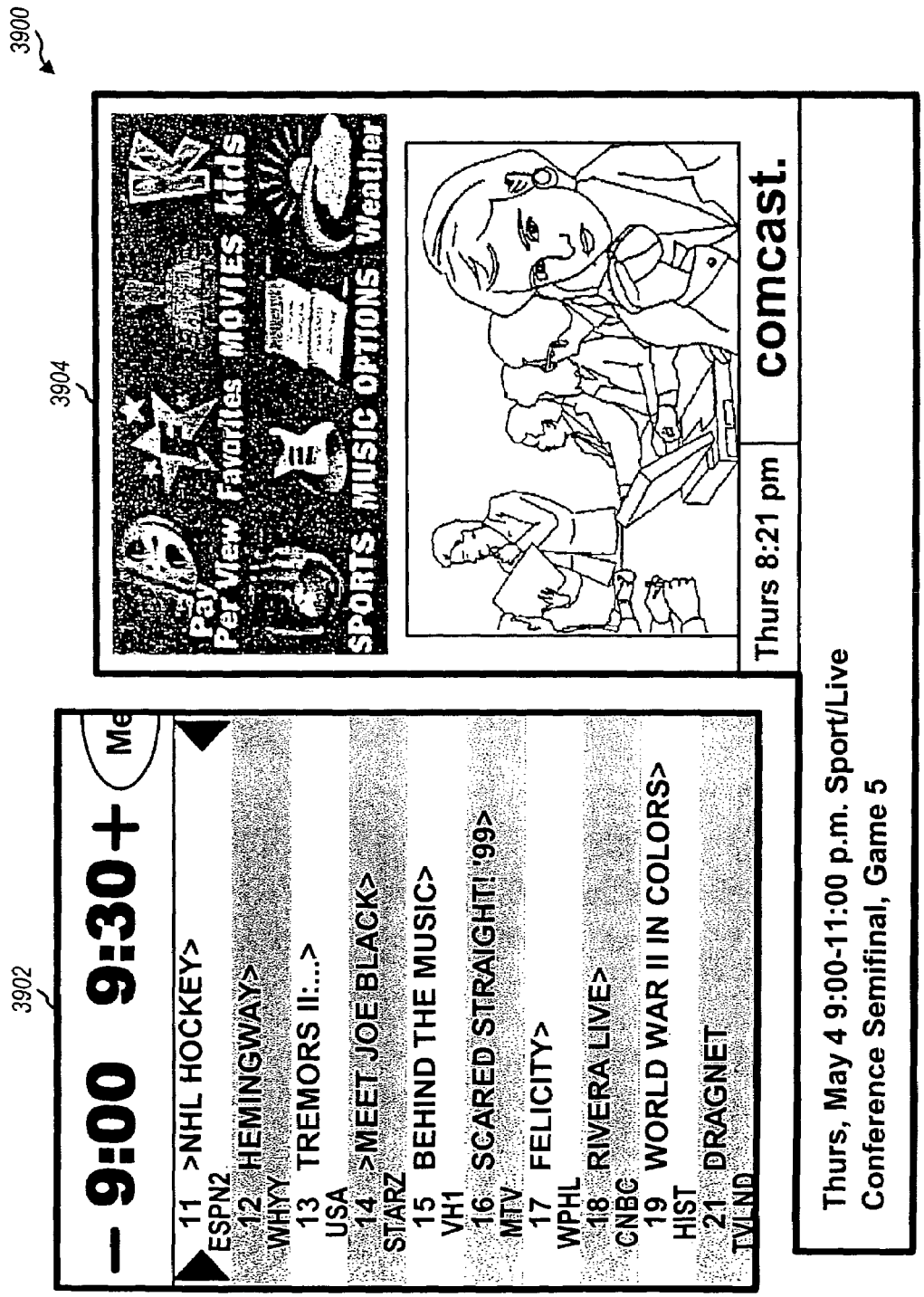

FIG. 39B is a diagram of another partitioning of IPG page 3900 in accordance with an embodiment of the invention. IPG page 3900 can be partitioned into guide portion 3902 and a background portion 3904 that includes video portion 3920, filter object region 3940, and program description region 3950. Background portion 3904 includes all information that is not specific to any particular IPG page and common to all IPG pages.

2. Transmission of Interactive Program Guide

Figure 40A:
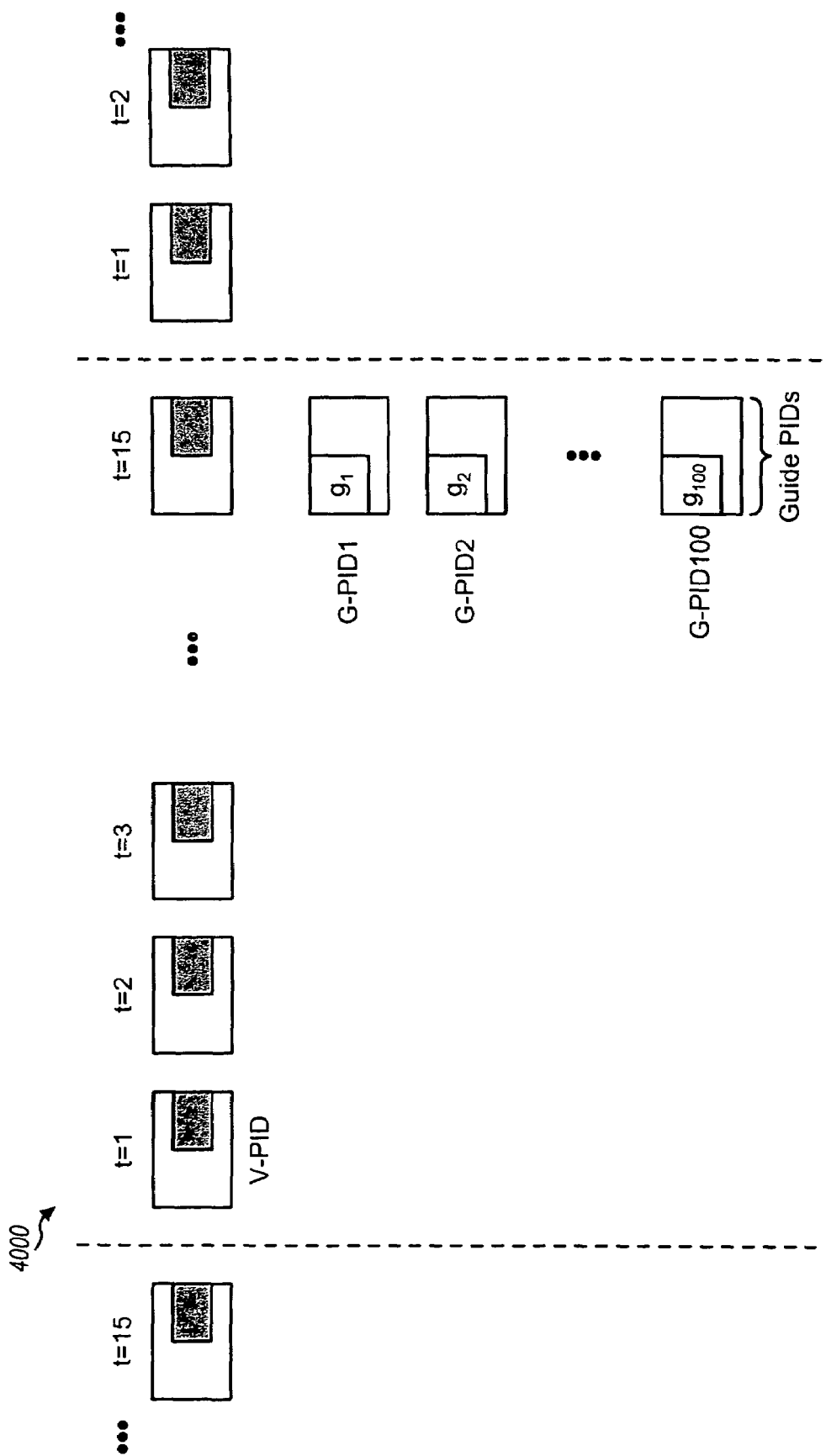
FIGS. 40A and 40B are diagrams of two matrix representations of program guide data for a number of IPG pages, with both representations being based on the partitioning of the IPG page shown in FIGS. 39A and 39B.

FIG. 40A is a diagram of a matrix representation 4000 of program guide data for a number of IPG pages based on the partitioning of the IPG page shown in FIGS. 39A and 39B. As shown in FIG. 40A, a video sequence is formed which contains only the video portion of the IPG page (i.e., the portion containing time-varying information), which is shown as the shaded portion in FIG. 40A. The coded video sequence contains only slices that belong to the motion video region. The coded video sequence is assigned a particular PID (e.g., V-PID) and transmitted from the head-end.

For each IPG page, the guide portion (i.e., the portion containing the information specific to that IPG page) is sent in separate picture frames. Since the guide portion does not change over time, only one picture for each GOP is coded. The coded guide frames similarly contains only the slices that belong to the guide portion of a frame. The coded guide portion for each IPG page is assigned a respective PID (e.g., G-PID) and also transmitted from the head-end.

3. Encoding and Decoding of IPG Pages

The presentation times of the guide page frames and motion video frames are assigned in accordance with the temporal slice persistence fact. In the embodiment shown in FIG. 40A, the guide PIDs (i.e., G-PID1, G-PID2, and so on) are time stamped to be presented at the end of each GOP at t=15. At t=15, the last motion-video frame in the GOP is dropped and the viewer-selected guide page is presented. For this to happen, the video decoder re-combines the selected guide PID (e.g., G-PID1), and the video V-PID via one of the picture-based re-combination methods described above in the aforementioned U.S. patent application Ser. No. 09/466,990.

The selected guide page is decoded and displayed at t=15, with only the region that contains the guide portion slices being updated on the screen. From that time on, the guide portion of the screen remains the same, i.e., the respective slices temporally persists on the screen, until the viewer selects another guide page. This selection then updates the guide portion slices and re-writes the new guide portion on the screen. The V-PID frames only changes the motion-video portion of the screen and does not update the guide portion as they do not carry slices in the guide portion of the frame.

The embodiment shown in FIG. 40A utilizes the time t=15 to display the guide PIDs. This is one implementation of temporal slice persistence where the last picture of the V-PID in a GOP is dropped and replaced with a guide frame so that the prediction structure of the GOP is not affected by such replacement. In one embodiment, V-PID is encoded as I-P-P-P-P-P . . . P, where the last P frame at t=15 is dropped at the STT and replaced with the guide frame that is also "P" coded to keep the picture sequence types same as the original GOP. In this case, since the guide and motion video frames do not contain any common region for prediction, the "P" coded guide frames are encoded to have only "intra-coded" macroblocks. This is achieved by adjusting the encoding threshold selection that decides whether a macroblock is better to be encoded as intra-coded or as predictive-coded.

In another embodiment supported by FIG. 40A, the V-PID is encoded using only I pictures, and the last I picture is dropped and replaced with an I coded guide frame.

In yet another embodiment supported by FIG. 40A, the V-PID is encoded including P and B pictures (e.g., a GOP is I-B-B-P-B-B-P-B-B-P-B-B-P-B-B), and the last B picture is dropped and replaced with a B coded guide frame with intra-coded macroblocks.

Figure 40B:
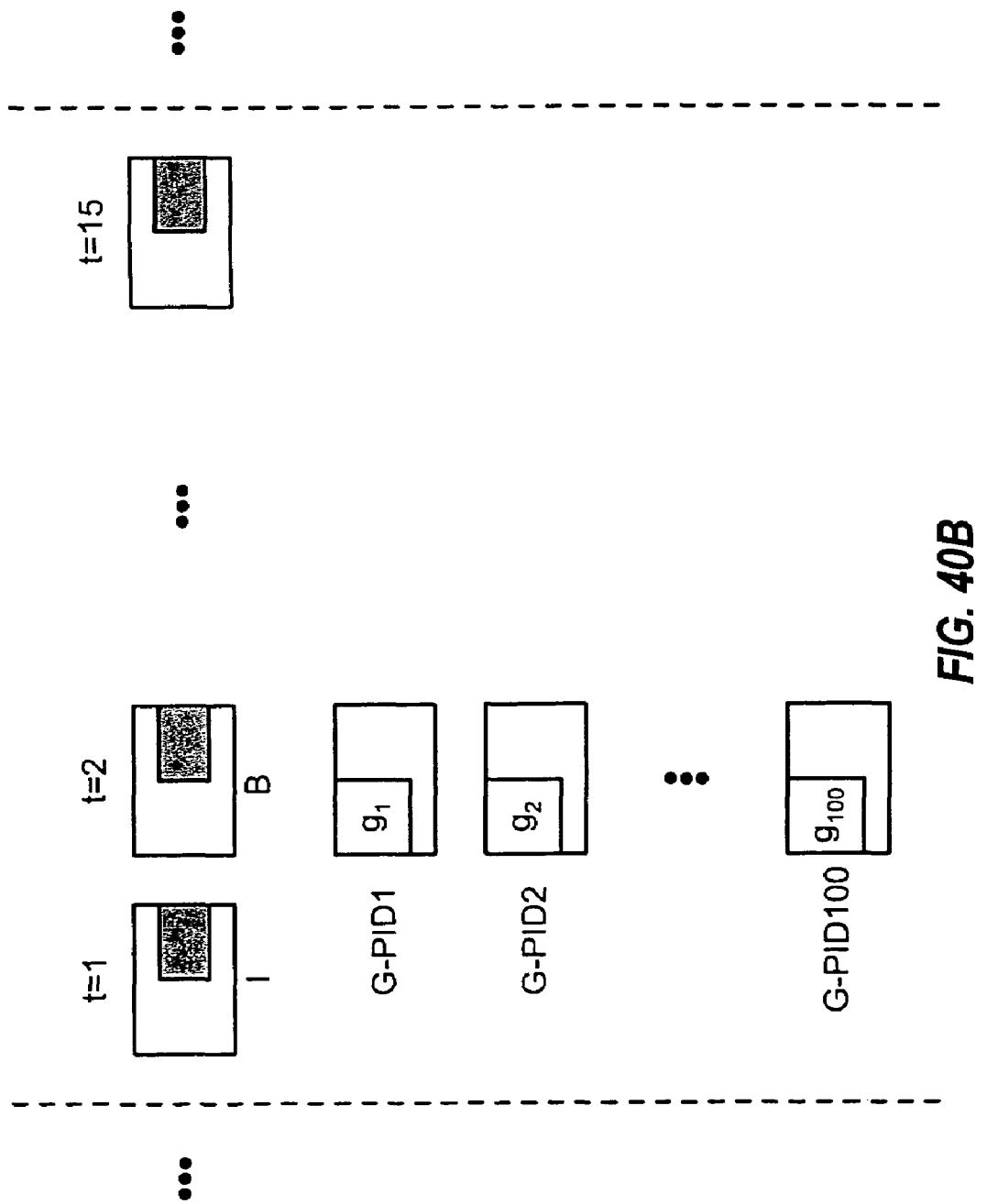

In yet another embodiment shown in FIG. 40B, the V-PID is encoded including P and B pictures (e.g., a GOP is I-B-B-P-B-B-P-B-B-P-B-B-P-B-B), and instead of the last B frame in a GOP being dropped and replaced, any selected B frame (in the example shown FIG. 40B, the B frame at t=2 is chosen) in V-PID can replaced with a B coded guide frame with intra-coded macroblocks. A "B" coded frame at any time can be dropped and replaced, as it is not used as a reference for prediction by other pictures in a GOP. All the guide page frames can be time stamped to be presented, for example, at t=2.

The previous embodiments disclosed with respect to FIGS. 40A and 40B can be employed in a broadcast scenario whereby multiple guide PIDs (in the order of hundreds) can be delivered, with none of the guide PIDs carrying any full motion video barker to provide huge bandwidth saving. The barker video can be sent as a separate video stream. Any related combination of display and coding of guide frames versus V-PID in a GOP, in addition to the disclosed embodiments, which uses the temporal slice persistence technique described herein is within the scope of this invention.

The embodiments disclosed with respect to FIGS. 40A and 40B for broadcast can also be used for a demand-cast of IPG pages in response to viewer requests. However, in a demand-cast implementation, a fundamental difference from the broadcast embodiments, from the encoding perspective, is the delivery of a requested guide page PID to the terminal as soon as possible. In that respect, from the time a page request is received, the head-end time stamps the requested page to be processed and displayed on the screen in a suitable time within a GOP.

Figure 41:
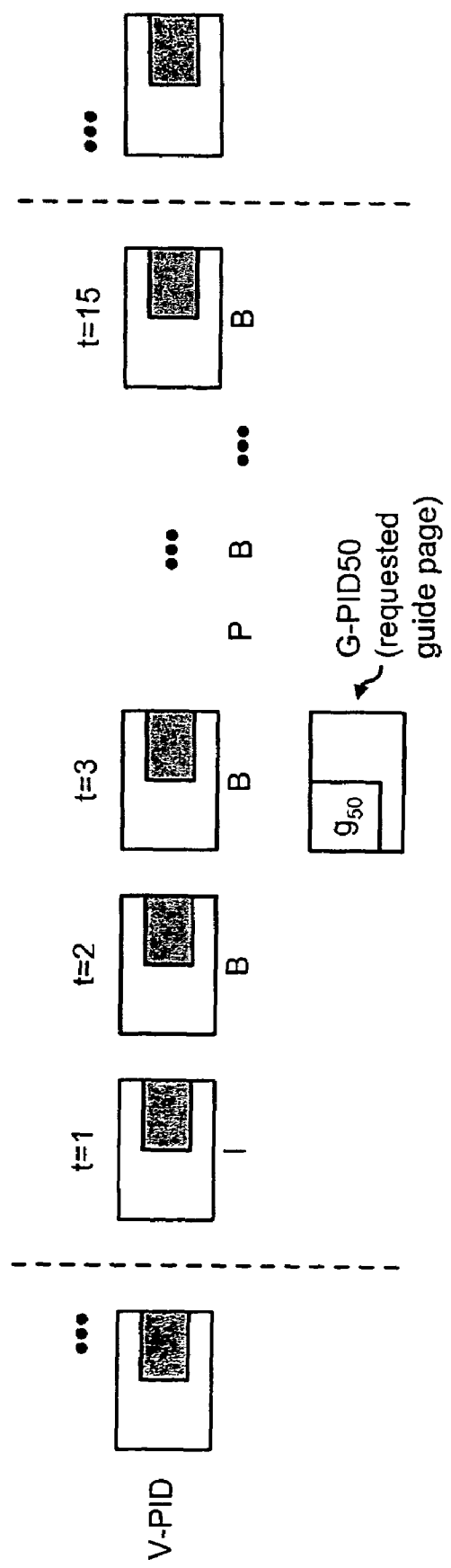
FIG. 41 is a diagram that show an implementation of demand-cast via use of temporal slice persistence in accordance with an aspect of the invention.

FIG. 41 is a diagram that show an implementation of demand-cast via use of temporal slice persistence in accordance with an aspect of the invention. In the demand-cast embodiment shown in FIG. 41, the requested guide PID is time stamped to be displayed at t=3, after the request is received. In this embodiment, V-PID is encoded to include B frames (e.g., I-B-B-P-B-B-P . . . ), and the B frame at t=3 is dropped and replaced with a B coded guide PID with intra-coded macroblocks. A "B" frame of V-PID can be dropped at anytime in a GOP as it is not used as reference for prediction by other frames in the GOP.

In another demand-cast embodiment, the V-PID is encoded with I frames only and the requested guide PID is I-coded and replaces the V-PID anytime in a GOP. The guide page can be inserted into a GOP in place of any V-PID frame after the page request is received by head-end.

The previous broadcast and demand-cast embodiments are based on the fact that only one main video sequence delivers the IPG, utilizing the sub-sequences (or "streams") guide stream and V-PID stream. The guide stream is handled as a substitute in a GOP to one of the frames of V-PID. In this case, the substituted frame is encoded in a similar fashion with the dropped V-PID and the rate control mechanism is based on the fact that there is only one main video sequence.

In another coding paradigm, it is possible to consider the guide PIDs and V-PID as two different video sequences. In this paradigm, instead of guide frame substitution to V-PID, the guide frames are formed into a separate sequence with a proper sequence start codes and GOP start codes. In one embodiment, each guide page is formed as a one picture-GOP with the proper sequence start codes, GOP start codes, and so on.

Figure 42A:
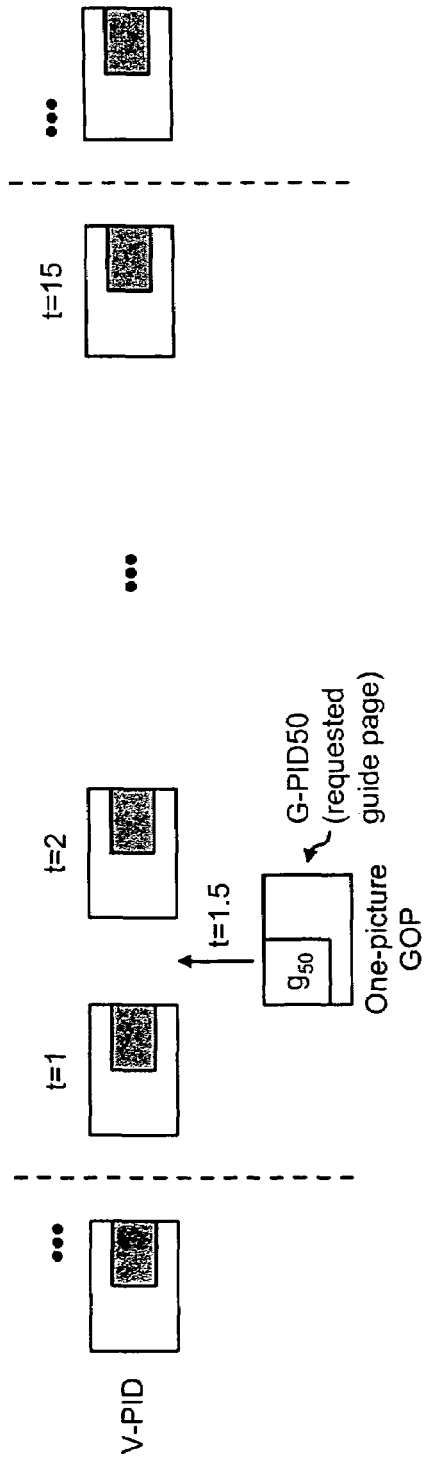
FIGS. 42A and 42B are diagrams of two implementations of demand-cast via use of temporal slice persistence, whereby the demand-casted IPG page is sent as a one-picture GOP.

FIG. 42A is a diagram of another implementation of demand-cast via use of temporal slice persistence, whereby the demand-cast IPG page is sent as a one-picture GOP, in accordance with an aspect of the invention. The demand-cast embodiment shown in FIG. 42A is based on the alternative paradigm described above, and the requested guide page can be displayed at any time in between two V-PID frames, e.g., at t=1.5. In this embodiment, no V-PID frame is dropped and the inserted guide page updates the guide portion of the screen. This embodiment can be employed if the terminal and the display television standard allow more than, e.g., 30 frames per second and the higher rate is not completely utilized by V-PID. Since the one-picture guide page GOP is processed independently of the V-PID, the rate control of the V-PID stream is not affected by the guide-PID.

Figure 42B:
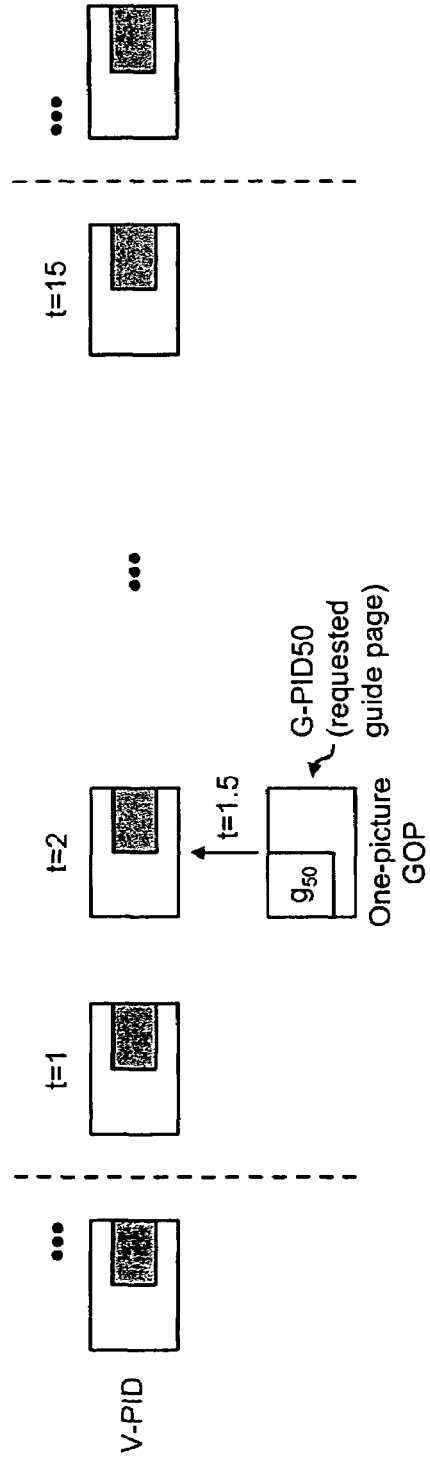

The FIG. 42B shows a related embodiment to FIG. 42A, where in this case, the one-picture GOP guide page is displayed by dropping one of the V-PID frames. In this embodiment, since the guide PID is processed independently, it can be coded as an I picture while the dropped frame may be coded differently, e.g., as a P picture or a B picture.

4. Encoding and Recovery of Icon Region and Background Region

As discussed with respect to the above-described embodiments, the V-PID includes the motion video and the guide PIDs includes the guide portions of the IPG. In order for the terminal to receive the common guide portion 3904 as illustrated in FIG. 39B (including the icon region), various encoding schemes can be used.

Figure 43:
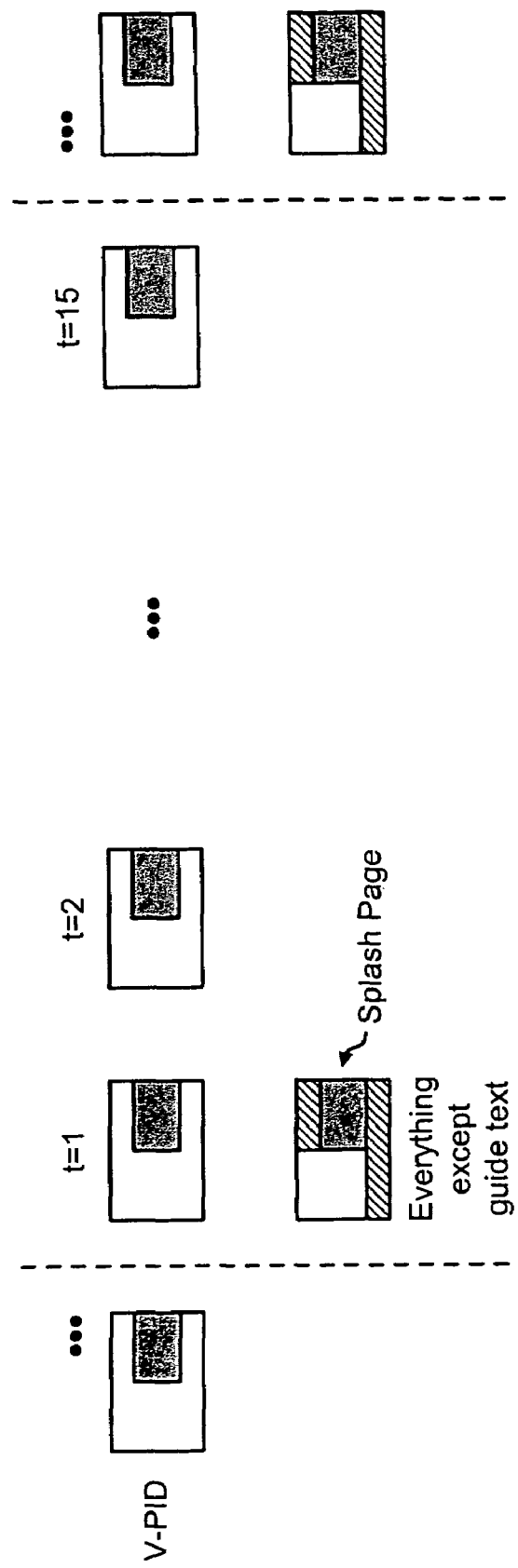
FIG. 43 is a diagram of a transmission of a "splash" page, which is utilized by the terminal to receive the complete IPG page except the selected guide text.

FIG. 43 is a diagram of a transmission of a "splash" page, which is utilized by the terminal to receive a complete IPG page other than a selected guide text. A more detailed description on splash page is provided in U.S. patent application Ser. No. 09/635,508, entitled "METHOD AND APPARATUS FOR TRANSITIONING BETWEEN INTERACTIVE PROGRAM GUIDE (IPG) PAGES," filed Aug. 9, 2000, assigned to the assignee of the invention and incorporated herein by reference.

An I-coded splash page can be displayed by the terminal upon initial powering up of the terminal or after power failures, or at any desired time selected by the system to refresh the display for correct IPG look. Since the V-PID and guide PIDs do not contain slices related to the icon, description, or any regions other than guide portion 3902 and video portion 3920 in FIG. 39A, such information presented by the splash page PID is not updated by V-PID and guide PIDs.

In another embodiment, the splash PID is not used and instead its content is included into the I picture of V-PID (e.g., at t=1 in a GOP) periodically. The complete look of the IPG is retrieved from the I-picture in each GOP of the V-PID.

In yet another embodiment, the IPG regions other than the motion video barker and the guide portion are sent to the terminal upon request from the terminal instead of continuously transmitted.

5. Other Applications for the Delivery and Processing Techniques

For clarity, the delivery and processing techniques of the invention have been specifically described for the delivery of IPG. However, these techniques can also be adapted for delivery of other services and contents. In general, any static or time-varying content (e.g., varying at a normal video rate or at a slower rate) in any portion of a page or screen can be defined. Each content can be encoded, assigned a respective PID, and transmitted from the head-end. At the terminal, upon receiving a selection for a particular content, packets with the PID corresponding to the selected content can be retrieved and the content sent therein can be decoded and provided for display.

For example, the techniques of the invention can be used to deliver stock quotes, sports scores, headline news, traffic reports, other guides, and so on. Upon selecting a particular content (e.g., stock quotes), the PID assigned for the selected content can be retrieved, processed, and displayed on the screen (e.g., as a scrolling banner in a portion of the screen). The selected content can be static, in which case the terminal can store the selected content in the display buffer once and not overwrite that portion of the buffer until otherwise directed (e.g., by the viewer). Alternatively, the selected content can be time varying, in which case the terminal can continually retrieve and process the PID to recover the time-varying content.

The temporal slice persistence encoding technique described herein can be utilized with any one of the multiplex/demultiplex level recombination techniques utilized in the aforementioned U.S. patent application Ser. No. 09/466,990 for recombining multiple PIDs in systems that are capable of processing only one PID at a time.

The foregoing description of the preferred embodiments is provided to enable any person skilled in the art to make or use the invention. Various modifications to these embodiments will be readily apparent to those skilled in the art, and the generic principles defined herein may be applied to other embodiments without the use of the inventive faculty. Thus, the invention is not intended to be limited to the embodiments shown herein but is to be accorded the widest scope consistent with the principles and novel features disclosed herein.

What is claimed is:

1. A method, comprising:
   receiving a viewer selection for imagery, said imagery including at least one intracoded slice and at least one predictively coded slice, each of said intracoded and predictively codes slices being associated with respective bitstreams;
   extracting packets from the at least one bitstream corresponding to the at least one intracoded slice of the selected imagery;
   extracting packets from the at least one bitstream corresponding to the at least one predictively coded slice of the selected imagery; and
   arranging payload portions of the extracted packets to form said selected imagery.

2. The method of claim 1, wherein:
   said selected imagery comprises a sequence of image frames forming a group of pictures (GOP), said GOP comprising a first image frame primarily formed using intracoded slices and a plurality of subsequent image frames primarily formed using predictively codes slices.

3. The method of claim 1, wherein:
   said imagery comprises an interactive program guide (IPG) page including a guide portion and a video portion.

4. The method of claim 1, wherein:
   each bitstream has associated with it a respective packet identifier (PID), said PIDs being used by said steps of extracting to identify bitstreams corresponding to the at least one intracoded slice and the at least one predictively coded slice forming the selected imagery.

5. The method of claim 4, further comprising:
   sending said extracted packets to a decoder for processing.

6. The method of claim 4, further comprising:
   modifying packet identifiers (PIDs) associated with said selected imagery to a predetermined PID value prior to said extracting steps.

7. The method of claim 6, wherein said modified PIDs are changed to a PID value equal to a lowest PID value associated with said selected imagery.

8. The method of claim 6, wherein said extracting steps comprise extracting said packets having said predetermined PID value.

9. The method of claim 8, further comprising:
   setting a discontinuity indicator in an adaptation field of a header of a packet that immediately follows a merge point.

10. The method of claim 4, wherein said extracting packets from the at least one bitstream corresponding to the at least one intracoded slice of the selected imagery, further comprises:
    identifying a splice countdown value in an adaptation field of a packet header for packets having PIDs associated with intracoded slices (I-PIDs).
    extracting packets having I-PIDs from said bitstream that have a countdown value approaching and including a countdown value of zero; and
    sending payloads of said extracted packets having I-PIDs to a decoder for processing.

11. The method of claim 10, further comprising:
    identifying a splice countdown value in an adaptation field of a packet header for packets having PIDs associated with predictively coded slices (P-PIDs),
    extracting packets having P-PIDs from said bitstream that have a countdown value approaching and including a countdown value of zero; and
    sending payloads of said extracted packets having P-PIDs to a decoder for processing.

12. Apparatus, comprising:
    means for receiving a viewer selection for imagery, said imagery including at least one intracoded slice and at least one predictively coded slice, each of said intracoded and predictively codes slices being associated with respective bitstreams;
    means for extracting packets from the at least one bitstream corresponding to the at least one intracoded slice of the selected imagery;
    means for extracting packets from the at least one bitstream corresponding to the at least one predictively coded slice of the selected imagery; and means for arranging payload portions of the extracted packets to form said selected imagery.

13. The apparatus of claim 12, wherein:
said selected imagery comprises a sequence of image frames forming a group of pictures (GOP), said GOP comprising a first image frame primarily formed using intracoded slices and a plurality of subsequent image frames primarily formed using predictively codes slices.

14. The apparatus of claim 12, wherein:
said imagery comprises an interactive program guide (IPG) page including a guide portion and a video portion.

15. The apparatus of claim 12, wherein:
each bitstream has associated with it a respective packet identifier (PID), said PIDs being used by said steps of extracting to identify bitstreams corresponding to the at least one intracoded slice and the at least one predictively coded slice forming the selected imagery.

16. The apparatus of claim 15, further comprising:
sending said extracted packets to a decoder for processing.

17. The apparatus of claim 15, further comprising:
modifying packet identifiers (PIDs) associated with said selected imagery to a predetermined PID value prior to said extracting steps.

18. The apparatus of claim 17, wherein said modified PIDs are changed to a PID value equal to a lowest PID value associated with said selected imagery.

19. The apparatus of claim 17, wherein said extracting steps comprise extracting said packets having said predetermined PID value.

20. The apparatus of claim 19, further comprising:
means for setting a discontinuity indicator in an adaptation field of a header of a packet that immediately follows a merge point.

21. The method of claim 15, wherein said extracting packets from the at least one bitstream corresponding to the at least one intracoded slice of the selected imagery, further comprises:

means for identifying a splice countdown value in an adaptation field of a packet header for packets having PIDs associated with intracoded slices (I-PIDs).

means for extracting packets having I-PIDs from said bitstream that have a countdown value approaching and including a countdown value of zero; and means for sending payloads of said extracted packets having I-PIDs to a decoder for processing.

22. The apparatus of claim 21, further comprising:

means for identifying a splice countdown value in an adaptation field of a packet header for packets having PIDs associated with predictively coded slices (P-PIDs), extracting packets having P-PIDs from said bitstream that have a countdown value approaching and including a countdown value of zero; and sending payloads of said extracted packets having P-PIDs to a decoder for processing.

* * * * *